US006411302B1

(12) United States Patent
Chiraz

(10) Patent No.: US 6,411,302 B1
(45) Date of Patent: Jun. 25, 2002

(54) METHOD AND APPARATUS FOR ADDRESSING MULTIPLE FRAME BUFFERS

(75) Inventor: Robert Carmine Chiraz, Nesconset, NY (US)

(73) Assignee: Concise Multimedia and Communications Inc., Nesconset, NY (US)

( * ) Notice: Subject to any disclaimer, the term of this patent is extended or adjusted under 35 U.S.C. 154(b) by 0 days.

(21) Appl. No.: 09/226,350

(22) Filed: Jan. 6, 1999

(51) Int. Cl.[7] ................................................ G09G 5/36
(52) U.S. Cl. ..................... 345/545; 345/543; 345/544; 345/531; 345/537; 348/552
(58) Field of Search ................................. 345/516, 515, 345/511, 507, 555, 540, 545, 541, 542, 543, 544, 531, 537; 348/552, 446

(56) References Cited

U.S. PATENT DOCUMENTS

| | | | |
|---|---|---|---|
| 4,965,559 A | | 10/1990 | Dye |
| 5,018,076 A | | 5/1991 | Johary et al. |
| 5,361,078 A | | 11/1994 | Caine |
| 5,488,385 A | | 1/1996 | Singhal |
| 5,530,457 A | | 6/1996 | Helgeson |
| 5,625,386 A | | 4/1997 | Howard et al. |
| 5,664,139 A | | 9/1997 | Spurlock |
| 5,751,979 A | * | 5/1998 | McCrory ..................... 345/343 |
| 5,784,035 A | | 7/1998 | Hagiwara et al. |
| 5,929,868 A | * | 7/1999 | Howard et al. .............. 345/508 |

OTHER PUBLICATIONS

Microsoft; Windows 95 DDK; Virtual Flat–Frame Buffer Device Reference; May 20, 1996; 4 pgs.

Intel Corporation; Accelerated Graphics Port Interface Specification (Revision 1.0); Two Usage Models: "Execute" & "DMA"; Jul. 31, 1996; 2 pgs.

Todd Laney and Dave Pike; Meltdown 97—Multiple Monitor Support IHV Track; GDI—DDML; Aug. 22, 1997; 3 pgs.

Microsoft; DirectX 5 Programmers Reference; Devices and Acceleration in MultiMon Systems; Jan. 24, 1997; 1 pg.

\* cited by examiner

*Primary Examiner*—Mark Zimmerman
*Assistant Examiner*—Mackly Monestime

(57) ABSTRACT

High resolution image data is stored in multiple frame buffers to enable the image data to be coupled to multiple lower resolution video streams. Despite physical address discontinuities at frame buffer crossover boundaries, addressing of the multiple frame buffers as a single logical frame buffer is made possible by first dividing the image data into pages using a page size appropriate for both the video mode and arrangement of the physical frame buffers within the high resolution image. Then a pitch is determined for each of the physical frame buffers that enables the alignment of the memory pages at the frame buffer crossovers. Then for video modes utilizing multiple bytes per pixel, the collection of bytes representing the pixels are aligned on the page boundaries at the frame buffer crossovers. Then linear address space is reserved for storing a single high resolution frame buffer. Then address translation hardware is configured to shuffle the mapping of the pages such that the pages within the reserved linear address space are routed to the appropriate pages within the multiple physical frame buffers to create a single high resolution frame buffer when accessed with an appropriate logical pitch.

33 Claims, 46 Drawing Sheets

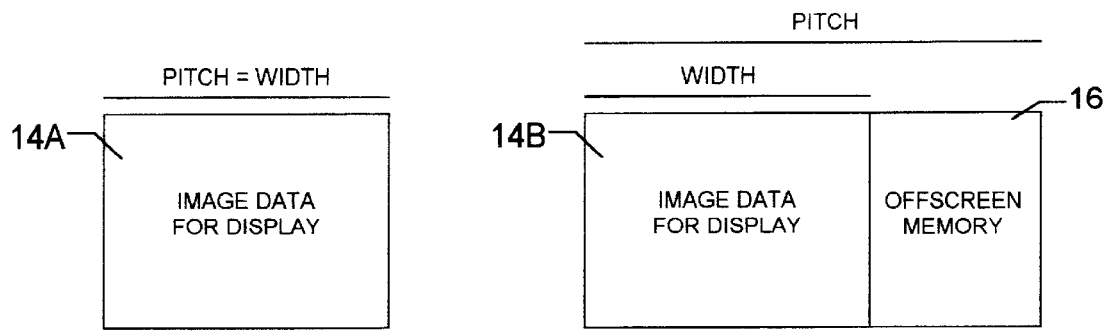
FIG. 3A
*(PRIOR ART)*
FIG. 3B
*(PRIOR ART)*
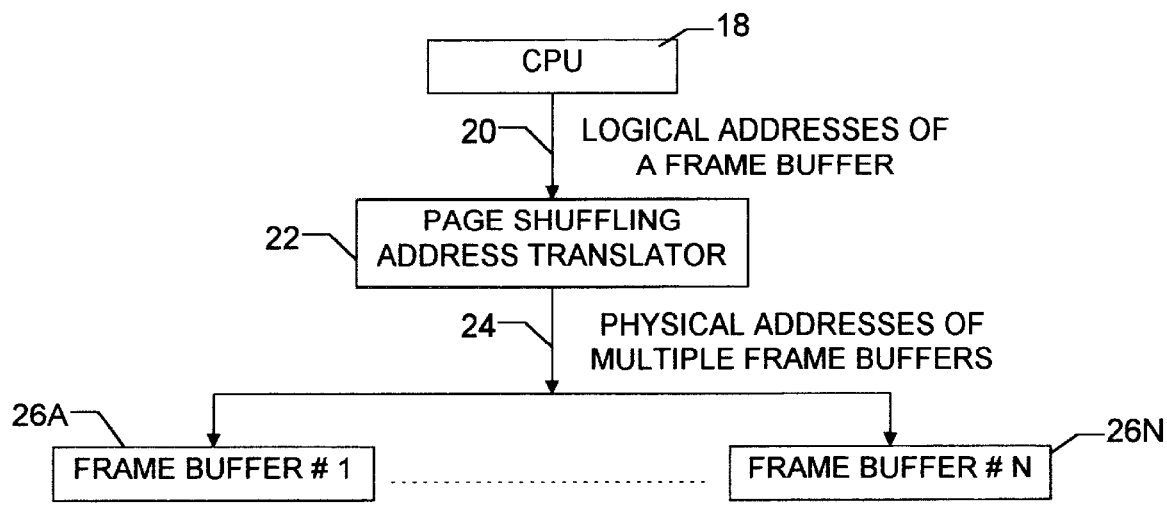
FIG. 4

| SINGLE FRAME BUFFER RESOLUTION | MEMORY ADDRESSES/ PIXEL | PAGE SIZE | | | | | | | | | | | | | | |
|---|---|---|---|---|---|---|---|---|---|---|---|---|---|---|---|---|
| | | 32 | | 64 | | 128 | | 256 | | 512 | | 1024 | | 2048 | | 4096 |
| | | WIDTH/PAGE SIZE | | | | | | | | Y = INTEGER, N = NONINTEGER | | | | | | |
| 1600 x 1200 | 1 | 50 | Y | 25 | Y | 12.5 | N | 6.25 | N | 3.125 | N | 1.563 | N | 0.7813 | N | 0.391 | N |
| 1280 x 1024 | 1 | 40 | Y | 20 | Y | 10 | Y | 5 | Y | 2.5 | N | 1.25 | N | 0.625 | N | 0.313 | N |
| 1152 x 864 | 1 | 36 | Y | 18 | Y | 9 | Y | 4.5 | N | 2.25 | N | 1.125 | N | 0.5625 | N | 0.281 | N |
| 1024 x 768 | 1 | 32 | Y | 16 | Y | 8 | Y | 4 | Y | 2 | Y | 1 | Y | 0.5 | Y | 0.25 | N |
| 800 x 600 | 1 | 25 | Y | 12.5 | N | 6.25 | N | 3.125 | N | 1.5625 | N | 0.781 | N | 0.3906 | N | 0.195 | N |
| 640 x 480 | 1 | 20 | Y | 10 | Y | 5 | Y | 2.5 | N | 1.25 | N | 0.625 | N | 0.3125 | N | 0.156 | N |
| 320 x 240 | 1 | 10 | Y | 5 | Y | 2.5 | N | 1.25 | N | 0.625 | N | 0.313 | N | 0.1563 | N | 0.078 | N |
| 1600 x 1200 | 2 | 100 | Y | 50 | Y | 25 | Y | 12.5 | N | 6.25 | N | 3.125 | N | 1.5625 | N | 0.781 | N |
| 1280 x 1024 | 2 | 80 | Y | 40 | Y | 20 | Y | 10 | Y | 5 | Y | 2.5 | N | 1.25 | N | 0.625 | N |
| 1152 x 864 | 2 | 72 | Y | 36 | Y | 18 | Y | 9 | Y | 4.5 | N | 2.25 | N | 1.125 | N | 0.563 | N |
| 1024 x 768 | 2 | 64 | Y | 32 | Y | 16 | Y | 8 | Y | 4 | Y | 2 | Y | 1 | Y | 0.5 | Y |
| 800 x 600 | 2 | 50 | Y | 25 | Y | 12.5 | N | 6.25 | N | 3.125 | N | 1.563 | N | 0.7813 | N | 0.391 | N |
| 640 x 480 | 2 | 40 | Y | 20 | Y | 10 | Y | 5 | Y | 2.5 | N | 1.25 | N | 0.625 | N | 0.313 | N |
| 320 x 240 | 2 | 20 | Y | 10 | Y | 5 | Y | 2.5 | N | 1.25 | N | 0.625 | N | 0.3125 | N | 0.156 | N |
| 1600 x 1200 | 3 | 150 | Y | 75 | Y | 37.5 | N | 18.75 | N | 9.375 | N | 4.688 | N | 2.3438 | N | 1.172 | N |
| 1280 x 1024 | 3 | 120 | Y | 60 | Y | 30 | Y | 15 | Y | 7.5 | Y | 3.75 | N | 1.875 | N | 0.938 | N |
| 1152 x 864 | 3 | 108 | Y | 54 | Y | 27 | Y | 13.5 | N | 6.75 | N | 3.375 | N | 1.6875 | N | 0.844 | N |
| 1024 x 768 | 3 | 96 | Y | 48 | Y | 24 | Y | 12 | Y | 6 | Y | 3 | Y | 1.5 | Y | 0.75 | N |
| 800 x 600 | 3 | 75 | Y | 37.5 | N | 18.75 | N | 9.375 | N | 4.6875 | N | 2.344 | N | 1.1719 | N | 0.586 | N |
| 640 x 480 | 3 | 60 | Y | 30 | Y | 15 | Y | 7.5 | Y | 3.75 | N | 1.875 | N | 0.9375 | N | 0.469 | N |
| 320 x 240 | 3 | 30 | Y | 15 | Y | 7.5 | Y | 3.75 | N | 1.875 | N | 0.938 | N | 0.4688 | N | 0.234 | N |
| 1600 x 1200 | 4 | 200 | Y | 100 | Y | 50 | Y | 25 | Y | 12.5 | N | 6.25 | N | 3.125 | N | 1.563 | N |
| 1280 x 1024 | 4 | 160 | Y | 80 | Y | 40 | Y | 20 | Y | 10 | Y | 5 | Y | 2.5 | Y | 1.25 | N |
| 1152 x 864 | 4 | 144 | Y | 72 | Y | 36 | Y | 18 | Y | 9 | Y | 4.5 | N | 2.25 | N | 1.125 | N |
| 1024 x 768 | 4 | 128 | Y | 64 | Y | 32 | Y | 16 | Y | 8 | Y | 4 | Y | 2 | Y | 1 | Y |
| 800 x 600 | 4 | 100 | Y | 50 | Y | 25 | Y | 12.5 | N | 6.25 | N | 3.125 | N | 1.5625 | N | 0.781 | N |
| 640 x 480 | 4 | 80 | Y | 40 | Y | 20 | Y | 10 | Y | 5 | Y | 2.5 | N | 1.25 | N | 0.625 | N |
| 320 x 240 | 4 | 40 | Y | 20 | Y | 10 | Y | 5 | Y | 2.5 | N | 1.25 | N | 0.625 | N | 0.313 | N |

| SINGLE FRAME BUFFER RESOLUTION | MEMORY ADDRESSES/ PIXEL | OFFSCREEN WIDTHS FOR A PAGE SIZE OF 4096 FOR N = 0 TO 10 | | | | | | | | | | |
|---|---|---|---|---|---|---|---|---|---|---|---|
| | | 0 | 1 | 2 | 3 | 4 | 5 | 6 | 7 | 8 | 9 | 10 |
| 1600 x 1200 | 1 | 192 | 448 | 704 | 960 | 1216 | 1472 | 1728 | 1984 | 2240 | 2496 | 2752 |
| 1600 x 1200 | 2 | 128 | 384 | 640 | 896 | 1152 | 1408 | 1664 | 1920 | 2176 | 2432 | 2688 |
| 1600 x 1200 | 3 | 64 | 320 | 576 | 832 | 1088 | 1344 | 1600 | 1856 | 2112 | 2368 | 2624 |
| 1600 x 1200 | 4 | 0 | 256 | 512 | 768 | 1024 | 1280 | 1536 | 1792 | 2048 | 2304 | 2560 |
| 1280 x 1024 | 1 | 0 | 4 | 8 | 12 | 16 | 20 | 24 | 28 | 32 | 36 | 40 |
| 1280 x 1024 | 2 | 0 | 4 | 8 | 12 | 16 | 20 | 24 | 28 | 32 | 36 | 40 |
| 1280 x 1024 | 3 | 0 | 4 | 8 | 12 | 16 | 20 | 24 | 28 | 32 | 36 | 40 |
| 1280 x 1024 | 4 | 0 | 4 | 8 | 12 | 16 | 20 | 24 | 28 | 32 | 36 | 40 |
| 1152 x 864 | 1 | 0 | 128 | 256 | 384 | 512 | 640 | 768 | 896 | 1024 | 1152 | 1280 |
| 1152 x 864 | 2 | 0 | 128 | 256 | 384 | 512 | 640 | 768 | 896 | 1024 | 1152 | 1280 |
| 1152 x 864 | 3 | 0 | 128 | 256 | 384 | 512 | 640 | 768 | 896 | 1024 | 1152 | 1280 |
| 1152 x 864 | 4 | 0 | 128 | 256 | 384 | 512 | 640 | 768 | 896 | 1024 | 1152 | 1280 |
| 1024 x 768 | 1 | 0 | 16 | 32 | 48 | 64 | 80 | 96 | 112 | 128 | 144 | 160 |
| 1024 x 768 | 2 | 0 | 16 | 32 | 48 | 64 | 80 | 96 | 112 | 128 | 144 | 160 |
| 1024 x 768 | 3 | 0 | 16 | 32 | 48 | 64 | 80 | 96 | 112 | 128 | 144 | 160 |
| 1024 x 768 | 4 | 0 | 16 | 32 | 48 | 64 | 80 | 96 | 112 | 128 | 144 | 160 |
| 800 x 600 | 1 | 224 | 736 | 1248 | 1760 | 2272 | 2784 | 3296 | 3808 | 4320 | 4832 | 5344 |
| 800 x 600 | 2 | 448 | 960 | 1472 | 1984 | 2496 | 3008 | 3520 | 4032 | 4544 | 5056 | 5568 |
| 800 x 600 | 3 | 160 | 672 | 1184 | 1696 | 2208 | 2720 | 3232 | 3744 | 4256 | 4768 | 5280 |
| 800 x 600 | 4 | 384 | 896 | 1408 | 1920 | 2432 | 2944 | 3456 | 3968 | 4480 | 4992 | 5504 |
| 640 x 480 | 1 | 0 | 128 | 256 | 384 | 512 | 640 | 768 | 896 | 1024 | 1152 | 1280 |
| 640 x 480 | 2 | 0 | 128 | 256 | 384 | 512 | 640 | 768 | 896 | 1024 | 1152 | 1280 |
| 640 x 480 | 3 | 0 | 128 | 256 | 384 | 512 | 640 | 768 | 896 | 1024 | 1152 | 1280 |
| 640 x 480 | 4 | 0 | 128 | 256 | 384 | 512 | 640 | 768 | 896 | 1024 | 1152 | 1280 |
| 320 x 240 | 1 | 192 | 448 | 704 | 960 | 1216 | 1472 | 1728 | 1984 | 2240 | 2496 | 2752 |
| 320 x 240 | 2 | 128 | 384 | 640 | 896 | 1152 | 1408 | 1664 | 1920 | 2176 | 2432 | 2688 |
| 320 x 240 | 3 | 64 | 320 | 576 | 832 | 1088 | 1344 | 1600 | 1856 | 2112 | 2368 | 2624 |
| 320 x 240 | 4 | 0 | 256 | 512 | 768 | 1024 | 1280 | 1536 | 1792 | 2048 | 2304 | 2560 |

*FIG. 20*

LOGICAL PITCH = 4096 X 3 = 12288
| 1024 X 768 X 32 | 1024 X 768 X 32 | 1024 X 768 X 32 |
|---|---|---|
| 1024 X 768 X 32 | 1024 X 768 X 32 | 1024 X 768 X 32 |
FIG. 22
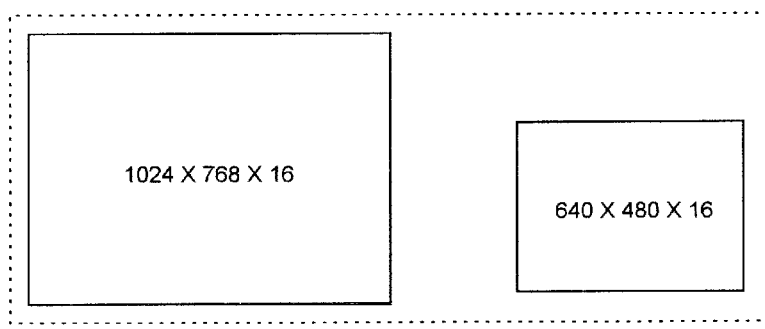
FIG. 23A
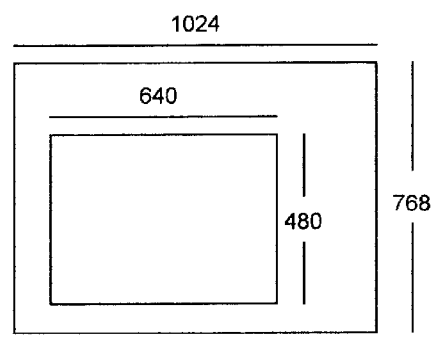
FIG. 23B

FIG. 24A

| 1024 X 768 X 16 | 1024 X 768 X 16 | 1024 X 768 X 16 | 1024 X 768 X 16 | 1024 X 768 X 16 | 1024 X 768 X 16 |
|---|---|---|---|---|---|
| 1024 X 768 X 16 | 1024 X 768 X 16 | 1024 X 768 X 16 | 1024 X 768 X 16 | 1024 X 768 X 16 | 1024 X 768 X 16 |

FIG. 24B

| 2048 X 768 X 16 |
|---|
| 2048 X 768 X 16 |
| 2048 X 768 X 16 |

| 2048 X 768 X 16 |
|---|
| 2048 X 768 X 16 |
| 2048 X 768 X 16 |

FIG. 24C

| 2048 X 768 X 16 | 2048 X 768 X 16 |
|---|---|
| 2048 X 768 X 16 | 2048 X 768 X 16 |
| 2048 X 768 X 16 | 2048 X 768 X 16 |

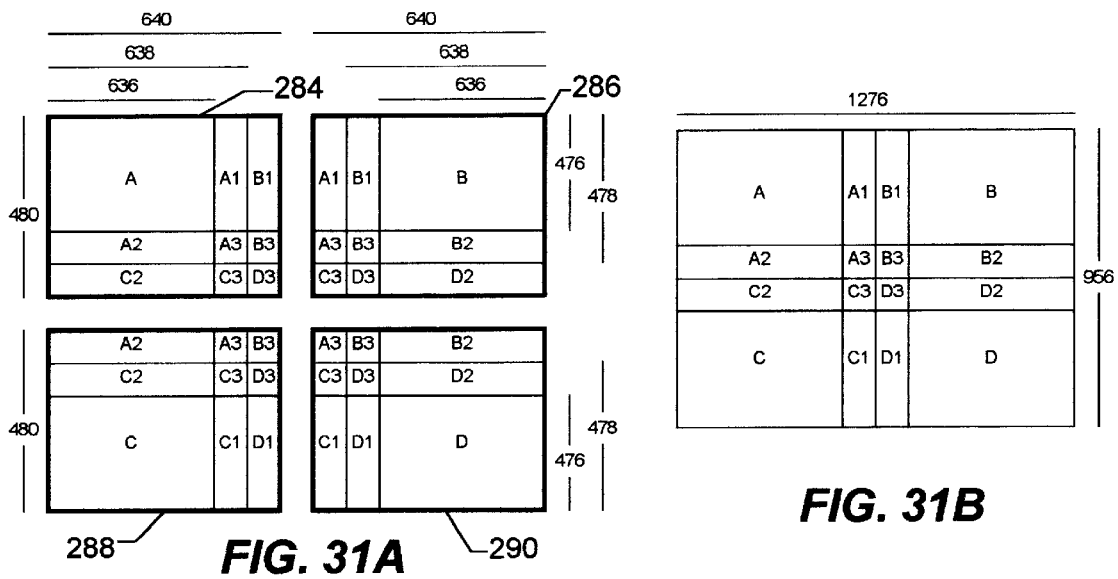
FIG. 31A
FIG. 31B
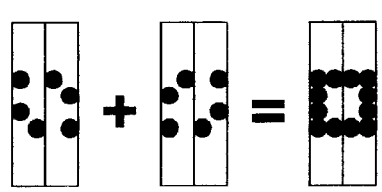
FIG. 32A
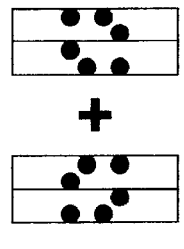
FIG. 32B
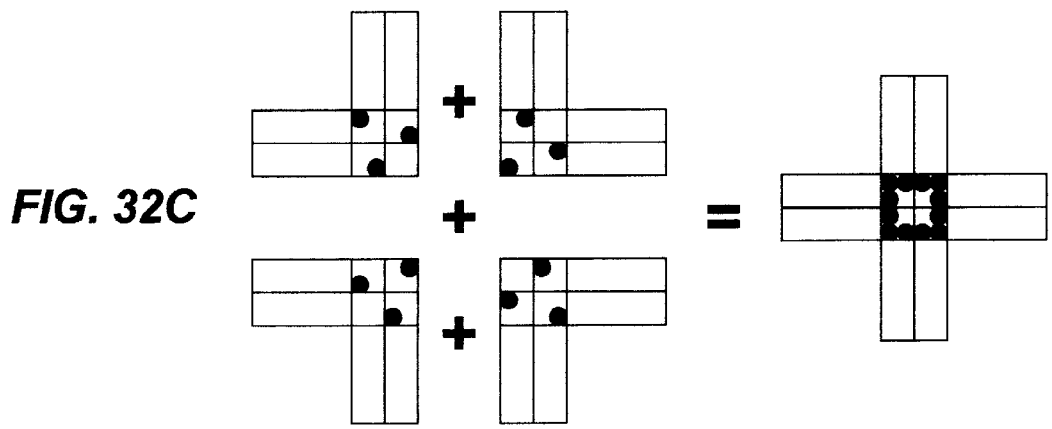
FIG. 32C

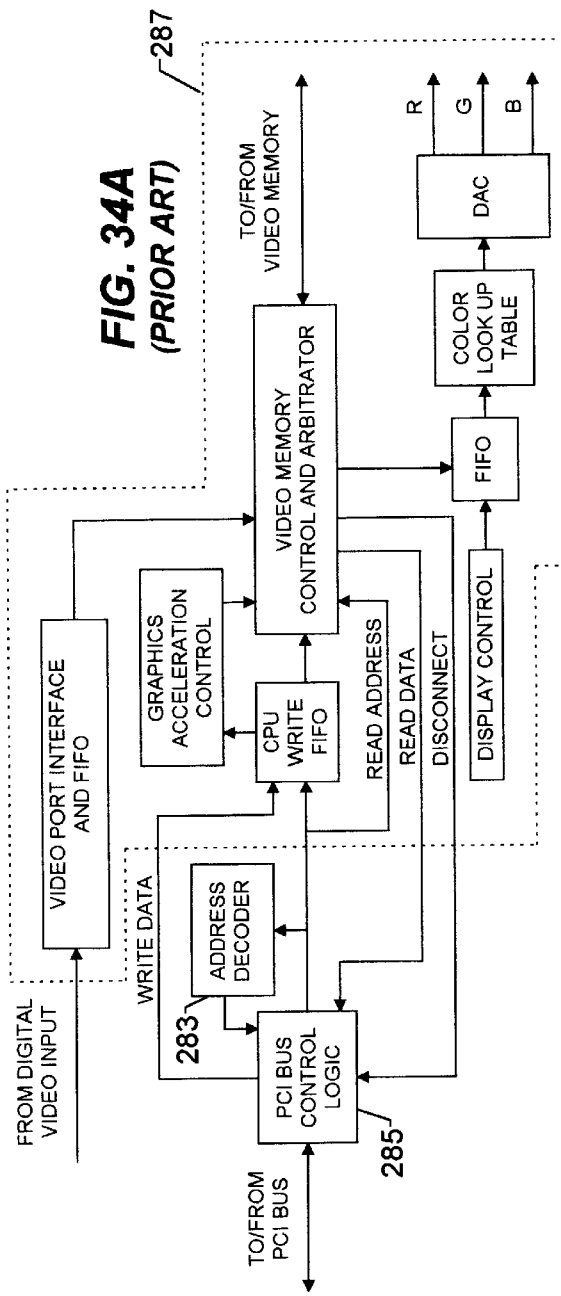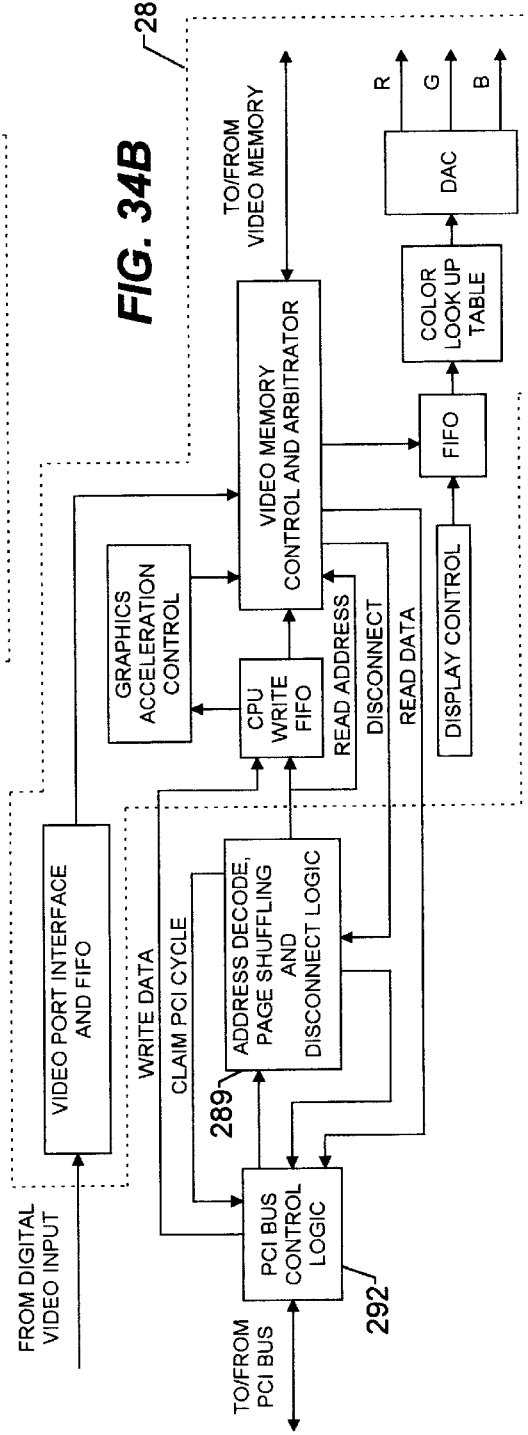

| PARAMETERS | | ROW | LINE | PAGE NUMBERS (IN HEX) | | | |
|---|---|---|---|---|---|---|---|
| | | | | COL 0 | COL 1 | COL 2 | OFFSCREEN |
| HRES | 800 | 0 | 0 | 0 TO 18 | 19 TO 31 | 32 TO 4A | 4B TO 7F |
| VRES | 600 | 0 | 1 | 80 TO 98 | 99 TO B1 | B2 TO CA | CB TO FF |
| PageSize | 32 | 0 | 2 | 100 TO 118 | 119 TO 131 | 132 TO 14A | 14B TO 17F |
| PagesPerCol | 25 | 0 | 599 | 12B80 TO 12B98 | 12B99 TO 12BB1 | 12BB2 TO 12BCA | 12BCB TO 12BFF |
| PagesPerLogicalPitch | 128 | 1 | 600 | 12C00 TO 12C18 | 12C19 TO 12C31 | 12C32 TO 12C4A | 12C4B TO 12C7F |
| ExtraPagesInPitch | 53 | 1 | 601 | 12C80 TO 12C98 | 12C99 TO 12CB1 | 12CB2 TO 12CCA | 12CCB TO 12CFF |
| NumberCols | 3 | 1 | 602 | 12D00 TO 12D18 | 12D19 TO 12D31 | 12D32 TO 12D4A | 12D4B TO 12D7F |
| NumberRows | 2 | 1 | 1023 | 1FF80 TO 1FF98 | 1FF99 TO 1FFB1 | 1FFB2 TO 1FFCA | 1FFCB TO 1FFFF |
| | | 1 | 1024 | 20000 TO 20018 | 20019 TO 20031 | 20032 TO 2004A | 2004B TO 2007F |
| | | 1 | 1025 | 20080 TO 20098 | 20099 TO 200B1 | 200B2 TO 200CA | 200CB TO 200FF |
| | | 1 | 1198 | 25700 TO 25718 | 25719 TO 25731 | 25732 TO 2574A | 2574B TO 2577F |
| | | 1 | 1199 | 25780 TO 25798 | 25799 TO 257B1 | 257B2 TO 257CA | 257CB TO 257FF |

*FIG. 35*

| |
|---|
| LEFT TOP VIDEO MEMORY |
| LEFT TOP MEMORY MAPPED I/O |
| CENTER TOP VIDEO MEMORY |
| CENTER TOP MEMORY MAPPED I/O |
| RIGHT TOP VIDEO MEMORY |
| RIGHT TOP MEMORY MAPPED I/O |
| LEFT BOTTOM VIDEO MEMORY |
| LEFT BOTTOM MEMORY MAPPED I/O |
| CENTER BOTTOM VIDEO MEMORY |
| CENTER BOTTOM MEMORY MAPPED I/O |
| RIGHT BOTTOM VIDEO MEMORY |
| RIGHT BOTTOM MEMORY MAPPED I/O |
| FIRST BLOCK OF PHYSICAL ADDRESS SPACE RESERVED FOR LOGICAL FRAME BUFFERS — 342A |
| SECOND BLOCK OF PHYSICAL ADDRESS SPACE RESERVED FOR LOGICAL FRAME BUFFERS — 342B |
| THIRD BLOCK OF PHYSICAL ADDRESS SPACE RESERVED FOR LOGICAL FRAME BUFFERS — 342C |
| FORTH BLOCK OF PHYSICAL ADDRESS SPACE RESERVED FOR LOGICAL FRAME BUFFERS — 342D |

FIG. 41

```c
#include <stdio.h>
#define HRES      800
#define VRES      600
#define BYTESPERPIXEL 1
#define PAGESIZE       32
#define PAGESPERCOL   (HRES*BYTESPERPIXEL/PAGESIZE)
#define PAGESPERLOGICALPITCH    128
// compute LUT entries for row 1, col 1
#define ROW    1
define COL    1 void main()
{
        int line_num, col_num, page_num, lut_addr, lut_entry, disconnect_flag;

for(line_num=ROW*VRES; line_num<(ROW+1)*VRES; line_num++)
        {
                for(col_num=COL*PAGESPERCOL; col_num<(COL+1)*PAGESPERCOL; col_num++)
                {
                        page_num = PAGESPERLOGICALPITCH * line_num + col_num;
                        lut_addr = ((page_num&0x01ff80)>>2) + (page_num&0x01f);
                        lut_entry = (line_num - VRES*ROW) * PAGESPERCOL +
                                    (col_num - COL*PAGESPERCOL);
                        disconnect_flag = (col_num==((COL+1)*PAGESPERCOL)-1)?1:0;
                        printf("%d %X %X %X %X\n",line_num, col_num, page_num,
                                            lut_addr, lut_entry, disconnect_flag);
                }
        }
}
```

FIG. 42

| Line | PageInLine | Page | LUT_Addr | LUT_Entry | DisconnectFlag |
|---|---|---|---|---|---|
| 600 | 19 | 12C19 | 4B19 | 0 | 0 |
| 600 | 1A | 12C1A | 4B1A | 1 | 0 |
| 600 | 1B | 12C1B | 4B1B | 2 | 0 |
| 600 | 1C | 12C1C | 4B1C | 3 | 0 |
| 600 | 1D | 12C1D | 4B1D | 4 | 0 |
| 600 | 1E | 12C1E | 4B1E | 5 | 0 |
| 600 | 1F | 12C1F | 4B1F | 6 | 0 |
| 600 | 20 | 12C20 | 4B00 | 7 | 0 |
| 600 | 21 | 12C21 | 4B01 | 8 | 0 |
| 600 | 22 | 12C22 | 4B02 | 9 | 0 |
| 600 | 23 | 12C23 | 4B03 | A | 0 |
| 600 | 24 | 12C24 | 4B04 | B | 0 |
| 600 | 25 | 12C25 | 4B05 | C | 0 |
| 600 | 26 | 12C26 | 4B06 | D | 0 |
| 600 | 27 | 12C27 | 4B07 | E | 0 |
| 600 | 28 | 12C28 | 4B08 | F | 0 |
| 600 | 29 | 12C29 | 4B09 | 10 | 0 |
| 600 | 2A | 12C2A | 4B0A | 11 | 0 |
| 600 | 2B | 12C2B | 4B0B | 12 | 0 |
| 600 | 2C | 12C2C | 4B0C | 13 | 0 |
| 600 | 2D | 12C2D | 4B0D | 14 | 0 |
| 600 | 2E | 12C2E | 4B0E | 15 | 0 |
| 600 | 2F | 12C2F | 4B0F | 16 | 0 |
| 600 | 30 | 12C30 | 4B10 | 17 | 0 |
| 600 | 31 | 12C31 | 4B11 | 18 | 1 |
| 601 | 19 | 12C99 | 4B39 | 19 | 0 |
| 601 | 1A | 12C9A | 4B3A | 1A | 0 |
| 601 | 1B | 12C9B | 4B3B | 1B | 0 |
| 601 | 1C | 12C9C | 4B3C | 1C | 0 |
| 601 | 1D | 12C9D | 4B3D | 1D | 0 |
| 601 | 1E | 12C9E | 4B3E | 1E | 0 |
| 601 | 1F | 12C9F | 4B3F | 1F | 0 |
| 601 | 20 | 12CA0 | 4B20 | 20 | 0 |
| 601 | 21 | 12CA1 | 4B21 | 21 | 0 |
| 601 | 22 | 12CA2 | 4B22 | 22 | 0 |
| 601 | 23 | 12CA3 | 4B23 | 23 | 0 |
| 601 | 24 | 12CA4 | 4B24 | 24 | 0 |
| 601 | 25 | 12CA5 | 4B25 | 25 | 0 |
| 601 | 26 | 12CA6 | 4B26 | 26 | 0 |
| 601 | 27 | 12CA7 | 4B27 | 27 | 0 |
| 601 | 28 | 12CA8 | 4B28 | 28 | 0 |
| 601 | 29 | 12CA9 | 4B29 | 29 | 0 |
| 601 | 2A | 12CAA | 4B2A | 2A | 0 |
| 601 | 2B | 12CAB | 4B2B | 2B | 0 |
| 601 | 2C | 12CAC | 4B2C | 2C | 0 |
| 601 | 2D | 12CAD | 4B2D | 2D | 0 |
| 601 | 2E | 12CAE | 4B2E | 2E | 0 |
| 601 | 2F | 12CAF | 4B2F | 2F | 0 |
| 601 | 30 | 12CB0 | 4B30 | 30 | 0 |
| 601 | 31 | 12CB1 | 4B31 | 31 | 1 |

*FIG. 43A*

| Line | PageInLine | Page | LUT_Addr | LUT_Entry | DisconnectFlag |
|---|---|---|---|---|---|
| 1023 | 19 | 1FF99 | 7FF9 | 294F | 0 |
| 1023 | 1A | 1FF9A | 7FFA | 2950 | 0 |
| 1023 | 1B | 1FF9B | 7FFB | 2951 | 0 |
| 1023 | 1C | 1FF9C | 7FFC | 2952 | 0 |
| 1023 | 1D | 1FF9D | 7FFD | 2953 | 0 |
| 1023 | 1E | 1FF9E | 7FFE | 2954 | 0 |
| 1023 | 1F | 1FF9F | 7FFF | 2955 | 0 |
| 1023 | 20 | 1FFA0 | 7FE0 | 2956 | 0 |
| 1023 | 21 | 1FFA1 | 7FE1 | 2957 | 0 |
| 1023 | 22 | 1FFA2 | 7FE2 | 2958 | 0 |
| 1023 | 23 | 1FFA3 | 7FE3 | 2959 | 0 |
| 1023 | 24 | 1FFA4 | 7FE4 | 295A | 0 |
| 1023 | 25 | 1FFA5 | 7FE5 | 295B | 0 |
| 1023 | 26 | 1FFA6 | 7FE6 | 295C | 0 |
| 1023 | 27 | 1FFA7 | 7FE7 | 295D | 0 |
| 1023 | 28 | 1FFA8 | 7FE8 | 295E | 0 |
| 1023 | 29 | 1FFA9 | 7FE9 | 295F | 0 |
| 1023 | 2A | 1FFAA | 7FEA | 2960 | 0 |
| 1023 | 2B | 1FFAB | 7FEB | 2961 | 0 |
| 1023 | 2C | 1FFAC | 7FEC | 2962 | 0 |
| 1023 | 2D | 1FFAD | 7FED | 2963 | 0 |
| 1023 | 2E | 1FFAE | 7FEE | 2964 | 0 |
| 1023 | 2F | 1FFAF | 7FEF | 2965 | 0 |
| 1023 | 30 | 1FFB0 | 7FF0 | 2966 | 0 |
| 1023 | 31 | 1FFB1 | 7FF1 | 2967 | 1 |
| 1024 | 19 | 20019 | 19 | 2968 | 0 |
| 1024 | 1A | 2001A | 1A | 2969 | 0 |
| 1024 | 1B | 2001B | 1B | 296A | 0 |
| 1024 | 1C | 2001C | 1C | 296B | 0 |
| 1024 | 1D | 2001D | 1D | 296C | 0 |
| 1024 | 1E | 2001E | 1E | 296D | 0 |
| 1024 | 1F | 2001F | 1F | 296E | 0 |
| 1024 | 20 | 20020 | 0 | 296F | 0 |
| 1024 | 21 | 20021 | 1 | 2970 | 0 |
| 1024 | 22 | 20022 | 2 | 2971 | 0 |
| 1024 | 23 | 20023 | 3 | 2972 | 0 |
| 1024 | 24 | 20024 | 4 | 2973 | 0 |
| 1024 | 25 | 20025 | 5 | 2974 | 0 |
| 1024 | 26 | 20026 | 6 | 2975 | 0 |
| 1024 | 27 | 20027 | 7 | 2976 | 0 |
| 1024 | 28 | 20028 | 8 | 2977 | 0 |
| 1024 | 29 | 20029 | 9 | 2978 | 0 |
| 1024 | 2A | 2002A | A | 2979 | 0 |
| 1024 | 2B | 2002B | B | 297A | 0 |
| 1024 | 2C | 2002C | C | 297B | 0 |
| 1024 | 2D | 2002D | D | 297C | 0 |
| 1024 | 2E | 2002E | E | 297D | 0 |
| 1024 | 2F | 2002F | F | 297E | 0 |
| 1024 | 30 | 20030 | 10 | 297F | 0 |
| 1024 | 31 | 20031 | 11 | 2980 | 1 |

FIG. 43B

| Line | PageInLine | Page | LUT_Addr | LUT_Entry | DisconnectFlag |
|---|---|---|---|---|---|
| 1198 | 19 | 25719 | 15D9 | 3A66 | 0 |
| 1198 | 1A | 2571A | 15DA | 3A67 | 0 |
| 1198 | 1B | 2571B | 15DB | 3A68 | 0 |
| 1198 | 1C | 2571C | 15DC | 3A69 | 0 |
| 1198 | 1D | 2571D | 15DD | 3A6A | 0 |
| 1198 | 1E | 2571E | 15DE | 3A6B | 0 |
| 1198 | 1F | 2571F | 15DF | 3A6C | 0 |
| 1198 | 20 | 25720 | 15C0 | 3A6D | 0 |
| 1198 | 21 | 25721 | 15C1 | 3A6E | 0 |
| 1198 | 22 | 25722 | 15C2 | 3A6F | 0 |
| 1198 | 23 | 25723 | 15C3 | 3A70 | 0 |
| 1198 | 24 | 25724 | 15C4 | 3A71 | 0 |
| 1198 | 25 | 25725 | 15C5 | 3A72 | 0 |
| 1198 | 26 | 25726 | 15C6 | 3A73 | 0 |
| 1198 | 27 | 25727 | 15C7 | 3A74 | 0 |
| 1198 | 28 | 25728 | 15C8 | 3A75 | 0 |
| 1198 | 29 | 25729 | 15C9 | 3A76 | 0 |
| 1198 | 2A | 2572A | 15CA | 3A77 | 0 |
| 1198 | 2B | 2572B | 15CB | 3A78 | 0 |
| 1198 | 2C | 2572C | 15CC | 3A79 | 0 |
| 1198 | 2D | 2572D | 15CD | 3A7A | 0 |
| 1198 | 2E | 2572E | 15CE | 3A7B | 0 |
| 1198 | 2F | 2572F | 15CF | 3A7C | 0 |
| 1198 | 30 | 25730 | 15D0 | 3A7D | 0 |
| 1198 | 31 | 25731 | 15D1 | 3A7E | 1 |
| 1199 | 19 | 25799 | 15F9 | 3A7F | 0 |
| 1199 | 1A | 2579A | 15FA | 3A80 | 0 |
| 1199 | 1B | 2579B | 15FB | 3A81 | 0 |
| 1199 | 1C | 2579C | 15FC | 3A82 | 0 |
| 1199 | 1D | 2579D | 15FD | 3A83 | 0 |
| 1199 | 1E | 2579E | 15FE | 3A84 | 0 |
| 1199 | 1F | 2579F | 15FF | 3A85 | 0 |
| 1199 | 20 | 257A0 | 15E0 | 3A86 | 0 |
| 1199 | 21 | 257A1 | 15E1 | 3A87 | 0 |
| 1199 | 22 | 257A2 | 15E2 | 3A88 | 0 |
| 1199 | 23 | 257A3 | 15E3 | 3A89 | 0 |
| 1199 | 24 | 257A4 | 15E4 | 3A8A | 0 |
| 1199 | 25 | 257A5 | 15E5 | 3A8B | 0 |
| 1199 | 26 | 257A6 | 15E6 | 3A8C | 0 |
| 1199 | 27 | 257A7 | 15E7 | 3A8D | 0 |
| 1199 | 28 | 257A8 | 15E8 | 3A8E | 0 |
| 1199 | 29 | 257A9 | 15E9 | 3A8F | 0 |
| 1199 | 2A | 257AA | 15EA | 3A90 | 0 |
| 1199 | 2B | 257AB | 15EB | 3A91 | 0 |
| 1199 | 2C | 257AC | 15EC | 3A92 | 0 |
| 1199 | 2D | 257AD | 15ED | 3A93 | 0 |
| 1199 | 2E | 257AE | 15EE | 3A94 | 0 |
| 1199 | 2F | 257AF | 15EF | 3A95 | 0 |
| 1199 | 30 | 257B0 | 15F0 | 3A96 | 0 |
| 1199 | 31 | 257B1 | 15F1 | 3A97 | 1 |

FIG. 43C

METHOD AND APPARATUS FOR ADDRESSING MULTIPLE FRAME BUFFERS

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

This invention relates to image data storage, especially to an improved method of addressing high resolution image data that is stored in a plurality of frame buffers where each of the frame buffers are coupled to one or more video streams.

It is well known that the majority of computers and software applications in current operation utilize a graphical user interface (GUI) due to the relative ease of use provided compared to older text based user interfaces. Certain users of computer systems and display systems benefit from the use of multiple display devices to allow more image data to be displayed simultaneously. For example, this can be for a single software application to have a display area that spans multiple display devices to effectively create a larger higher resolution display. Alternately, a user may desire to have multiple software applications or display windows distributed across the multiple displays, or a computer can be used for multiple users with each of the display devices displaying the software applications of the respective users.

In order to allow display controllers of varying types to be utilized in a computer system, computer operating systems utilize software often referred to as a device driver that is specifically written for a type of display controller. A device driver for a display accepts standardized hardware independent graphics commands from the operating system or from a software application, the device driver then generates the appropriate hardware dependent commands or memory accesses to load the image data into the video memory. Certain older computer operating systems such as Microsoft Windows 3.1 required the device driver to implement all the software functionality required by the graphics commands. Newer operating systems recommend for a device driver to provide only the software functionality for the graphics commands that can be accelerated by the display controller allowing for less device driver software to be written increasing reliability and decreasing development time. An operating system software component such as the DIBENGINE of Microsoft Windows 95 processes the graphics commands not handled by the device driver. Such a device driver is sometimes referred to as a mini-driver. In order for the operating system to be able to process graphics commands, the operating system specifies requirements for the display controller and the memory used for storing display surfaces, such a requirement is for the surface memory to be addressable as a frame buffer. By providing a surface memory that is accessible as a frame buffer the benefits of implementing a mini-driver can be obtained, this is without regard to whether a single image is displayed across the surface or if multiple display windows are distributed across the surface. Various operating systems including, but not limited to Windows 95, Windows 98, Windows CE 2.0 and Windows NT 4.0 recommend the use of a display device that provides a frame buffer. One reference describing the benefits is Microsoft Windows 95 DDK (Device Driver Kit) under the section titled Display Mini-driver Guidelines.

A frame buffer is often defined as a block of addressable memory space for storing image data, where the first address of a collection of addressable locations for storing a pixel is determined from the X coordinate, the Y coordinate, the pixel size or number of addressable locations for storing a pixel, a base address, a pitch and a start address offset from the base address to the storage of the pixel having X and Y coordinates of zero. The pitch is the difference in addresses between the storage of adjacent scan lines which can be greater than the width of a scan line where the width is the number of addresses for storing the pixels in a scan line. The collection of addressable locations for storing a pixel can contain one or more addressable locations, for example a video mode that uses a palette can use a single byte that stores an index into a color table, alternately the collection can contain three bytes for storing the red green and blue components of a color. A frame buffer by this definition differs from a video memory in that a video memory can contain multiple frame buffers for example to store multiple display surfaces.

A display surface that can include the entire graphics area accessed by the operating system for a particular video mode can be used as the primary display surface by the operating system, where the video mode specifies the horizontal resolution, vertical resolution and the pixel storage format. This graphics area is sometimes referred to as the desktop of the GUI. The desktop can include a larger area than that viewable at one time by a display system, this is sometimes referred to as a logical desktop with the user given access to software controls for panning to a desired area within the logical desktop.

Another benefit of a display system providing a frame buffer is that software applications can bypass the Graphics Device Interface (GDI) and device driver and access the primary display surface memory directly maximizing the speed of updating the image data. Display surfaces created for use in Microsoft's DirectDraw are accessible as frame buffers. A reference describing how an application can access a display surface is in Microsoft's Platform SDK and is titled Accessing Surface Memory Directly and is under Graphics and Multimedia Services in the Microsoft DirectX 6.0 section.

On processors such as the Intel 386, 486 and Pentium types or compatibles, logical addresses are added to a segment base address to form what are referred to as linear addresses. The linear addresses are then mapped to physical addresses via page directories and page tables. Computer systems containing memory management hardware with address translation capability such as this allow a virtual memory system to be provided that allows more memory to be seen by the software than is contained in the computers RAM by switching or paging between memory blocks contained on disk and in RAM. Switching is based on whether linear pages are marked as present or not present in RAM. When an address is generated by software that is not present in RAM a page fault is generated and a page fault exception handler performs a page switch and the faulting memory access is re-executed all transparently to the application software. This however results in a reduced execution time due to the page fault handling software and the relatively slow disk access time compared to RAM access time.

For display controllers with a single physical frame buffer, a contiguous number of linear address pages are sequentially mapped to contiguous physical pages in the frame buffer. Most current technology display controllers for driving a single display device provide access to video memory as a frame buffer. However, certain older technology display controllers for driving a single display device do not provide a frame buffer for accessing the video memory, but provide access to the video memory by a technique known as bank switching. Bank switching is used to allow a CPU to access one megabyte of video memory for example by alternately switching one of sixteen banks of sixty-four kilobytes each into the memory address region A0000 to AFFFF to allow software running in real mode to access the entire video memory. When Microsoft introduced Windows 95 there were still many personal computers (PCs) in use that utilized these older technology banked switched display controllers, so in order to allow these bank switching display controllers to utilize a mini-driver, Microsoft provides software known as a Virtual Flat Frame Buffer Device (VFLATD). The VFLATD copies bank switching software written for a specific display controller into a page fault handling routine to allow the page fault handler to switch to the appropriate sixty-four kilobyte bank as needed. This however results in reduced graphics performance due to the necessity of processing the bank switching routines. This performance degradation is particularly severe when pixels along a column of a display are sequentially accessed. A reference on VFLATD is Microsoft's Windows 95 DDK.

A graphics aperture remapping table (GART) is a known address translation method used in Accelerated Graphics Port (AGP) devices for accessing the computer system's RAM memory as graphics memory in the "Execute" usage model. This RAM memory is typically used for storing 3D textures. When the CPU allocates a block of system memory that will be used as AGP graphics memory, there is no guarantee that the memory will be allocated in contiguous pages of RAM memory. The CPU uses its page directories and page tables for accessing the block of memory as if the block was in contiguous memory space. The AGP devices use bus mastering for accessing the system RAM, but the CPU's page directories and page tables are not available to the AGP device for making the memory block contiguous. The GART is an address translation method in an AGP device that is used to make the memory block contiguous to the AGP bus master. The GART output addresses that result from the translation are dictated by the CPU's page directory and page table setup for accessing the block of memory. The GART can be configured such that input addresses to the GART utilized by the AGP device make the block of system RAM map to the end of the local video memory of the AGP device making the devices video memory appear larger. The configuration of the GART just duplicates the page ordering performed by the CPU page directories and page tables, so that the block of memory allocated by the CPU also appears contiguous to the AGP device. A reference on the GART is the Accelerated Graphics Port Interface Specification Revision 1.0 in the section Two Usage Models: "Execute" & "DMA".

A dual display device board called the Duet and manufactured by Appian Graphics is known that utilizes the Virge/MX display controller for generating two video outputs using a single frame buffer and a single display controller. Though this board is capable of utilizing a mini-driver for the two displays, the cost of the board is over four times the cost of two comparable single display controller boards. Besides cost, another disadvantage of such an approach is that video memory must be accessed at very high rates to drive the two displays. This prevents the use of the higher resolutions. Also the number of display devices is limited to two for the single frame buffer.

Multiple display controller boards for driving multiple display utilizing custom designed PCI-PCI bridge circuits to access the multiple display controllers and their associated video memories have a disadvantage of high development costs that result in high prices for these multiple display controller boards.

Another known multiple display approach sold by Stone Microsystems is the AEON TwinS model. This utilizes multiple standard display controller boards each with a video memory of two megabytes. It is apparent that this approach does not utilize a single high resolution frame buffer for accessing the multiple frame buffers as the display modes and multiple display arrangements specified as being supported could not be implemented with address translation based on a page size of 4096 provided by the Intel processors when used with a video memory size of two megabytes per display controller.

Microsoft Windows 98 is the first version of Windows to provide built in support for multiple display devices. A software component called the Display Driver Management Layer (DDML) has been added to the GDI and is used for large desktop support allowing images to span multiple displays. DDML separates the GDI commands into commands for multiple display device drivers and multiple frame buffers. As the DDML uses a display driver and a frame buffer for each of the multiple graphics adapters it turns off device bitmaps, as there is no single frame buffer to write the bitmaps to. Demanding graphics applications for Windows 98, such as computer games and multimedia, often utilize Microsoft's DirectDraw for drawing to a display device as it provides higher performance graphics than is available using the Graphics Device Interface (GDI). Two types of DirectDraw graphics applications are possible, Full-Screen exclusive mode and Normal mode. The Full-Screen type of DirectDraw application gives the application fall access to the display surface, in other words there is no windows title bar or window control buttons as in normal windows applications. Also DirectDraw Full-Screen applications can perform page flipping with the primary surface used for the desktop and can change the palette of the primary surface. The disadvantage of Windows 98 with DirectDraw for Full-Screen exclusive mode applications is that multiple frame buffer spanning is not supported or in other words applications cannot be Full-Multi-Screen applications preventing the use of page flipping across the multiple display desktop. Without page flipping the quality of displaying motion video and animation across the multiple frame buffers is greatly reduced. The Normal type of DirectDraw application appears like a normal windows application with a title bar and window control buttons. With the DDML, when Normal type DirectDraw applications span multiple display devices DirectDraw does not use hardware acceleration, but uses software emulation that decreases graphics performance. One other disadvantage of DDML is that it is not available for use under Windows 95. A reference on DDML is the presentation titled Multiple Monitor Support [HV Track from Meltdown 97. A reference on DirectDraw acceleration in multiple monitor systems can be found in Microsoft's Platform SDK and is titled Devices and Acceleration in MultiMon Systems and is under Graphics and Multimedia Services in the Microsoft DirectX 6.0 section.

Image data stored in video memory surfaces are typically generated by the CPU, however image data may also be obtained from video sources such as, but not limited to cameras, MPEG/DVD decoders and digital television signals. This image data can be displayed if desired as video overlays without overwriting the image data corresponding to the PCs desktop and optionally, still images or motion video can be captured without being displayed. As the resolution of a video source device is increased, the cost of the device also increases as well as the cost of an image acquisition system to interface to the device. By using an array of image sensors with a single lens system or an array of cameras and lenses with a calibrated optical system, a high resolution image can be obtained by using multiple video signals to represent the high resolution video and by using common video sync signals. A system to display and acquire image data from the multiple video signals can be economically provided with multiple displays and multiple display controllers each having a video digitizer with the image data distributed among the video memories associated with the multiple display controllers. Though economical with respect to hardware costs, a disadvantage of such an approach is that existing operating system software, such as Microsoft's DirectDraw video port extensions that require the video data to reside in a single frame buffer, cannot be used. Therefore custom application software must be written to capture the high resolution still images or sequences of high resolution video frames.

BRIEF SUMMARY OF THE INVENTION

It is therefore an object of the present invention to provide a method and apparatus for addressing multiple frame buffers as a single high resolution logical frame buffer. Therefore decreasing the complexity of software for interfacing to the multiple frame buffers, thereby decreasing development time and costs and increasing software reliability. It is also an object of the invention to provide a low cost multiple display system by utilizing standard commercially available components. Creating a single frame buffer allows the use of existing operating system software components to operate on the high resolution image data minimizing the amount of custom software that must be written for accessing the multiple frame buffers. Storing the high resolution image data in multiple frame buffers enables the high resolution image data to be displayed utilizing multiple standard resolution video outputs or enables the acquisition of the high resolution image data from multiple standard resolution video sources. For the purposes of this invention, the term high resolution is relative to the lower resolution video streams being combined to form a logically higher resolution device. An embodiment of the invention distributes image data corresponding to a standard display resolution across multiple standard display devices for the purpose of creating a display that is larger in size. For this embodiment, though the image data is not high resolution, the display resolution is still increased by utilizing interpolated zooming before displaying the image data.

The fact that the image data is stored in multiple frame buffers in physical address space prevents it from being a single high resolution frame buffer in physical address space. This is because the pixel storage for adjacent pixels within a logical scan line of the high resolution image will exhibit a physical address discontinuity when crossing between frame buffers in a two column arrangement of frame buffers. However, this is also for a single column arrangement of frame buffers where logical scan lines contain only pixel data from a single physically addressable frame buffer. Here there is a discontinuity between the storage of the last pixel in the last scan line of a frame buffer and the storage of the first pixel in the first scan line of the frame buffer below it. This is due to display controllers having more video memory than required for a particular video mode. Also contributing to this address discontinuity is display controllers typically provide address space for memory mapped input output (NMO) as well as often providing address spaces for both Intel type (little-endian) byte ordering and Motorola type (big-endian) byte ordering.

Despite physical address discontinuities at frame buffer crossover boundaries, addressing of the multiple frame buffers as a single logical frame buffer is provided for by the current invention. This is provided by first dividing the image data into pages using a page size appropriate for both the video mode and arrangement of the physical frame buffers within the high resolution image. Then a pitch is determined for each of the physical frame buffers that enables the alignment of the memory pages at the frame buffer crossovers. Then for video modes utilizing multiple bytes per pixel, the collection of bytes representing the pixels are aligned on the page boundaries at the frame buffer crossovers. Then linear address space is reserved for storing a single high resolution frame buffer. Then address translation hardware is configured to shuffle the mapping of the pages such that the pages within the reserved linear address space are routed to the appropriate pages within the multiple physical frame buffers to create a single high resolution frame buffer when accessed with an appropriate logical pitch.

By creating a single high resolution logical frame buffer accessible by CPU logical addresses, one advantage provided is the task of writing a device driver for accessing the multiple frame buffers is significantly reduced in complexity. The single logical frame buffer enables the use of what is known as a mini-driver which allows an operating system software component such as, but not limited to, the DIBENGINE of Microsoft Windows 95/98 to access the multiple frame buffers in a device independent manner. The operating system component by way of the single logical frame buffer handles any graphics commands that the device driver chooses not to handle. For example, to maximize performance the device driver only handles the graphics commands that benefit from hardware acceleration by the device driver implementing the necessary hardware dependent instructions for these commands. This solves the problem of having to write device driver software to process every graphics command which would increase development time and costs, decrease software reliability and reduce graphics performance by having to implement extra software for dividing the graphics commands into commands for each of the frame buffers.

Another advantage is the single logical frame buffer can be accessed directly by software applications such a DirectDraw application. This prevents having to perform graphics commands to access individual pixel data that is much slower then accessing the frame buffer directly.

Another advantage of creating a single logical frame buffer is for the case of interfacing to multiple video sources to effectively create a higher resolution video source. By providing a single logical frame buffer an existing standardized low level software interface of an operating system intended for single video sources can utilize the single logical frame buffer as the target surface for a logical high resolution video port. The low level software interface can be accessed by software applications for controlling the display and capture of data from the logical high resolution video port. However, more preferably the low level software interface is accessed by a standardized higher level software interface allowing control of the logical video port from software applications with simple to use high level instructions. An example of a low level software interface is Microsoft's DirectDraw video port extensions and an example of a high level software interface is that provided by Microsoft's DirectShow. This solves the problem of having to write custom low level and high level software for interfacing to the multiple frame buffers as a single high resolution video port.

Though the use of custom PCI-PCI bridge circuitry results in high costs for multiple display controller boards, it does provide the benefit of allowing more display controllers to be installed in a given number of computer expansion slots. By incorporating page shuffling address translation circuitry into a custom PCI-PCI bridge and by selecting a page size that allows an integer number of pages in the width of a desired video mode, the current invention provides the advantage of making optimum use of video memory.

Though Microsoft Windows 98 has support for multiple displays without requiring a single logical frame buffer by using the DDML, providing a single logical frame buffer provides advantages when DirectDraw is used with Windows 98. For the type of DirectDraw applications known as full-screen exclusive mode, Windows 98 limits these applications to a single frame buffer. In other words, these applications cannot be full-multi-screen applications that span the multiple frame buffers. The use of the single logical frame buffer provides the advantage of allowing full-screen exclusive mode applications to be full-multi-screen applications that span the multiple frame buffers enabling the use of page flipping across the multiple frame buffers which is essential for high quality video playback and animation. Providing the single frame buffer also provides the advantage of enabling the other features of this DirectDraw mode to be used across the multiple frame buffers, such as allowing the application to change the palette of the primary surface or change the effective resolution of the multiple displays. Another type of DirectDraw application uses what is known as the normal cooperative level. This type of DirectDraw application looks like a normal Windows application with a movable and resizable display window. A disadvantage of Windows 98 and the DDML with respect to this type of DirectDraw application is that hardware acceleration is not used when the display window spans two or more frame buffers. Microsoft recommends to maximize performance of this type of DirectDraw application that the application keep track of which part of their display window resides on which frame buffer and perform separate BitBLTs (bit block transfers) to each device. A disadvantage of this is the software applications need to be written specifically for the multiple frame buffer system. This prevents the performance from being maximized for existing software applications. An advantage of using a single logical frame buffer is the applications do not to have to perform this processing to maximize performance. The performance gain is accomplished by incorporating the software to perform multiple frame buffer BitBLTs into a DirectDraw HAL (Hardware Abstraction Layer) as well as incorporating any other DirectDraw functions for which hardware acceleration is available.

Still further objects and advantages of the invention will become apparent from a consideration of the ensuing description and the accompanying drawings.

BRIEF DESCRIPTION OF THE SEVERAL VIEWS OF THE DRAWING

FIGS. 3A and 3B show the effect of the pitch for two conventional frame buffers.

FIG. 4 is a most basic block diagram of the invention illustrating addresses from a single large frame buffer are converted into addresses of multiple smaller frame buffers.

FIG. 6 is a table for determining page sizes appropriate for common display resolutions and color depths.

FIGS. 7A and 7B show the multiple frame buffers need not all be the same size and need not be rectangular.

FIG. 20 is a table listing offscreen widths to get a pitch suitable for a single column display arrangement.

FIG. 22 shows an arrangement of more than two columns of physical frame buffers that can be implemented with a page size limitation of 4096.

FIGS. 23A and 23B show an arrangement of two displays of differing resolutions.

FIG. 24A shows twelve displays in a six column by two row arrangement that are driven from six dual output display controllers in accordance with a second embodiment of the invention.

FIG. 24B shows six frame buffers in a three column by two row arrangement used for storing the image data for the twelve displays.

FIG. 24C shows six frame buffers in a two column by three row arrangement used for storing the image data for the twelve displays with a 16:9 aspect ratio.

FIG. 31A shows four frame buffers in a two column arrangement with selected areas within the frame buffers used for calibrating the optics of a four projector display system by overlapping regions of the four projected displays when calibrating in accordance with a fifth embodiment of the invention.

FIG. 31B shows the resulting display size of the four projectors after calibrating.

FIGS. 32A, 32B, and 32C show sample calibration patterns for vertical and horizontal overlapping regions and for a corner overlapping region.

FIG. 34A is a block diagram of a conventional display controller.

FIG. 34B is a block diagram of an ASIC that integrates address translation circuitry with a display controller core to enable the use of small page sizes in accordance with a seventh embodiment of the invention.

FIG. 35 is a table listing a range of logical page numbers that are input to multiple display controllers containing small page size address translation circuitry for selected logical scan lines in a two row by three column arrangement of frame buffers with resolutions of 800×600 with 8 bits per pixel and using a page size of thirty-two.

FIG. 41 shows reserved memory areas for six display controllers and reserved areas for four physical memory blocks with the latter used for addressing the logical frame buffers.

FIG. 42 is a program listing in C language for computing the look up table entries.

FIGS. 43A, 43B, and 43C are tables listing the results of the look up table computation for selected lines within a selected frame buffer.

DETAILED DESCRIPTION OF THE INVENTION

Figure 1:
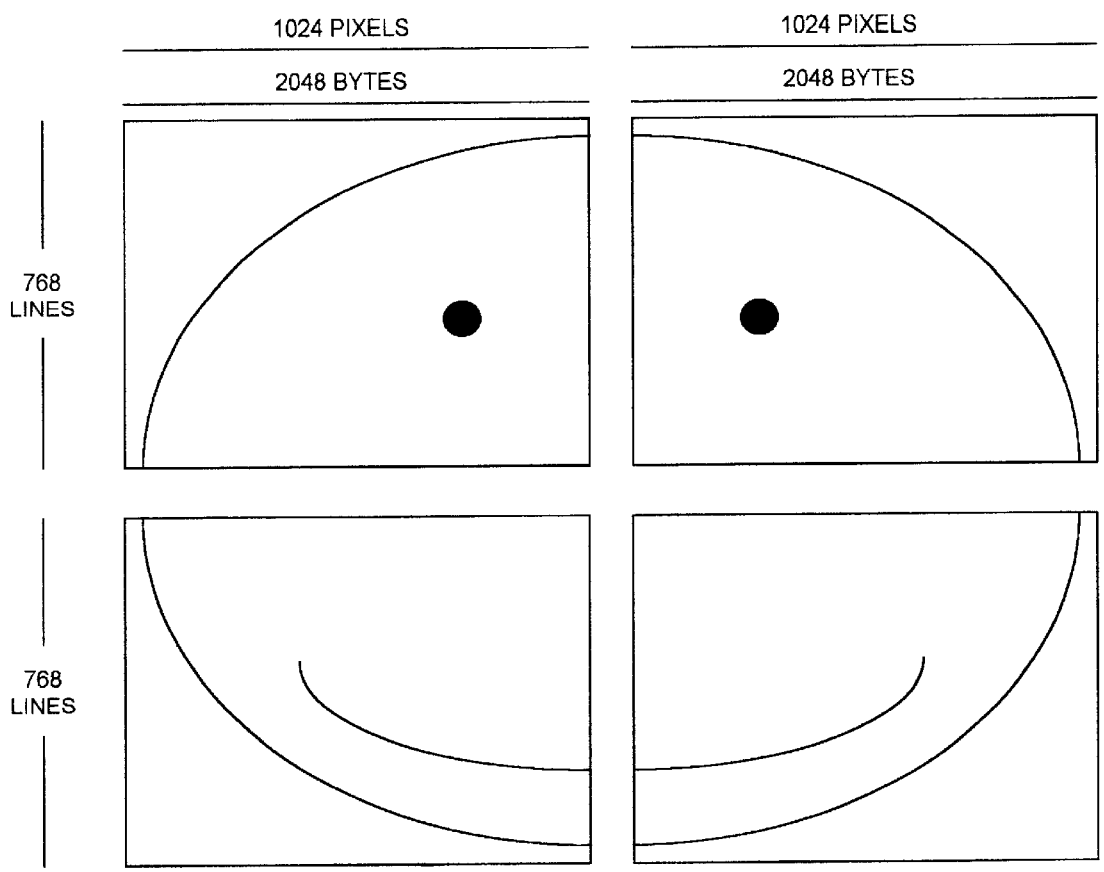
FIG. 1 shows a high resolution display comprised of four standard resolution displays.

FIG. 1 shows a high resolution image displayed using four standard resolution display devices where the high resolution image data is stored in four frame buffers. However, a CPU addresses the image data as a single logical frame buffer after a display device driver configures page shuffling address translation hardware. In this example each of the displays present the same amount of image data with the amount of data corresponding to 1024 horizontal pixels, 768 vertical pixels, and 16 bits or two bytes used for storing each pixel. The number of bytes to store one horizontal line in one of the displays is 2048 or 1024 horizontal pixels multiplied by two bytes per pixel.

Figure 2:
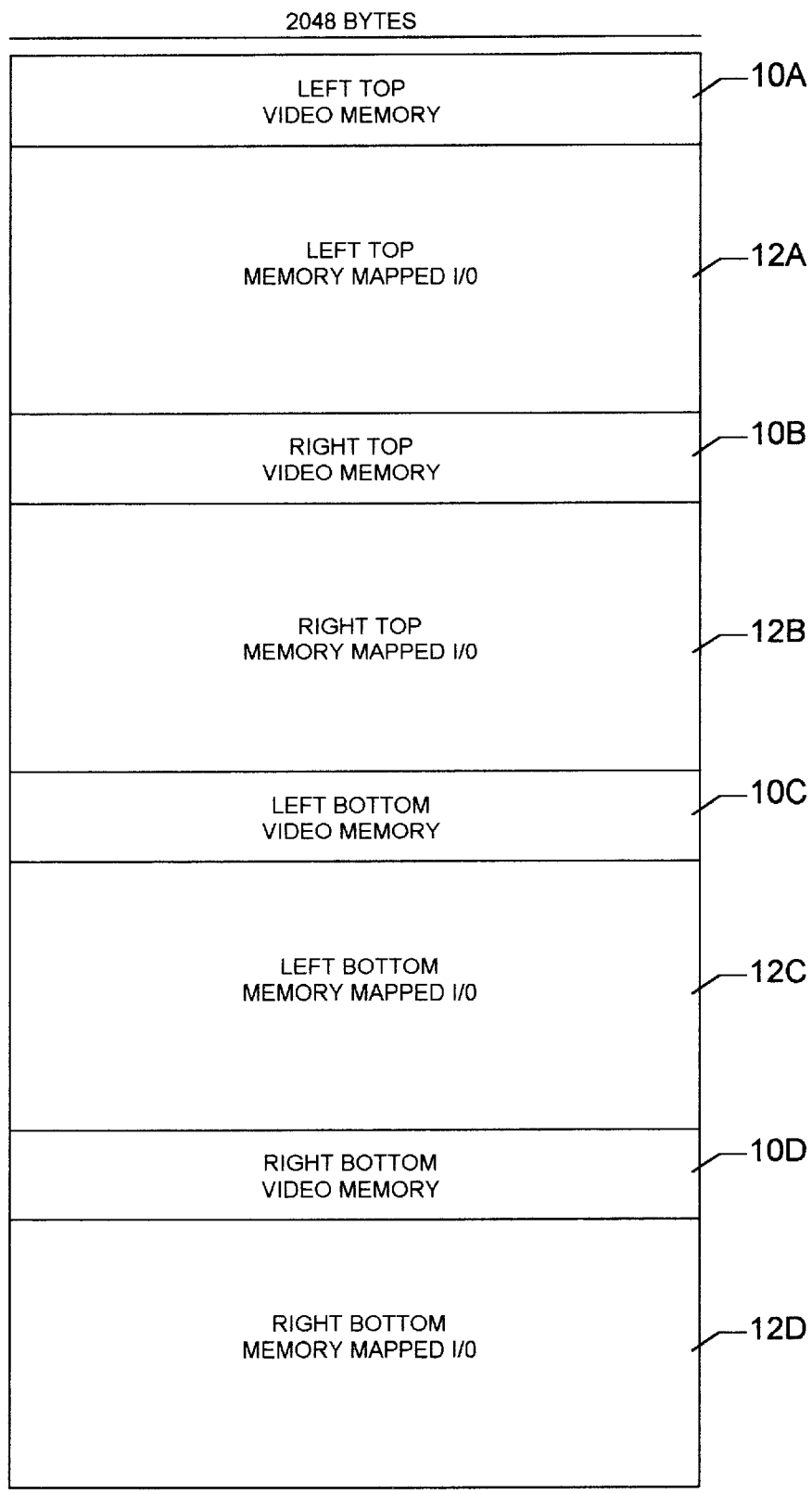
FIG. 2 shows physical memory areas reserved for four display controllers.

FIG. 2 shows physical memory areas reserved for four display controllers comprised of video memory area 10A to video memory area 10D and MMIO area 12A to MMIO area 12D. In addition to the MMIO area, display controllers often consume additional physical memory address space (not shown) to allow the video memory to be addressed with additional types of byte ordering allowing the display controller to be used with Intel type processors or Motorola type processors for example. The reserved memory areas show the physical memories associated with the four display controllers in the order starting with the left top display controller followed by the right top, left bottom, and right bottom. The reserved memory areas also show the physical memory associated with the four display controllers to occupy a contiguous range of physical memory space. It will be apparent after reviewing this specification that no specific order is necessary and that a contiguous memory region is not required. The locations and order of these four physical memory regions are typically initialized by the PCI plug-and-play BIOS.

FIG. 3A shows how adjacent horizontal lines of image data 14A are stored in contiguous addresses when the pitch used for accessing the frame buffer equals the width in a conventional frame buffer. FIG. 3B shows in another conventional frame buffer, when the pitch is greater than the width there is a number of addressable memory locations between the storage of the last pixel in a scan line of the image data 14B and the first pixel in the following scan line. This creates an offscreen region 16 that does not store image data corresponding to the frame buffer.

FIG. 4 shows a most basic block diagram of the invention, where CPU 18 presents logical addresses 20 that correspond to a high resolution frame buffer to a page shuffling address translator 22 that outputs physical addresses 24 corresponding to physical frame buffer 26A to physical frame buffer 26N. This address translation makes adjacent pixels in the logical frame buffer that correspond to pixels in different physical frame buffers to appear to be in contiguous memory when accessed by the CPU even though there is an address discontinuity with respect to the physical storage of these pixels. This address discontinuity is apparent from the example reserved physical memory areas shown in FIG. 2. Prior to configuring the page shuffling address translator 22, an appropriate page size must be determined for the physical frame buffer resolutions and the arrangement of the frame buffers within the high resolution display. Also the pixel data must be aligned properly in both the logical frame buffer and in physical frame buffer 26A to physical frame buffer 26N.

Figure 5:
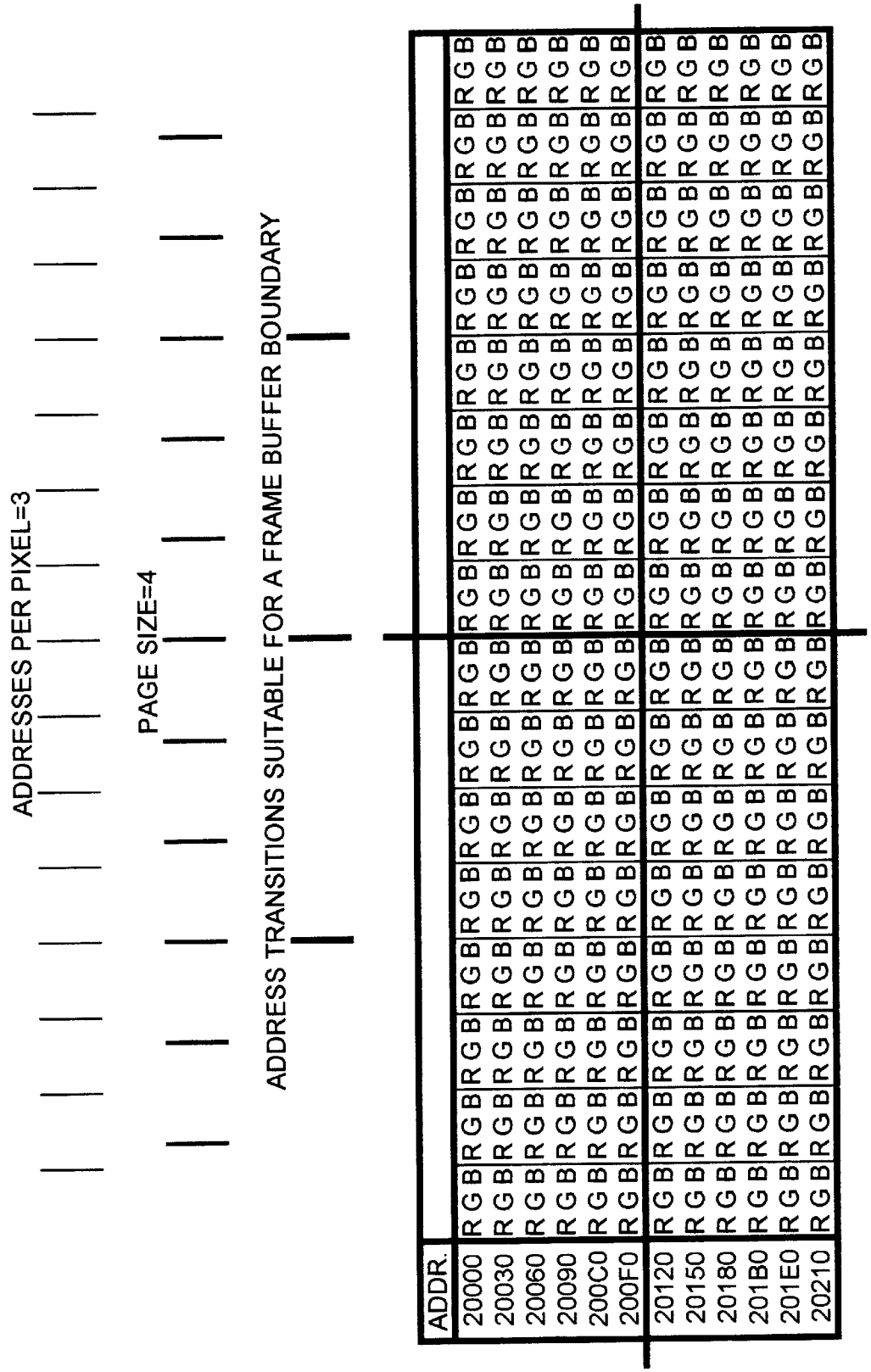
FIG. 5 shows an example memory layout for four displays to introduce the image data alignment and page size requirements for the invention.

FIG. 5 is an example with four frame buffers having an unrealistically low resolution, that is used to describe an alignment requirement for the image data. FIG. 5 shows a two by two arrangement of frame buffers each with a resolution of 8 by 6 and with three addresses used for storing a pixel. One address stores a color component of the pixel, where R, G, and B shown represent red, green, and blue. The addresses shown correspond to desired logical addresses for addressing the four frame buffers as a single frame buffer. A page size is selected such that the storage for the three memory locations that comprise a logical pixel is not divided between physical frame buffers and such that no memory page spans multiple physical frame buffers. A page size of four is appropriate for this example. A page alignment such as this allows the page shuffling address translator to route the logical pages to the appropriate physical pages. For this example the display controllers are configured to utilize a physical pitch of 24 and the logical pitch used by software for addressing the logical frame buffer is set to 48.

FIG. 6 is a table listing page sizes appropriate for satisfying the alignment requirements as in the previous example, but for realistic frame buffer resolutions at pixel formats requiring from one to four addresses per pixel. The page size selected must result in an integer number of pages in the width of a physical scan line to allow the image data to be aligned properly. The table lists the value of the width divided by the page size, for page sizes from 32 to 4096. When this value is an integer the letter Y is used to indicate the page size is appropriate for the resolution and number of addresses per pixel shown to the far left. There can be more than one page size that is appropriate, but as the page size gets smaller the complexity of the address translator increases. For example a page size of one can be used in an embodiment of the invention, but the address translator would have to translate the address of every component of every pixel in the high resolution logical frame buffer. However there is a tradeoff with regard to the page size as decreasing the page size increases the flexibility of utilizing a greater number of frame buffer resolutions.

Figures 7A, 7B:
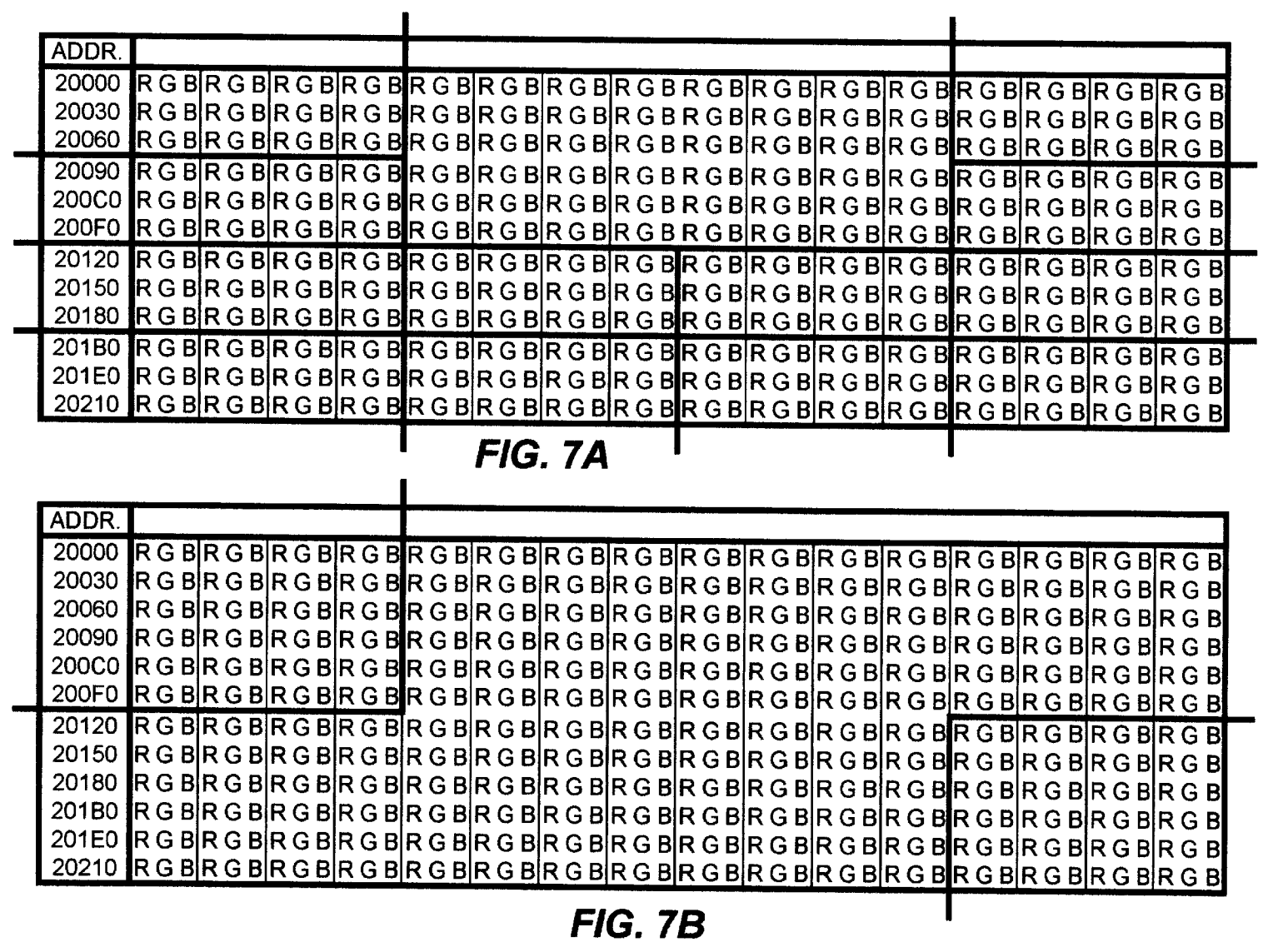

FIG. 7A shows one frame buffer four times the area of the others where the alignment requirements are satisfied, illustrating it is not necessary for the multiple frame buffers being addressed by a single logical frame buffer to be of the same resolution. FIG. 7B shows there is no need for each of the physical frame buffers to be associated with a rectangular area of the logical frame buffer. FIG. 7B shows a logical frame buffer used to access three physical frame buffers with one not rectangular. A non-rectangular area of the logical frame buffer can be mapped to a physical frame buffer that always has an area of its display reserved for a dedicated purpose such as for a video window that receives its image data from a video port for example. By routing the non-rectangular area for this example allows the addresses within the logical frame buffer that would otherwise not be displayable due to the reserved display area to be routed to another physical frame buffer.

Figure 8:
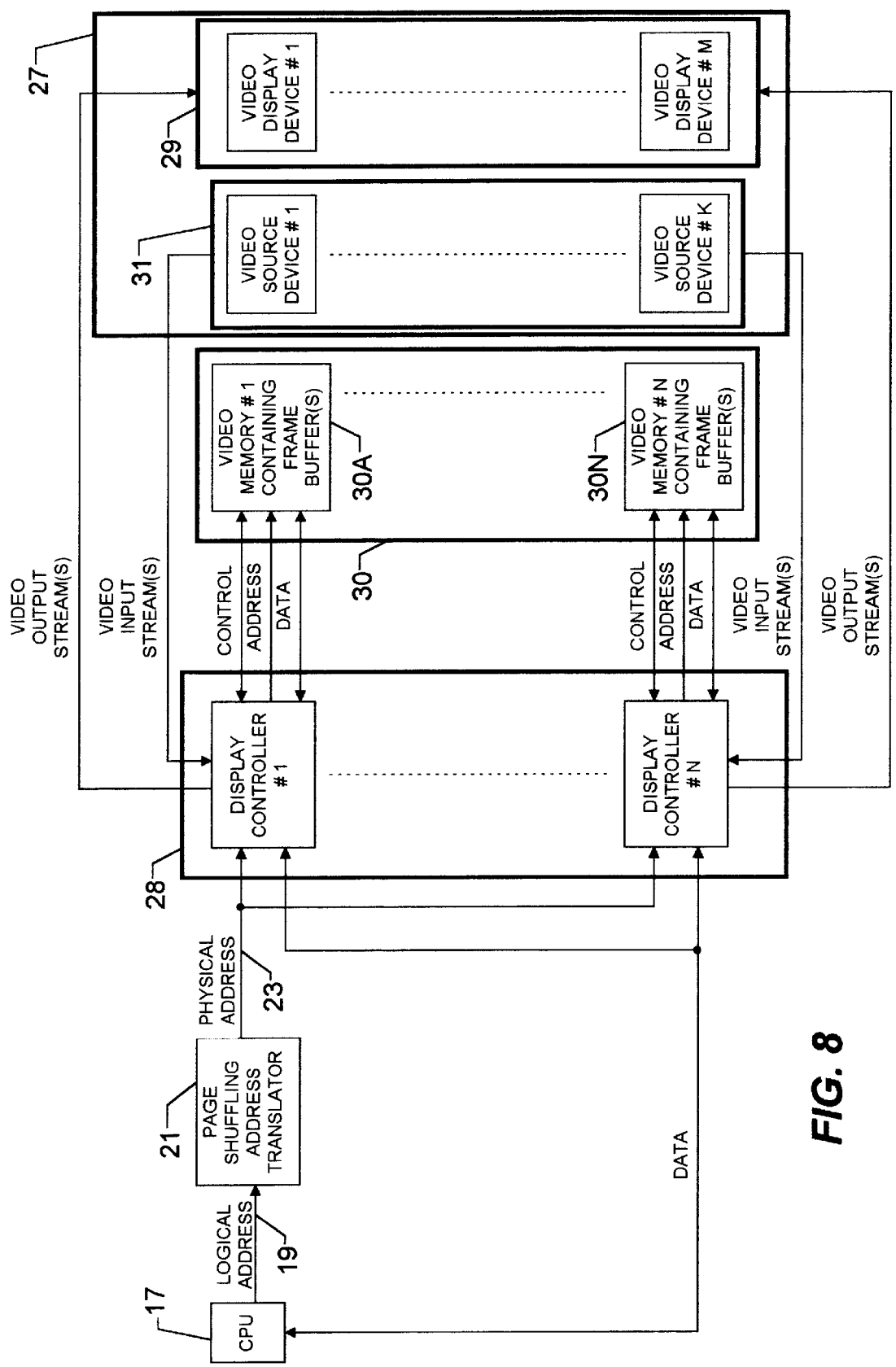
FIG. 8 is a block diagram illustrating how software addresses can be coupled to the video memory addresses in an embodiment of the invention.

FIG. 8 illustrates how a logical address 19 is coupled to a physical address 23 by page shuffling address translator 21 in an embodiment of the invention. A display controller subsystem 28 includes memory control circuitry that allows a CPU 17 to write or read data from a video memory subsystem 30. The display controller subsystem 28 also couples the video memory subsystem 30 to a video device subsystem 27. The display controller subsystem 28 includes video control circuitry that either allows video output streams to be generated from data read from video memory subsystem 30, or allows data to be written to video memory subsystem 30 from video input streams, or both. The video output streams go to a video display device subsystem 29 and the video input streams come from a video source device subsystem 31. Any of video memory 30A to video memory 30N can contain two frame buffers that correspond to two video streams, for example if coupled to a dual output display controller that utilizes a frame buffer for each video stream. Also, any of video memory 30A to video memory 30N can contain a single frame buffer that corresponds to two simultaneous video streams, for example if coupled to a dual output display controller that utilizes a single frame buffer for generating the two video streams. The page shuffling address translator converts the addresses of at least one logical frame buffer into addresses of at least two physical frame buffers. Page shuffling address translator 21, enables CPU 17 to access a single logical frame buffer for writing image data that corresponds to multiple frame buffers and associated multiple video stream outputs. Also, CPU 17 can access a single logical frame buffer for reading image data that corresponds to multiple frame buffers and associated multiple video stream inputs. The single logical frame buffer enables existing software interfaces intended for a single video output stream or single video input stream to be used for displaying image data or capturing image data from the multiple frame buffers, respectively.

Figure 9:
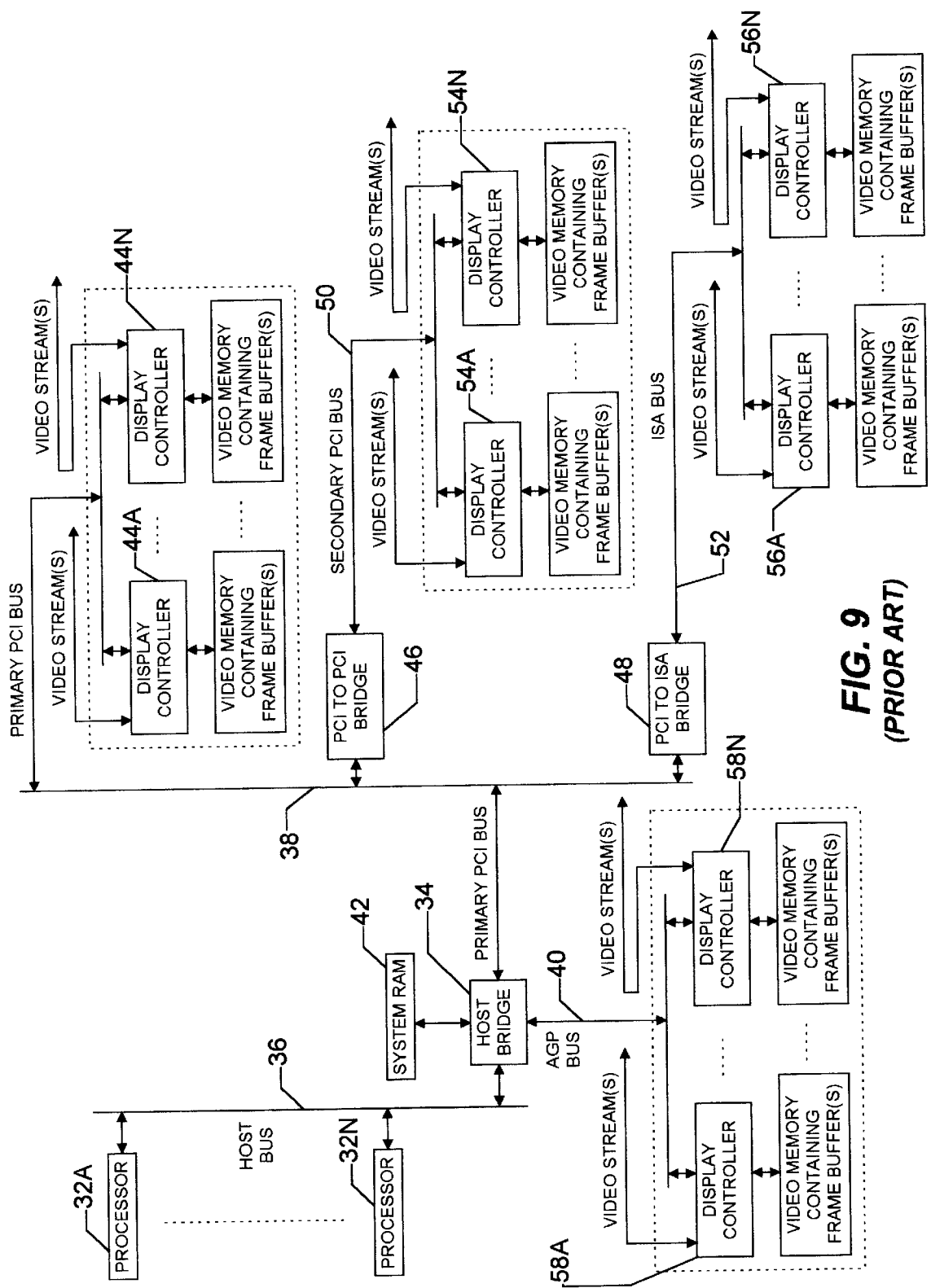
FIG. 9 is a block diagram of a conventional computer system in which an embodiment of the invention can be implemented.

FIG. 9 shows a conventional computer system containing multiple display controllers in which an embodiment of the invention can be implemented. Processors 32A to 32N are multiple processors, such as the Pentium II, in a single computer system. The CPU of any of the processors can generate logical addresses, but an embodiment of the invention needs not have multiple processors. A host bridge 34 is used for interfacing the processor host bus 36 to the primary PCI bus 38, the AGP bus 40, and the system RAM 42. Primary PCI bus 38 is shown interfacing to primary PCI bus display controller 44A to primary PCI bus display controller 44N. Primary PCI bus 38 is shown interfacing to PCI to PCI bridge 46 and PCI to ISA bridge 48 to connect to secondary PCI bus 50 and ISA bus 52 respectively. Secondary PCI bus 50 is shown interfacing to secondary PCI bus display controller 54A to secondary PCI bus display controller 54N. ISA bus 52 is shown interfacing to ISA bus display controller 56A to ISA bus display controller 56N. AGP bus 40 is shown interfacing to AGP bus display controller 58A to AGP bus display controller 58N. The video streams shown interfacing to the display controllers can include video stream inputs as well as video stream outputs.

In an embodiment that uses conventional components as shown in FIG. 9, the address translation required for page shuffling can be performed by the processor's integrated address translation hardware that is typically used for implementing a virtual memory system to allow hard disk space to be used as RAM. The page sizes provided by a processor's page translation hardware however are typically limited. For example, of the page sizes shown in the table in FIG. 6, a Pentium II processor only supports a page size of 4096. The table of FIG. 6 lists appropriate page sizes for various frame buffer resolutions for one type of embodiment, but embodiments will also be shown utilizing a restricted page size, such as 4096.

A processor that includes write combining hardware such as processors in the Intel P6 family of processors is a preferred processor for an embodiment of the invention. Two processors included in the P6 family are the Pentium II and Pentium Pro. Write combining is a known method, that stores writes within a range of physical addresses in a cache memory integrated with the processor allowing the multiple writes to be sent to the physical memory as a burst access thus increasing performance. Write combining is appropriate for video memory as writes to the cache memory may collapse. Collapsing of data is when multiple writes are performed to the same memory location before the burst access is performed causing only the data from the last of the multiple writes to reach the physical memory destination. This is not appropriate for MMIO areas of the display controllers, but is appropriate for image data. The registers used to enable write combining in P6 type processors are the Memory Type Range Registers (MTRRs) and the use of these is described in the P6 type processor data sheets. Write combining can be enabled for specified physical address ranges, but not logical address ranges, so for an embodiment of the invention, the MTRRs are configured for the physical address ranges of the multiple frame buffers. This is for any MTRRs that are not in use and not reserved by the operating system.

Known types of components for interfacing to PCI and AGP buses are single function devices and multiple function devices. Multiple function devices have more than one function such as a network interface and a modem that share a common bus interface circuit in a single ASIC (Application Specific Integrated Circuit). The PCI and AGP buses allow up to eight functions per device. One advantage of multiple function devices is more functions can be implemented for a given interface circuit, where an interface circuit allows a limited number of electrical loads and device slots for installing circuit boards. Multiple display controller functions on the AGP bus 40, primary PCI bus 38, or secondary PCI bus 50 can be implemented with single function or multifunction devices. However implementing two single function display controller devices on an AGP interface requires great care in the layout of the printed circuit board due to the high speed of the AGP bus.

PCI to PCI bridge 46 can be mounted on a computer motherboard or can be mounted on a PCI add-in board containing multiple display controllers and inserted into a PCI slot connected to primary PCI bus 38. Another type of circuit known as a peer host PCI bridge (not shown), connects two PCI buses to the host at the same hierarchical level allowing less latency time for performing memory accesses as compared to memory accesses across a PCI to PCI bridge. Also, additional PCI buses can be added to a system by adding multiple PCI to PCI bridges (not shown) to the primary PCI bus to create multiple secondary buses. Also, PCI to PCI bridges can be added to a secondary bus (not shown) to create a tertiary PCI bus, though with increased latency time for memory accesses through two PCI to PCI bridges. When performing mostly burst accesses to video memory, the latency time has less impact on system performance.

Figure 10:
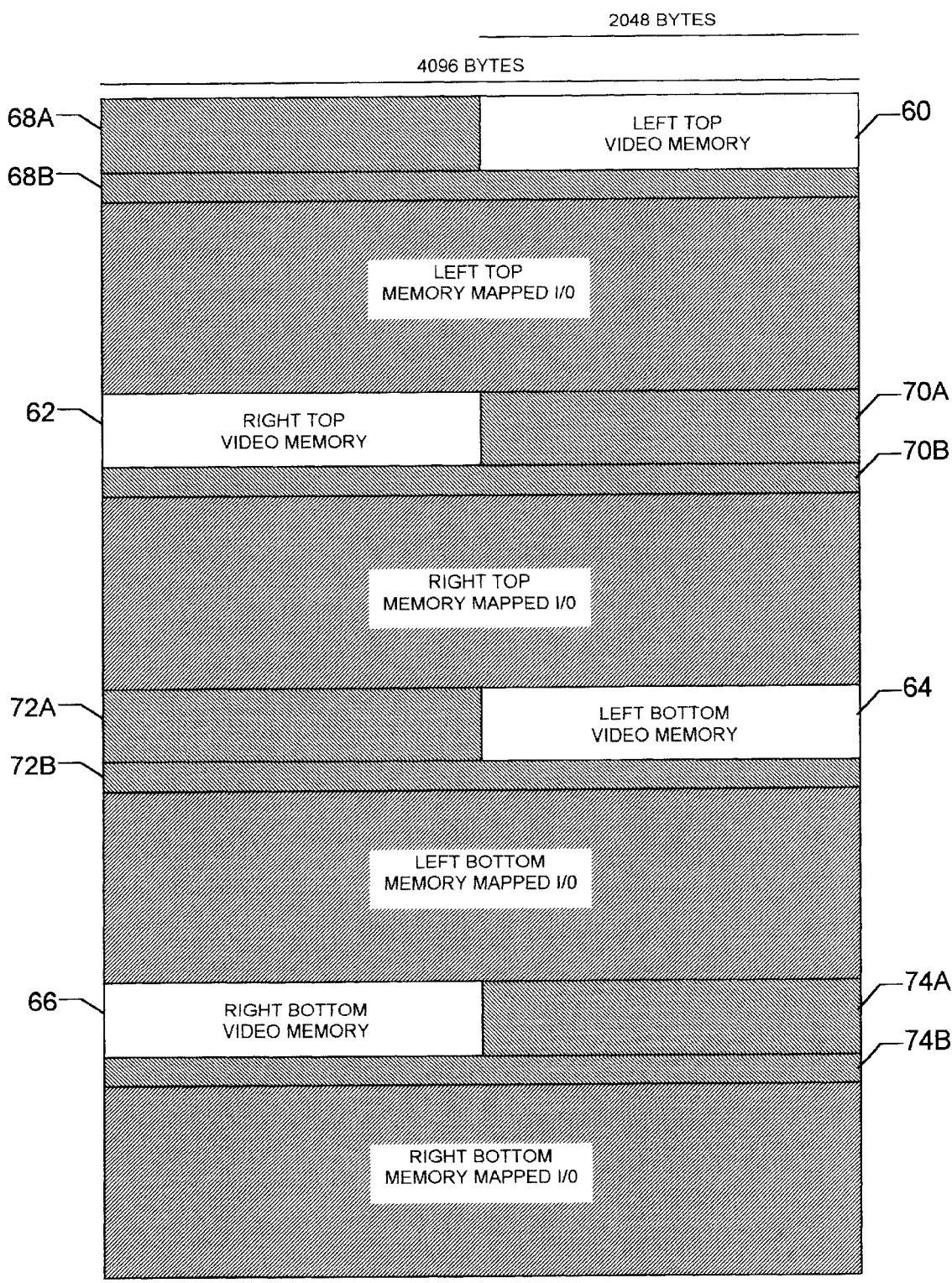
FIG. 10 shows how physical memory is reserved in four video memories when limited to a page size of 4096 in accordance with a first embodiment of the invention.

FIG. 10 shows how physical memory is reserved in four video memories when limited to a page size of 4096 in accordance with a first preferred embodiment of the invention. A conventional computer system is used, such as in FIG. 9 with a single Pentium 11 processor and with a single PCI bus with at least four available PCI slots connected to the primary PCI bus. No AGP bus is required and no ISA display controller boards are installed. Four display controller boards each containing four megabytes of randomly accessible video memory, as opposed to bank switched video memory, are installed into the four available PCI slots. An appropriate display controller board is one based on the Trio64V+display controller manufactured by S3

Incorporated, but many other commercially available display controllers are also appropriate. This first embodiment has an advantage of providing a low cost high resolution display system that does not require operating system support for multiple displays.

The memory being reserved is to provide a high resolution display with a logical video mode as shown in FIG. 1. A logical video mode is a term that is used in the current invention to represent the resolution across the multiple frame buffers and the pixel format. The pixel format includes the number of bits for storing a pixel and the definition of what each of the bits represent. Two different logical video modes can both require sixteen bits for storing a pixel, but can utilize different pixel formats. One pixel format may utilize six bits for storing a green color component and five bits for each of the blue and red color components. Another pixel format can utilize five bits for each of the red, green and blue color components with a single bit used as a color key for controlling the displaying of an overlay for that pixel, for example to allow the display of irregular shaped overlays. The current embodiment being described is configured for a pixel format of sixteen bits per pixel with six bits for storing a green color component and five bits for each of the blue and red color components, but can be reconfigured for other pixel formats and resolutions. Each of the display controllers is configured for the desired pixel format and the CPU is programmed to utilize the same pixel format.

Figure 11:
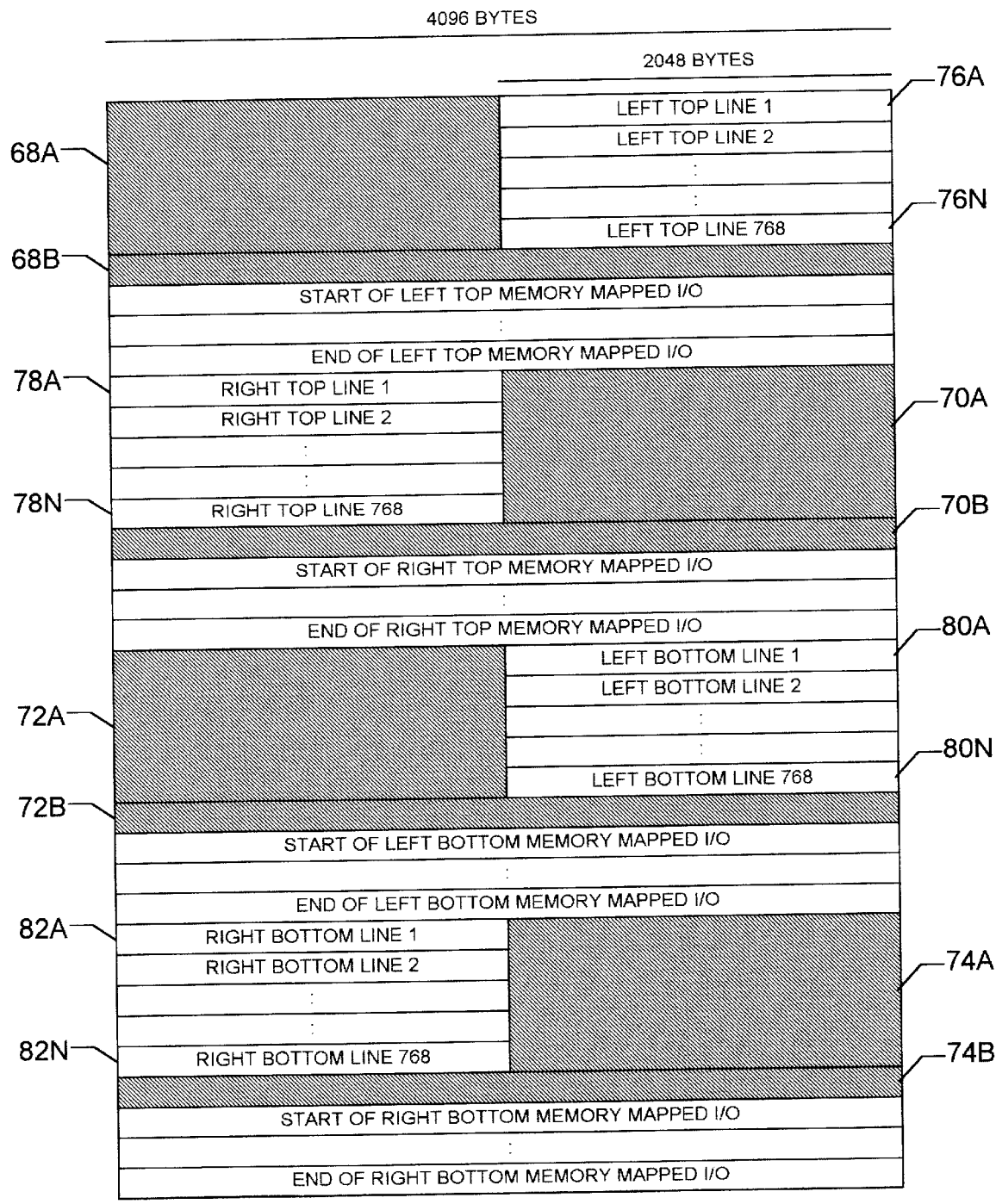
FIG. 11 shows the reserved physical memory areas with more detail indicating the storage for individual scan lines.
Figure 12:
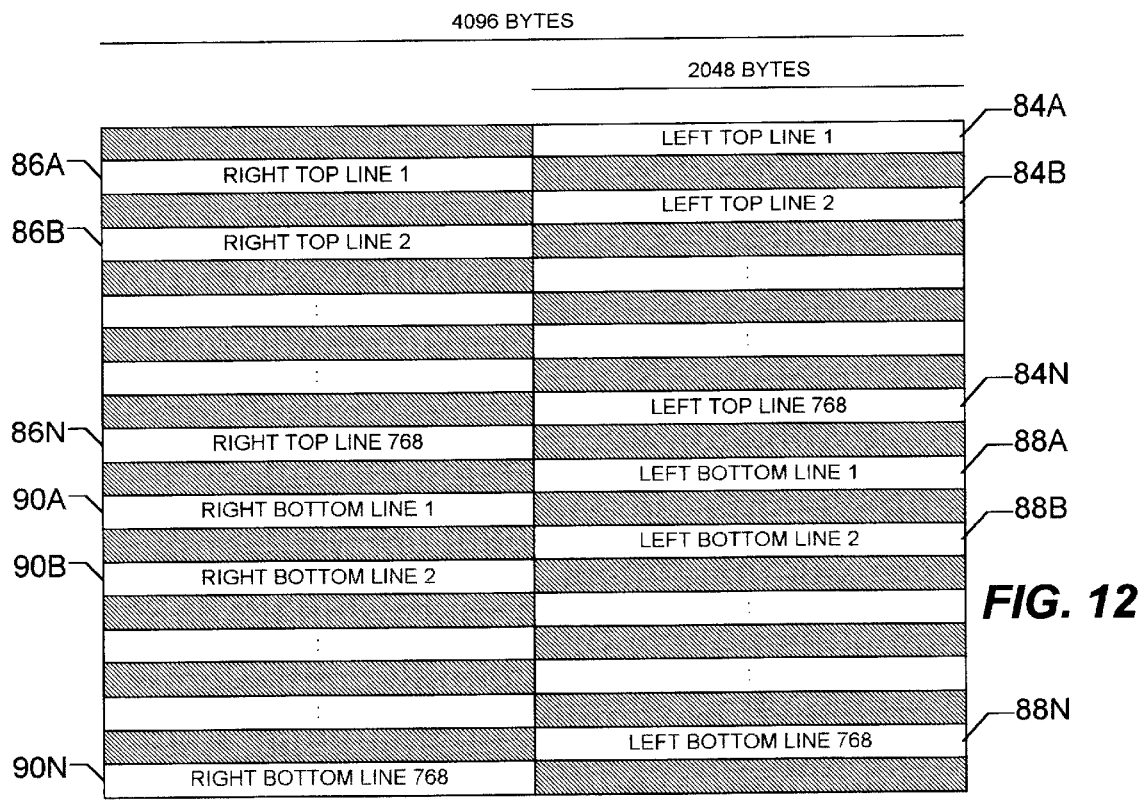
FIG. 12 shows the memory map of logical address space after configuring the address translator to shuffle the pages.

The address translation hardware of the Pentium 11 is used with a page size of 4096 to perform page shuffling in this embodiment, so the reserved memory areas of FIG. 10 are drawn with a distance across of 4096 bytes to correspond to an appropriate pitch to be used by the display controllers for generating the video stream outputs. To satisfy the image data alignment requirements of the invention, the 2048 bytes used to store a scan line in the four video memories must be aligned properly within a memory page. Scan line storage in left top video memory 60 and left bottom video memory 64 are right aligned in a page and the scan line storage in right top video memory 62 and right bottom video memory 66 are left aligned in a page. Video memory areas 68A, 68B, 70A, 70B, 72A, 72B, 74A, and 74B are not used for storing image data for the logical frame buffer, but are used by the display driver for other purposes. For example to save portions of the screen when menus are being displayed as well as for other miscellaneous storage purposes. FIG. 11 shows the reserved physical memory areas with more detail indicating the storage for individual scan lines. Scan lines for the left top display are stored in left top scan line storage 76A to 76N, scan lines for the right top display are stored in right top scan line storage 78A to 78N, scan lines for the left bottom display are stored in left bottom scan line storage 80A to 80N, and scan lines for the right bottom display are stored in right bottom scan line storage 82A to 82N. FIG. 12 shows a memory map of logical address space after configuring the address translation hardware to perform the page shuffling, where adjacent logical pages correspond to different video memories. To the left top video memory 60 the left top logical scan line storage 84A to 84N are routed. To right top video memory 62 the right top logical scan line storage 86A to 86N are routed. To left bottom video memory 64 the left bottom logical scan line storage 88A to 88N are routed. To right bottom video memory 66 the right bottom logical scan line storage 90A to 90N are routed. Resulting from the physical alignment shown in FIG. 10 and from the logical page shuffling shown in FIG. 12, the last pixel in the storage of any left logical scan line and the first pixel in the storage of the corresponding right logical scan line are in contiguous logical memory addresses, where each pixel is stored in two contiguous addresses due to the 16-bit pixel format. Though a pitch of 4096 is appropriate for use by the display controllers for generating the video streams, this is not an appropriate logical pitch to be used by the CPU for accessing the multiple frame buffers as a single logical frame buffer.

Figure 13:
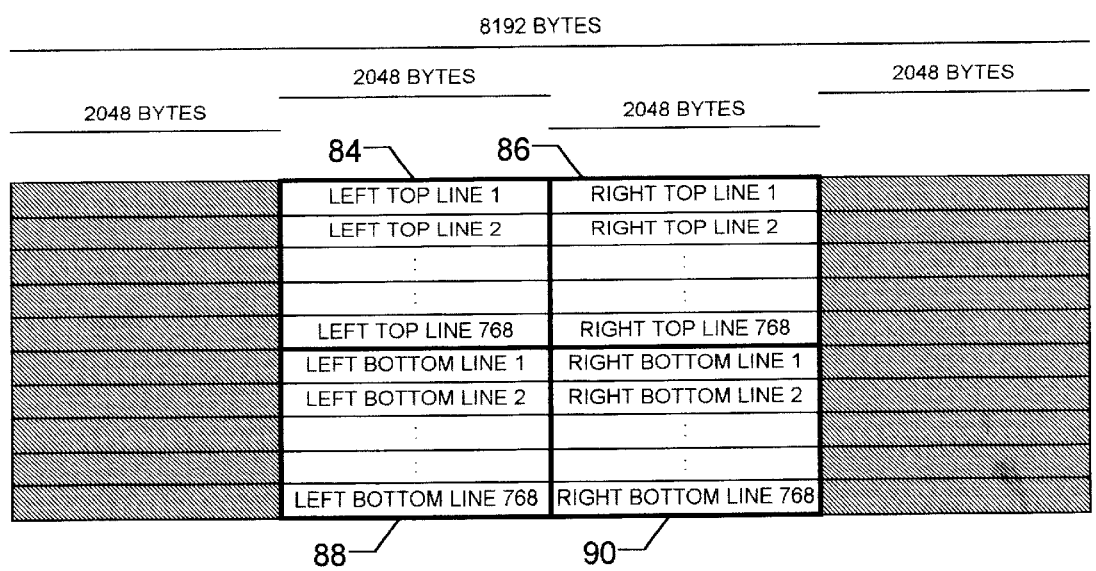
FIG. 13 shows memory map of same logical address space, but with an appropriate logical pitch.

FIG. 13 shows the same logical memory map as in FIG. 12, except drawn with a distance across of 8192 bytes. The left top logical scan line storage 84, the right top logical scan line storage 86, the left bottom logical scan line storage 88, and the right bottom logical scan line storage 90 are now aligned properly for a logical frame buffer. This illustrates that 8192 is an appropriate logical pitch for a CPU to use to access the page shuffled video memory pages as a single logical frame buffer.

Figure 14:
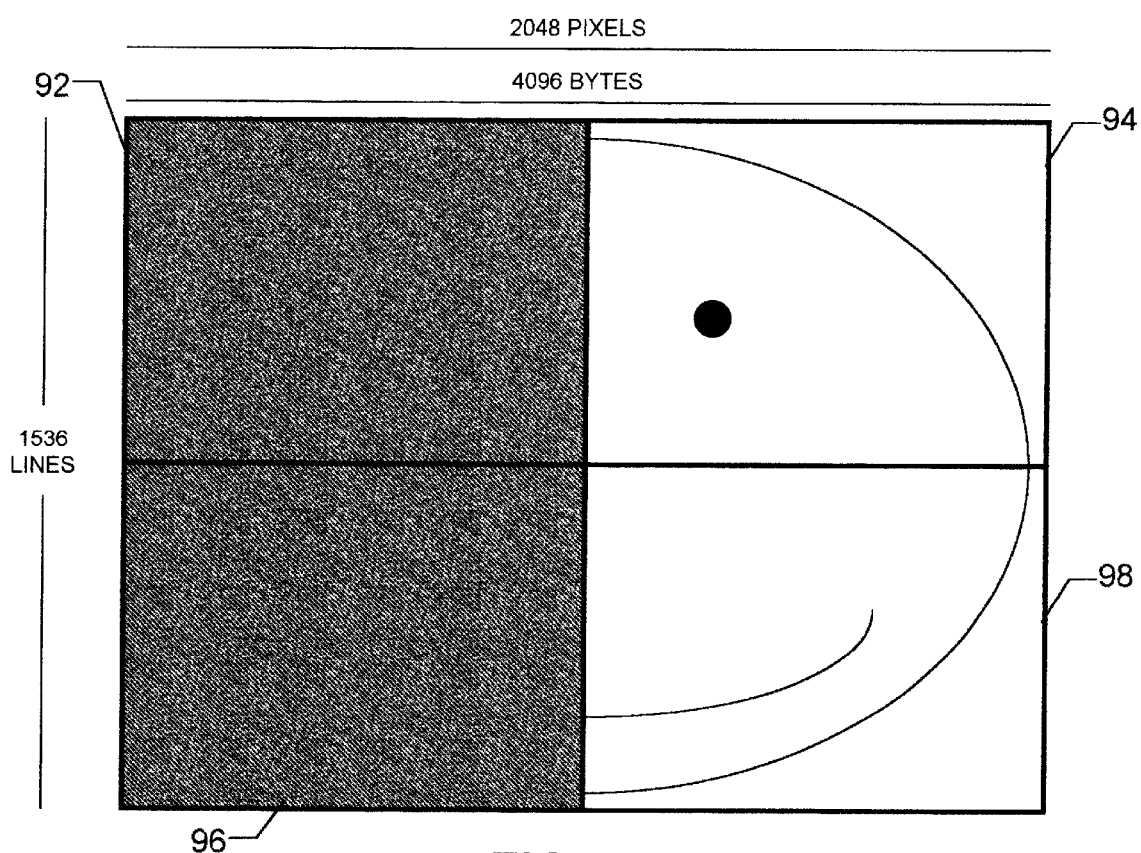
FIG. 14 shows the results of displaying the four physical frame buffers without modifying the display start address offsets of the physical frame buffers.

For a display video mode of 1024 pixels by 768 lines with 16 bits for storing a pixel, if the display controllers are set to utilize a pitch of 2048 to equal the width of the physical scan lines, portions of the offscreen areas 68A, 70A, 72A, and 74A would be included in the displays (not shown). When the display controllers are set to use a pitch of 4096, the resulting four displays are as shown in FIG. 14. Here the logical frame buffer offscreen areas 68A and 72A are viewable on the left top display device 92 and the left bottom display device 96 respectively. The right top display device 94 and the right bottom display device 98 display the appropriate data for the high resolution display.

Figure 15:
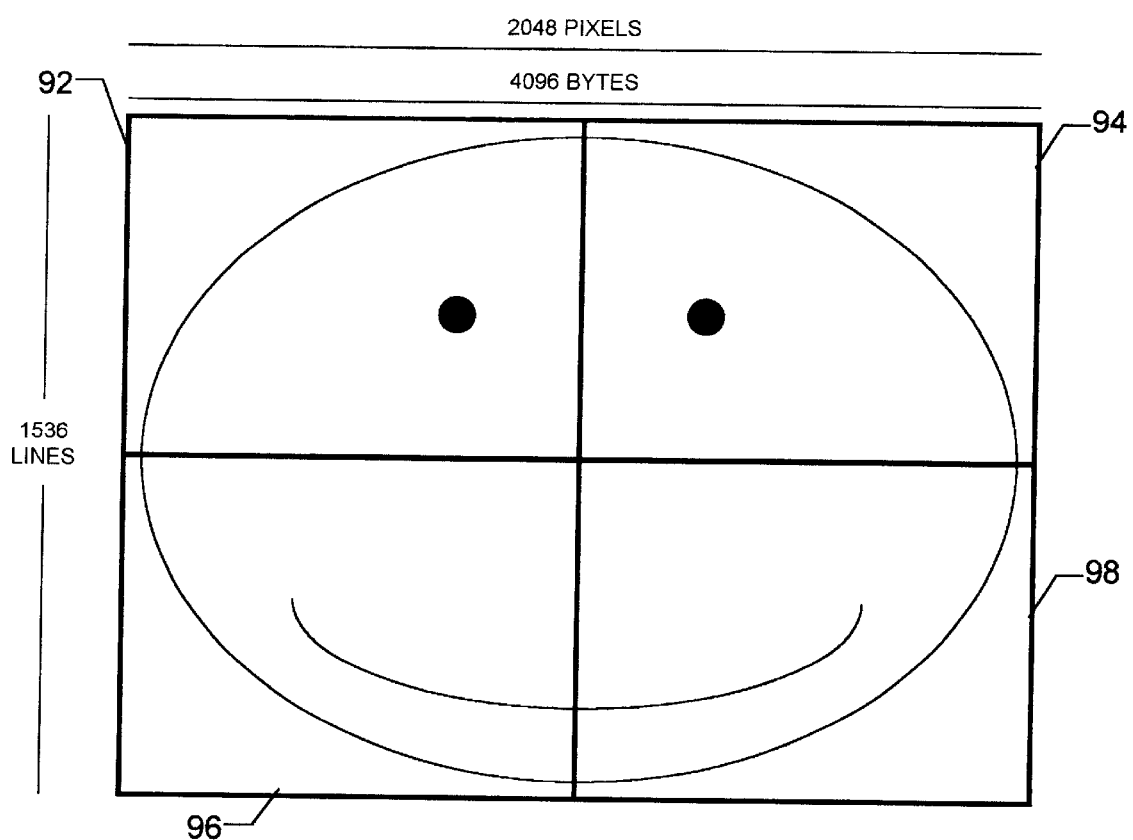
FIG. 15 shows the results of displaying the four physical frame buffers after appropriately modifying the display start address offsets for the two left physical frame buffers.

The left top display controller and the left bottom display controller are then configured to use a start address offset of 2048 to result in the display shown in FIG. 15. This results in all four display devices 92, 94, 96, and 98 now displaying the appropriate data to form the high resolution display.

The display controllers are initialized before setting the mode, changing the pitch or changing the start address offset. However, only one display controller at a time can have its I/O space enabled to prevent I/O space resource conflicts. The I/O space is enabled or disabled via the PCI configuration registers of each of the display controllers, this procedure is well known and described in various references on the PCI bus, one such reference is PCI Hardware and Software by Solari and Willse. The I/O space need not be enabled for frame buffer access, but one of the display controllers at a time has its I/O space enabled to initialize the device, to set the video mode, to set the start address offset, or to set the pitch in this embodiment. The software procedure for initializing the TRIO64V+display controllers to allow all four megabytes to be addressable without bank switching is described in the TRIO64V+data book. The software procedures for setting the video mode, the start address offset, and the pitch are described in the VESA Super VGA BIOS Extension Standard 1.2.

A preferred computer operating system for this embodiment is any operating system that provides support for converting graphics commands into image data memory accesses written to a logical frame buffer. Windows 95 is one such operating system. Windows 95 allows a type of display device driver known as a mini-driver to be implemented when the video memory is accessible as a single frame buffer. The procedure for implementing a display mini-driver is described in the Windows 95 DDK (Device Driver Kit) documentation for a single physical frame buffer display system. The logical high resolution frame buffer that addresses multiple physical frame buffers is configured within the mini-driver software when the logical video mode of the high resolution display is being set.

Figure 16:
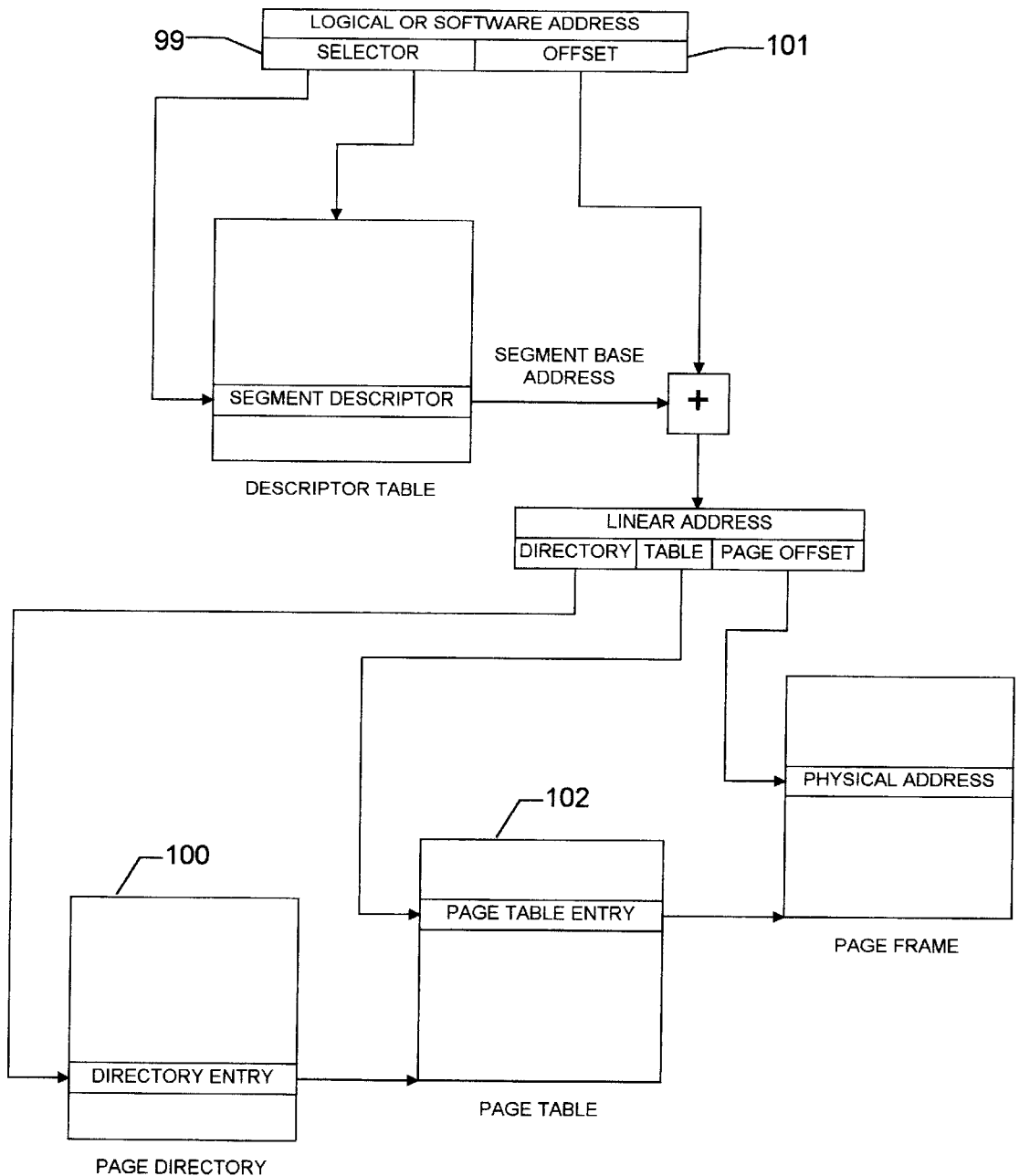
FIG. 16 is a block diagram of the segment translation and page translation sections of the memory management unit of a conventional processor which can be utilized to perform the page shuffling in accordance with the first embodiment.

FIG. 16 is a block diagram of the segment translation and page translation sections of the memory management unit of a Pentium II processor which can be utilized to perform the page shuffling in accordance with this embodiment. Windows 95 provides access to DPMI (DOS Protected Mode Interface) functions and Windows 95 system commands that allow device drivers to configure the segment translation and page translation hardware. The page shuffling is performed by making appropriate entries in a page directory 100 and then for each page directory entry making entries in an associated page table 102. Details of the operation of the segment translation and page translation hardware can be found in the Pentium Processor Family Developer's Manual.

Figure 17A:
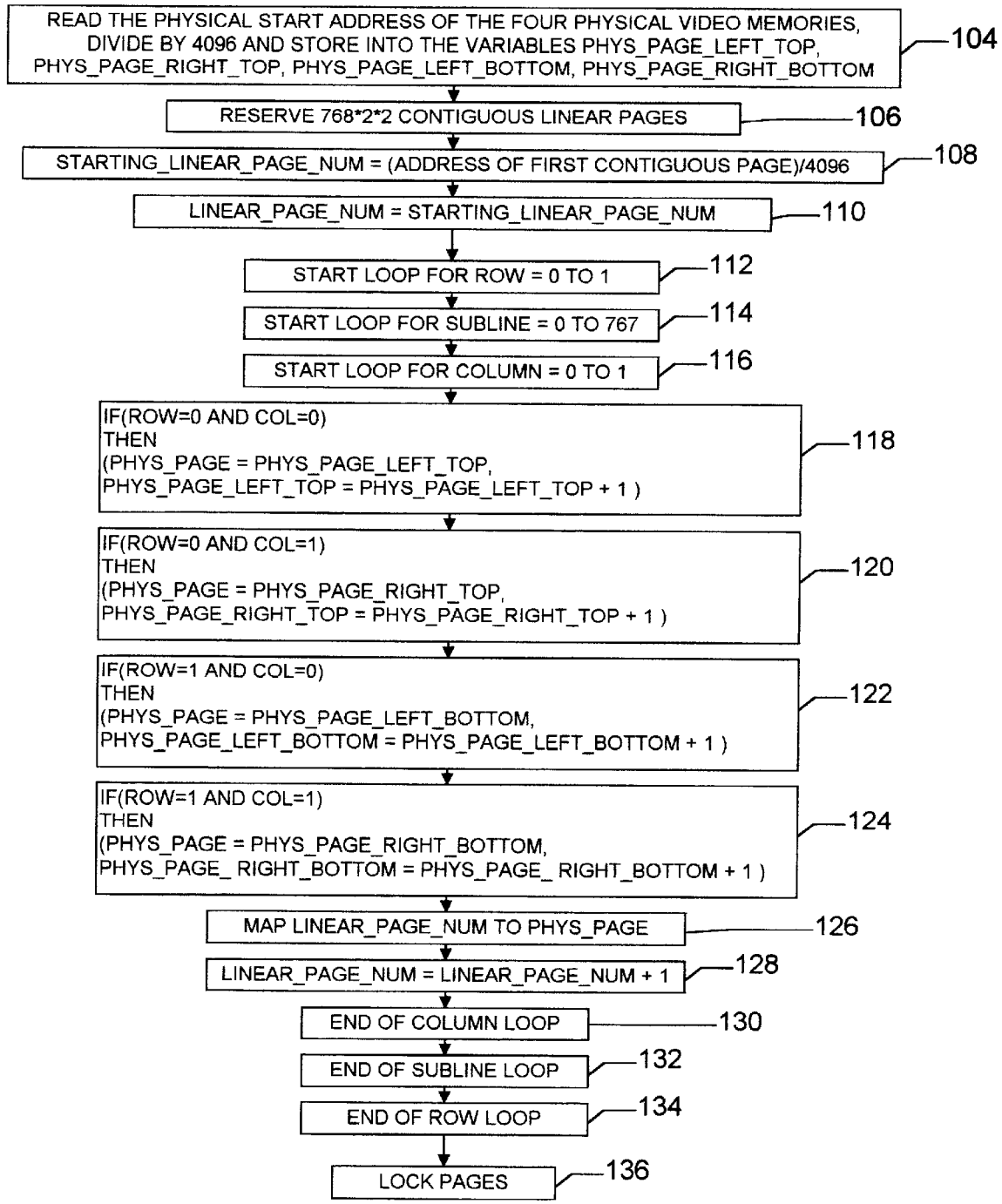
FIG. 17A is a flowchart of the steps to map linear pages to physical pages to perform the page shuffling in accordance with the first embodiment.

FIG. 17A is a flowchart of the steps to map linear pages to physical pages to perform the page shuffling. These steps make entries into the page directory 100 and into a page table 102 for each page directory entry. The software for the MAP_PAGES function shown in FIG. 17A is placed into a software module of Windows 95 called the mini-VDD for this embodiment. The mini-VDD runs in the 32-bit protected mode of the processor, while the display mini-driver code runs in the 16-bit protected mode. The MAP_PAGES function is placed into the mini-VDD because it uses 32-bit Windows 95 system calls to configure the page directory and page table entries. The MAP_PAGES function is called by the display mini-driver. The Windows 95 DDK describes a method for calling a 32-bit function in the mini-VDD from the 16-bit mini-driver software. A Read Physical Start Addresses step 104 reads the video memory base addresses for the four display controller boards by accessing the PCI configuration space for each of the boards. These physical addresses are converted to a physical page number by dividing by 4096 and then stored. A Reserve Linear Pages step 106 reserves contiguous pages for the four frame buffers with the number of pages equaling 768 times two columns times two rows. The Windows 95 PageReserve system function is appropriate for this. The PageReserve function returns an address to the first of the contiguous pages that is converted into a linear page number by dividing by 4096 in a Store Starting Linear Page step 108. The starting linear page number then is used to initialize a variable used for incrementing the linear page number in an Initialize Linear Page Number step 110. Then three nested loops are executed with an outer loop 112 counting the number of rows of frame buffers, a middle loop 114 for counting the sublines or number of lines within one row, and an inner loop 116 for counting the number of columns of frame buffers. Depending on the row and column count values one of four program steps 118, 120, 122, or 124 will be performed to select the next physical page to route a linear page to and to increment a physical page count value. A Map Linear Page step 126 is then performed to make any necessary page directory and page table entries to map the page. The Windows 95 PageCommitPhys system function is appropriate to perform this mapping. An Increment Linear Page step 128 is performed to add one to the linear page value, so that the page mapping performed in the next iteration of the loop will be for the next of the contiguous pages. After an End Of Column Loop step 130, an End Of Subline Loop step 132, and an End Of Row Loop step 134, a Lock Pages step 136 is performed to allow the pages to be accessed during hardware interrupts. The Windows 95 LinPageLock system function is appropriate for this.

Figure 17B:
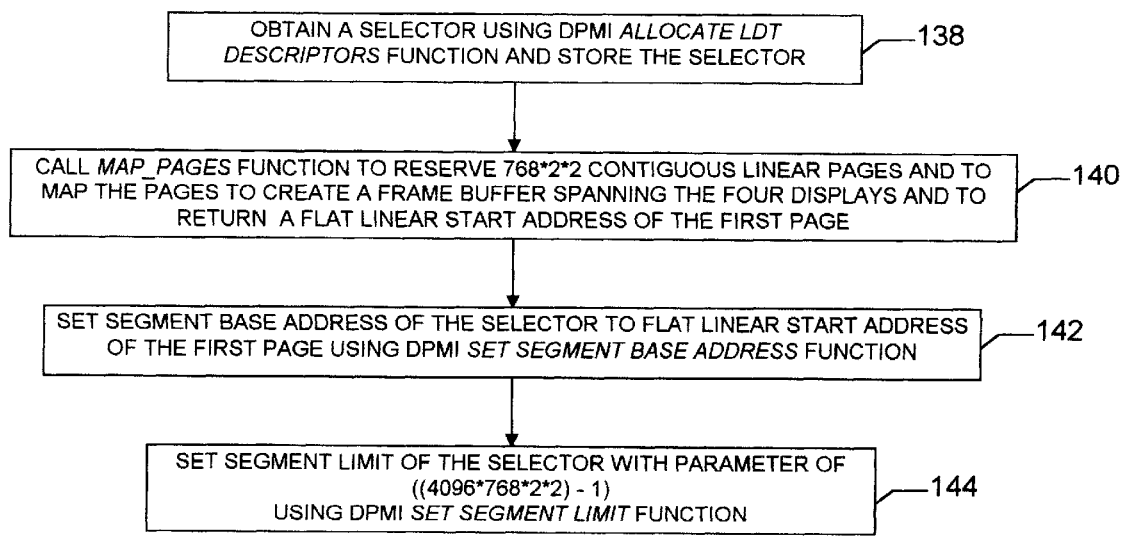
FIG. 17B is a flowchart of the steps to configure a segment descriptor for logical addressing.

FIG. 17B is a flowchart of the steps to configure a segment descriptor for logical addressing. The software for these steps is implemented within the display mini-driver software and is executed when a logical video mode is being initialized. Logical addressing utilizes a selector 99 and an offset value 101 as shown in FIG. 16. A selector includes a bit to point to one of two descriptor tables and thirteen bits to point to a segment descriptor in that table. An Obtain Selector step 138 is performed to obtain a selector that points to an available segment descriptor. The DPMI Allocate LDT Descriptors function is appropriate for this. This function can obtain more than one selector, but only one selector needs to be obtained. A Map Pages step 140 calls the MAP_PAGES function shown in FIG. 17A to perform the page shuffling. A Set Segment Base Address step 142 is used to set the segment base portion of the segment descriptor to the linear address of the first linear page reserved, this value was returned by the MAP_PAGES function. The DPMI Set Segment Base Address function is appropriate for this. A Set Segment Limit step 144 sets the size of the memory to be accessed using this selector. The value representing the size is stored into the limit portion of the segment descriptor. A value of one less than the actual size is used as the parameter for a DPMI Set Segment Limit function, which is appropriate for setting the segment limit.

The step in creating a display mini-driver for Windows 95 that pertains to the logical frame buffer is the configuring of the parameters of a structure called the PDEVICE structure. For mini-drivers the PDEVICE structure has the same format as a DIBENGINE structure, this is described in the Windows 95 DDK. The following parameters are included in the PDEVICE structure for the logical video mode just described. A width in pixels of 2048, a height in pixels of 1536, a width in bytes of 4096, a bits per pixel value of 16, a pitch of 8192, an offset of 2048 and a selector value obtained from the ALLOCATE_LDT_DESCRIPTORS function call obtained during the configuring of the segment descriptor for logical addressing as shown in FIG. 17B.

The GDI calls graphics functions in the display mini-driver software and the display mini-driver software jumps to the corresponding function in the DIBENGINE. The function in the DIBENGINE then processes the command and writes image data to the logical frame buffer. The GDI also calls the mini-driver to write or read color palette values or to change the resolution, where the mini-driver processes these functions without forwarding them to the DIBENGINE.

FIGS. 18A to 18D show four single column arrangements of frame buffers that represent different logical video modes of the first embodiment. The logical video mode for the two column by two row arrangement of frame buffers previously described used a memory page for every scan line of every frame buffer to satisfy the alignment requirements. Though this enabled the use of page shuffling to provide a single logical frame buffer when limited to a page size of 4096, the alignment requirements between the left and right columns required a portion of the video memories to be unused by the frame buffer. For the two by two arrangement of 1024 by 768 by 16-bit frame buffers, 2048 bytes of every scan line in every frame buffer was unused. Though the display driver can utilize this memory for other purposes, such as to save portions of the screen when menus are being displayed and though video memory is inexpensive, it is still advantageous to not have the necessity for the extra memory. For a single column arrangement of frame buffers, there is no need for page alignment in every scan line, but only between the last scan line of a frame buffer and the first scan line of the frame buffer beneath it. This allows adjacent scan lines in a given frame buffer to be in a common memory page. The page alignment between frame buffers in a single column arrangement for a page size of 4096 can be satisfied in three ways.

The pitch of the frame buffers can be increased, so that the number of scan lines multiplied by the pitch in an integer multiple of the page size. Alternately, the start address offset of the top frame buffer in the arrangement can be set to align the last scan line in the frame buffer. Also the resolutions used by the frame buffers can be limited to resolutions that contain an integer number of pages in the frame buffer.

Figure 18A:
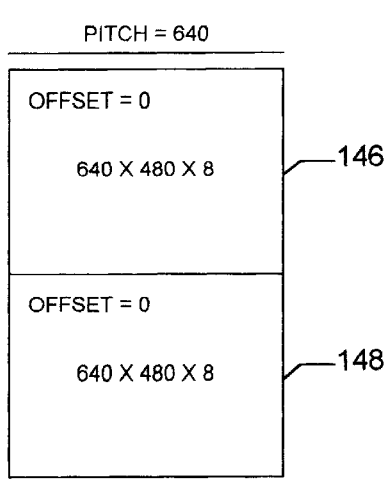
FIGS. 18A and 18B show how the start address offset and pitch of physical frame buffers can be configured when two frame buffers are used in a single column display arrangement when limited to a page size of 4096.

FIG. 18A shows a single column by two row arrangement of frame buffers with video modes of 640 by 480 by 8 bits for each. This video mode requires exactly 75 pages to store the frame buffer satisfying the alignment requirements. The page mapping as shown in FIG. 17A is replaced by mapping the first 75 of 150 reserved linear address pages to consecutive physical pages of top frame buffer 146. Then the next linear address page is mapped to jump over the physical discontinuity between the frame buffers. Then the remaining 74 pages are mapped contiguously within bottom frame buffer 148.

Figure 18B:
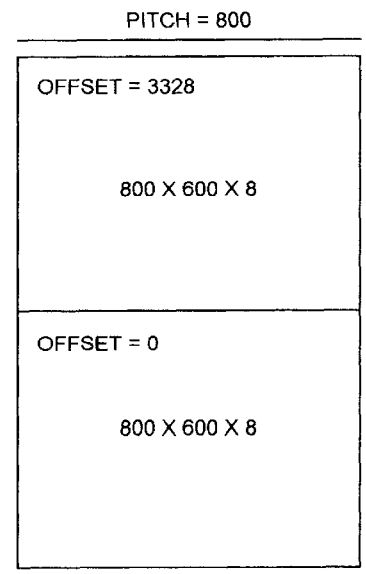

FIG. 18B shows a single column by two row arrangement of frame buffers with video modes of 800 by 600 by 8 bits for each. This video mode does not utilize an integer number of pages to store the frame buffer, so a start address offset of 3328 bytes is used to page align the last scan line in the top frame buffer. The page shuffling maps the first of 236 linear address pages to the physical memory page containing the first pixel of the top frame buffer. The next 117 pages are mapped contiguously in the top frame buffer, then as in the previous example the next linear address page is mapped to jump over the physical discontinuity between the frame buffers and the remaining 118 linear pages are mapped contiguously within the bottom frame buffer.

Figure 18C:
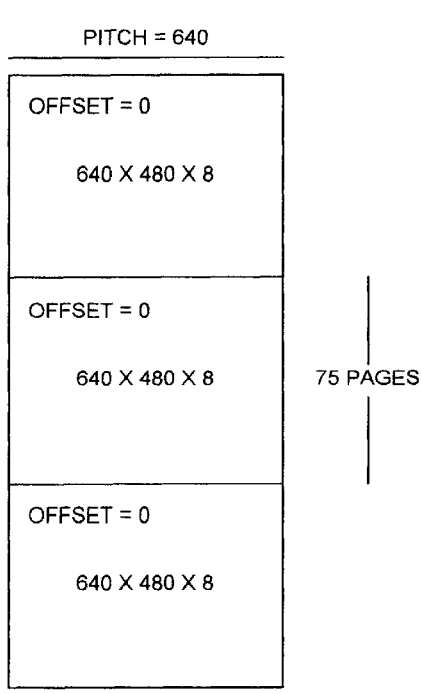
FIGS. 18C and 18D show how the start address offset and pitch of physical frame buffers can be configured when more than two frame buffers are used in a single column display arrangement.

FIG. 18C shows an arrangement of three frame buffers with video modes as in FIG. 18A. Since the video mode uses an integer number of pages to store the frame buffer data, the first pixel in the first scan line in a frame buffer is page aligned as well as the last pixel in the last scan line. This provides the proper page alignment for a frame buffer sandwiched between two other frame buffers in a single column arrangement. Here 225 linear address pages are mapped, similar to the example of FIG. 18A, except there are two physical address discontinuities, one between the top and the center frame buffers and one between the center and the bottom frame buffers.

Figure 18D:
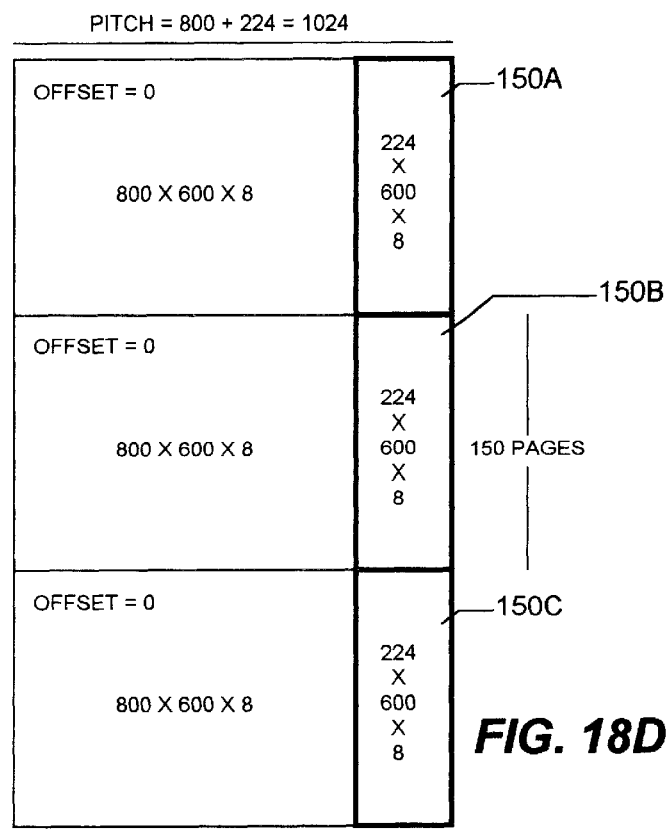

FIG. 18D shows an arrangement of three frame buffers with video modes as in FIG. 18B. However, though the page alignment was provided in FIG. 18B by utilizing a start address offset in the top frame buffer, this is not appropriate for a frame buffer sandwiched between two other frame buffers in a single column arrangement. This is due to start address offset aligning the last pixel in the last scan line, but not aligning the first pixel in the first scan line. To perform the alignment for both scan lines, the pitch of the frame buffers is increased, such that the pitch multiplied by the number of scan lines in a frame buffer equals an integer number of pages. The mapping is now performed as in the other examples with the physical address discontinuities being jumped over by the page mapping, but here the three physical frame buffers each have an offscreen memory area 150A to 150C with a width of 224 bytes not used by the frame buffers. Both the logical and physical frame buffers utilize a pitch of 1024 for this example, while FIGS. 18A to 18C use a pitch equaling the physical width of a scan line. This differs from the two column arrangement in that here the logical and physical pitches are equal, while in the two column example a logical pitch of 8192 was used with a physical pitch of 4096. Though there is still offscreen video memory areas in FIG. 18D, the width of the offscreen memory areas is less than if every scan line was mapped to a different page.

Figure 19:
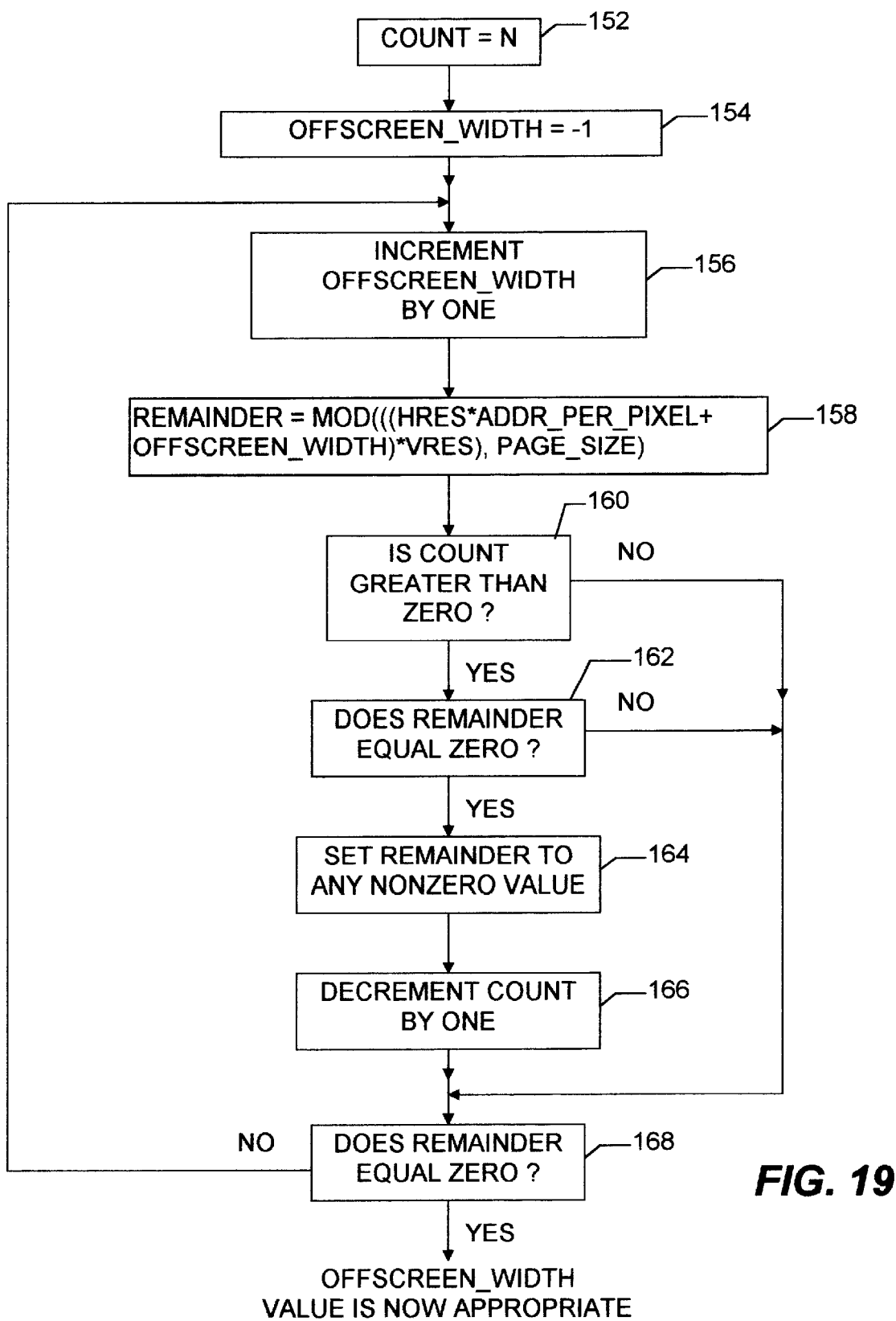
FIG. 19 is a flow chart of steps for determining appropriate offscreen widths for a single column display arrangement.

Though the single column arrangement of FIGS. 18C did not utilize any extra storage between scan lines, it is sometimes desirable to reserve extra memory for offscreen storage of image data not currently being displayed. For example, for storing overlays or storing image data temporarily while a menu is being displayed or for other purposes. Though the video mode of 640 by 480 by 8 bits has an integer number of pages, the pitch can still be increased to provide an offscreen memory area. FIG. 19 is a flow chart of steps for computing widths of offscreen memory areas that can be used that also satisfy the page alignment requirements.

The flow chart of FIG. 19 begins with an Initialize Count step 152, where an integer value N is assigned to a count value that determines the size of the extra memory area. If you do not require an extra memory area, but need one to satisfy the alignment requirements as in offscreen memory areas 150A to 150C of FIG. 18D, then the value of N is set to zero. As the value of N is increased, so does the width of the offscreen memory area computed. An Initialize Offscreen Width step 154 sets the initial value of the width to negative one. Then a Start Of Loop step 156 increments the width to zero for the first loop iteration and a Compute Remainder step 158 calculates a remainder of bytes using the horizontal resolution, the number of addresses per pixel, the offscreen width, the vertical resolution of one frame buffer, and the page size. If the remainder is zero then the width is appropriate for proper page alignment. A Test Count step 160 tests if the count is zero to prevent count from being decremented below zero. A First Test Remainder step 162 is used to determine if the count is ready to be decremented. A Reset Remainder step 164 sets the remainder to a non-zero value, so the loop will not yet be exited. A Decrement Count step 166 decrements the count and a Second Test Remainder step 168 determines if the calculation of the offscreen width is complete. FIG. 20 is a table listing offscreen widths to get a pitch suitable for a single column display arrangement for values of N ranging from zero to ten for various frame buffer video modes.

Figure 21A:
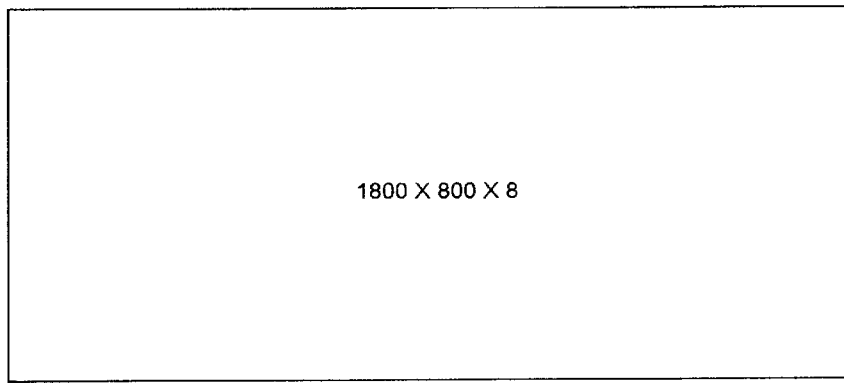
FIGS. 21A, 21B, and 21C show a logical display resolution that can be implemented with three displays rotated ninety degrees using a single column arrangement of frame buffers.
Figure 21B:
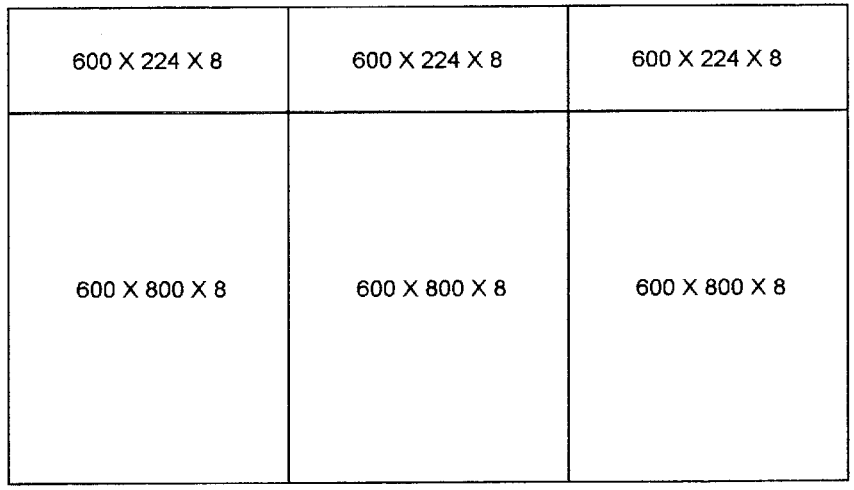
Figure 21C:
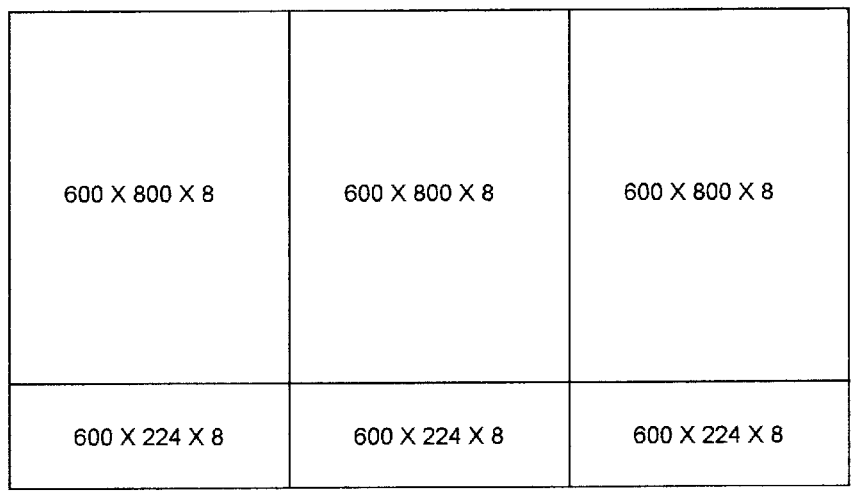

FIGS. 21A, 21B, and 21C show a logical video mode that can be implemented with a three column by one row arrangement of displays that have been rotated ninety degrees. A logical high resolution display 170 having a video mode of 1800 by 800 by 8 bits is created by using three 800 by 600 by 8-bit frame buffers with a single 800 by 1800 by 8-bit logical frame buffer created as described for FIG. 18D. Two steps are required for the operating systems graphics interface software to operate on this logical frame buffer as an 1800 by 800 frame buffer. First the graphics interface software must be initialized with parameters defining the video mode as 1800 by 800 by 8 bits. Secondly when the graphics interface sends graphics commands to the device driver, the parameters of the graphics functions that are related to the X, Y coordinates must be modified. For example any specified rectangular areas and any parameters specifying rotation such as for text output should be modified before the graphics functions are allowed to write to the 800 by 1800 logical frame buffer. In Windows 95 the video mode parameters defining the horizontal and vertical resolution are initialized by a device driver function named Enable. This function is called by the operating system with a parameter indicating that elements of the GDIINFO structure are to be initialized. This is where the GDI is initialized with a video mode of 1800 by 800 by 8 bits. When the GDI calls a graphics function in the device driver, the device driver modifies the X and Y coordinates, any rectangular areas, and any rotation parameters used by the function and then calls the corresponding graphics function in the DIBENGINE. The modified parameters are forwarded to the DIBENGINE allowing it to write to the 800 by 1800 by 8-bit logical frame buffer. The parameters related to the X and Y coordinates and rectangular areas are modified according to whether the display devices were rotated clockwise or counterclockwise. FIG. 21B and FIG. 21C show display devices rotated counterclockwise and clockwise respectively. For the counterclockwise rotated display devices, the $X_{DIB}$ coordinate is set to equal 799 minus $Y_{GDI}$ and the $Y_{DIB}$ coordinate is set to equal $X_{GDI}$, where $X_{DIB}$ and $Y_{DIB}$ are the coordinates sent to the DIBENGINE functions and $X_{GDI}$ and $Y_{GDI}$, are the coordinates received from the GDI. The pitch of the logical frame buffer used by the DIBENGINE functions is 1024. The pitch used by the display controllers is also 1024. Descriptions of the functions in the DIBENGINE and their parameters are described in the Windows 95 DDK.

FIG. 22 shows an arrangement of more than two columns of physical frame buffers that can be implemented with a page size limitation of 4096. The page alignment requirements are satisfied at both ends of the scan lines for the center column frame buffers by choosing a video mode with a width equaling the 4096 page size. Such a video mode is 1024 by 768 by 32 bits. One known 32-bit pixel format utilizes eight bits each for a red, green, blue, and alpha component, where an alpha component represents a degree of transparency. Another known 32-bit pixel format uses eight bits for each of the red, green, and blue components with another 8 bits being unused. The page mapping is similar to that shown in FIG. 17A for the two column arrangement, but the number of reserved pages is increased by 1536, the column loop is increased for an additional column and two additional IF statements are placed in the loop to map pages to the additional two frame buffers. The pitch of the individual frame buffers is still 4096, but the logical frame buffer pitch is 12,288.

FIG. 23A shows an arrangement of two displays of different resolutions. Known single display controller boards provide for a logical desktop that stores a higher resolution frame buffer than can be displayed at one time on a lower resolution single display device by providing for panning of the lower resolution display area within the higher resolution frame buffer. For a logical frame buffer that addresses two frame buffers, it is advantageous to provide the capability for two displays being driven by the two frame buffers to have different resolutions. For example a primary display can be a higher cost higher resolution display and a secondary display can be a standard 640 by 480 VGA monitor being used for test purposes. A logical video mode of 2048 by 768 by 16 bits could be provided with the left display device displaying a 1024 by 768 resolution and a right display device displaying a 640 by 480 resolution and providing for panning of the 640 by 480 display within the right 1024 by 768 area of the logical frame buffer. Both physical frame buffers utilize a pitch of 4096 and the logical frame buffer utilizes a pitch of 8192. FIG. 23B shows a 640 by 480 area at one panning position within the 1024 by 768 area of the right frame buffer. The panning is controlled by modifying the start address offset used by the display controller chip for accessing its associated physical frame buffer as described in the VESA Super VGA BIOS Extension Standard 1.2. The interface to the user for selecting the panning region can be implemented in software using any of various known methods. One such method is to enable panning with a reserved multi-key keyboard entry known as a hotkey that runs a software routine that provides scroll bars for panning. If desired, the logical desktop can be configured such that panning is utilized in both the left and right displays. For example, a logical frame buffer with a logical video mode of 4096 by 900 by 16 bits can be configured with two display controller boards each containing four megabytes of video memory, with some memory left over for use by the device driver for miscellaneous storage. Panning is then utilized for both the left and right displays.

FIG. 24A shows twelve displays in a six column by two row arrangement that are driven from six dual output display controllers in accordance with a second preferred embodiment of the invention. The advantage of this embodiment is an increased number of video outputs. A computer system having a combination of PCI and AGP slots totaling six or more is appropriate for this embodiment. One such computer system is based on the Thunder X motherboard from Tyan Computer, as it contains one AGP slot and five PCI slots. Dual output display controller boards that utilize a single frame buffer to generate the two video outputs are installed into the six slots with one being an AGP version and the other five being PCI versions. One appropriate dual output display controller board available in both AGP and PCI versions that utilizes a single frame buffer to generate the dual outputs is the Duet from Appian Graphics. This dual output display controller board is based on the Virge(MX display controller from S3 Incorporated.

FIG. 24B shows the six frame buffers corresponding to the six dual output display controller boards in a three column by two row arrangement used for storing the image data for the twelve displays. A single logical frame buffer is created for these six frame buffers in a similar fashion to the three column by two row arrangement of single output display controller boards shown in FIG. 22. The difference here is that the 4096 bytes within a memory page represents 2048 pixels with 16 bits per pixel for this arrangement of this embodiment, but for the arrangement of previous embodiment shown in FIG. 22, 1024 pixels with 32 bits per pixel are stored in the 4096 bytes. The logical pitch of both arrangements is 12,288 and the physical pitch of both arrangements is 4096. The physical address of the AGP video memory is read from the AGP device's configuration space as was done for the PCI display controller boards. The AGP device gets physical address space assigned to it by the plug-and-play BIOS just as the PCI display controllers do. There is no difference between the mapping of the linear pages to physical pages between PCI and AGP buses, the difference is the speed of accessing memory across the AGP bus is faster.

FIG. 24C shows the six frame buffers in a two column by three row arrangement used for storing the image data for the twelve displays to be utilized in a four column by three row arrangement of displays. This provides a known standard aspect ratio of 16:9, so this arrangement of this second embodiment is useful for displaying image data intended for such an aspect ratio, The page mapping here is similar to that of FIG. 17A, except now there are three rows of frame buffers. Also, the image data stored within a memory page is different, as the number of pixels in a scan line is different. For the example of FIG. 17A there were 2048 bytes used for image data in a memory page made up of 1024 pixels with 16 bits per pixel leaving an offscreen area with a width of 2048 bytes. For the current example all 4096 bytes are used for image data made up of 2048 pixels with 16 bits per pixel. The logical pitch is 8192 bytes and the physical pitch is 4096. A reference describing the details of configuring the display controllers is the Virge/MX data book.

Figure 25:
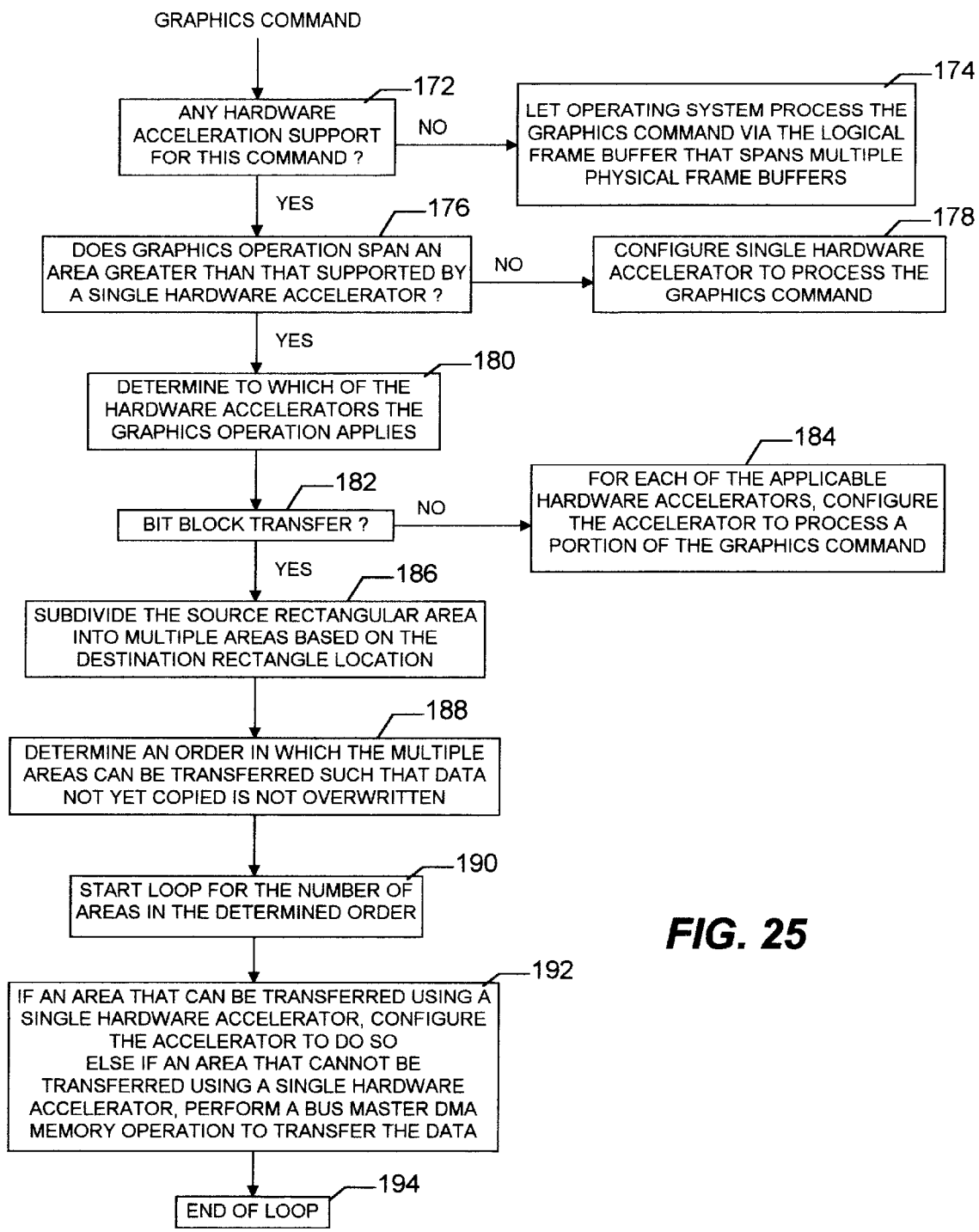
FIG. 25 is a flow chart of steps to incorporate graphics acceleration into a display mini-driver in accordance with a third embodiment of the invention.

FIG. 25 is a flow chart of steps to incorporate graphics acceleration into a display mini-driver in accordance with a third preferred embodiment of the invention thus providing an advantage of increased graphics performance. This embodiment configures the page shuffling address translation to provide a single logical frame buffer for accessing the multiple frame buffers and initializes a PDEVICE structure to allow the use of a Windows 95 mini-driver just as in the first embodiment. However to provide improved graphics performance, when the processing speed of a graphics function can be accelerated by hardware features of the display controllers, the display driver does not pass the graphics function to the DIBENGINE. For the functions not passed to the DIBENGINE, the device driver sends commands to the display controllers to perform the necessary processing for altering the video memories as required by the graphics function.

One such graphics function that benefits from hardware acceleration is the screen to screen BitBLT (bit block transfer). Hardware acceleration is provided by the display controller for transferring a rectangular area of image data from one area of the screen to another. Without hardware acceleration of screen to screen BitBLTs, the CPU would have to read the image data from the source rectangular area then write the image data back to the destination area. Hardware BitBLTs allow the image data to be transferred at a much higher rate because after the transfer is initialized there is no CPU involvement and there is no need for the image data to pass through an interface bus to and from the CPU. Also the memory accesses that are performed for a hardware accelerated BitBLT are performed at a much higher rate as the data remains local to the display controller and its associated video memory.

For a system with multiple frame buffers used to drive a high resolution display, the display is considered a logical screen. A logical screen to logical screen BitBLT can have a source rectangular area or destination rectangular area or both that spans multiple frame buffers. To transfer image data between multiple frame buffers that are controlled by different display controller devices requires data to be sent over a bus that connects them. One way to perform this transfer is for the CPU to read the portions of the image data requiring transfer from the source frame buffer then write the image data to the destination frame buffer. A disadvantage of using the CPU is the data must be transferred over the interface bus twice. The method used by the current embodiment is to perform a single transfer over the interface bus by utilizing display controllers that support bus master DMA (direct memory access) transfers. Certain sub-areas within the source rectangular area that needn't be transferred over the interface bus are transferred using the BitBLT hardware of the display controllers. Therefore, a display controller that includes hardware acceleration for screen to screen BitBLTs and hardware for performing bus master DMA operations is appropriate for the current embodiment.

An Accept Graphics Command step 172 routes any graphics commands that do not have support for hardware acceleration to a DIBENGINE function 174 that corresponds to the graphics command. This is similar to the first embodiment, except for this embodiment only selected graphics commands that cannot benefit from hardware acceleration are sent to the DIBENGINE. A Test Area step 176 analyzes the graphics command and its parameters to determine if the screen area to which it pertains is greater than that controllable by a single hardware accelerator. If not, a Process Single Accelerator Command step 178 configures the corresponding hardware accelerator to process the graphics command, this includes bit block transfer commands that can be supported by a single accelerator. If the area is larger than controllable by a single hardware accelerator, a Determine Which Accelerators step 180 is performed to determine which of the hardware accelerators need to be programmed to process the graphics command. If Bit Block Transfer Test step 182 determines it is not a bit block transfer then the Configure Hardware Accelerators step 184 is performed to program the hardware accelerators determined to be applicable to the graphics command. If the command is a bit block transfer then a Subdivide Area step 186 is performed to divide the source rectangular area into multiple areas based on the destination rectangle location. A Determine Order step 188 determines the order in which the multiple areas are transferred such that no image data is overwritten before it is transferred. A Start Loop step 190 initializes a loop for the number of multiple areas to be transferred and for the determined order. A Test Single Accelerator Area step 192 determines if the area can be transferred using a single graphics accelerator to perform the transfer, and if so the determined graphics accelerator is programmed to do so. If the transfer of the area cannot be performed by a single graphics accelerator, then a bus master DMA operation is performed to transfer the lines within the area to the lines within the destination area. The loop is repeated for all of the multiple areas and then an End Of Loop step 194 is encountered to end the bit block transfer. After steps 178, 184 and 194 a return from subroutine is executed. Since step 174 represents a software jump to the DIBENGINE, the return from subroutine is performed by the DIBENGINE.

The steps just described illustrate the concept of incorporating graphics acceleration into a system with a logical frame buffer, but the software to do this is implemented more efficiently. In the display mini-driver, every graphics command has a unique entry point. For example the software following the device driver entry point for a graphics command does not need to perform the Accept Graphics Command step 172 to test if there was hardware support. This step is performed at the time the device driver software is written. If there is no hardware support for the graphics function, the code following the entry point jumps to a function in the DIBENGINE. If there is hardware support then the Test Area step 176 is performed following the entry point. Likewise there is no need to perform the Bit Block Transfer Test step 182 because the entry points of the software correspond to specific graphics commands.

Figure 26A:
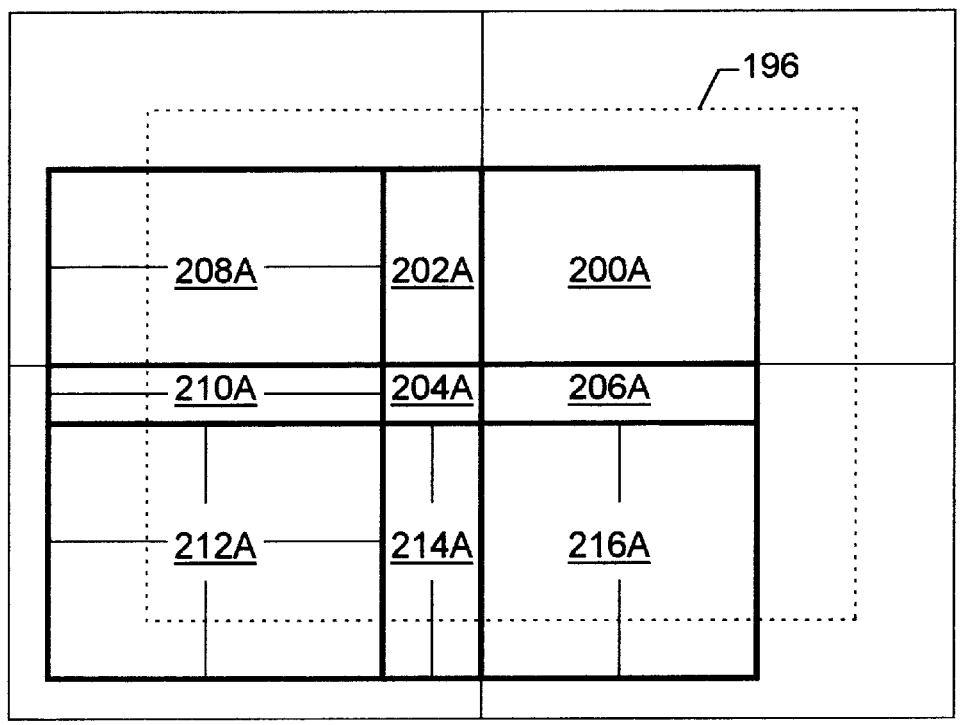
FIGS. 26A and 26B show how a BitBLT source rectangular area is divided into multiple areas based on the destination rectangle location.
Figure 26B:
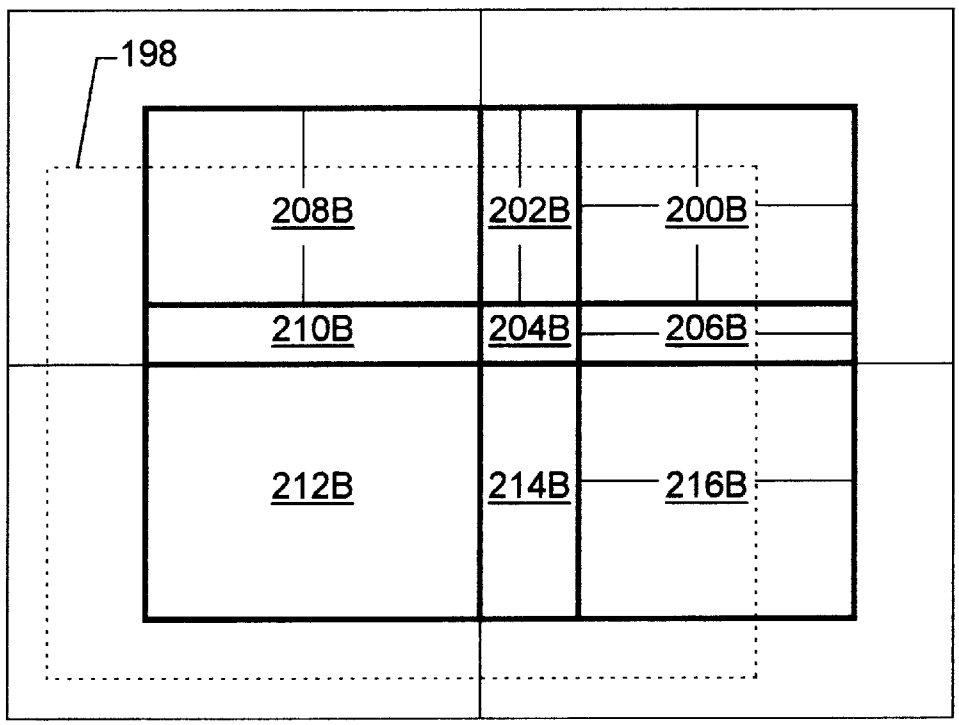

FIGS. 26A and 26B show how a BitBLT source rectangular area 198 shown in FIG. 26B is divided into multiple areas 200A to 216A shown in FIG. 26A based on the destination rectangle 196 location shown in FIG. 26A. Areas 200A, 208A, 212A, and 216A are transferred to areas 200B, 208B, 212B, and 216B using acceleration hardware. Areas 202A, 204A, 206A, 210A, and 214A are transferred to areas 202B, 204B, 206B, 210B, and 214B using bus master DMA transfers between video memories. For the direction of the transfer in this example, an order appropriate to not overwrite image data not yet transferred is first 200A, second 202A, 204A, and 206A in any order, third 208A and 216A in either order, forth 210A and 214A in either order and then 212A.

For the areas that are transferred utilizing acceleration hardware, the CPU performs commands to configure the transfer. The height and width of the rectangular area, the source and destination coordinates representing a corner of the source and destination rectangular areas, as well as a X direction and Y direction are configured such that image data in the source rectangle is not overwritten before it is copied. The data book of the Virge/DX display controller manufactured by S3 is a reference describing the details of programming BitBLTs with overlapping source and destination rectangular areas as well as describing procedures for programming various other hardware acceleration functions. The data book also describes a procedure for initiating bus master DMA transfers.

In addition to screen to screen BitBLTs, one skilled in the art can incorporate software into the device driver to configure acceleration hardware for various other graphics functions using known methods without extensive experimentation. This can include, but is not limited to, BLTs between system RAM and video memory, stretch BLTs, pattern BLTs including rectangle fill, 2D polygon fills, line drawing, and the use of various raster operations to specify how the source and destination rectangles are combined for BLTs.

Figure 27A:
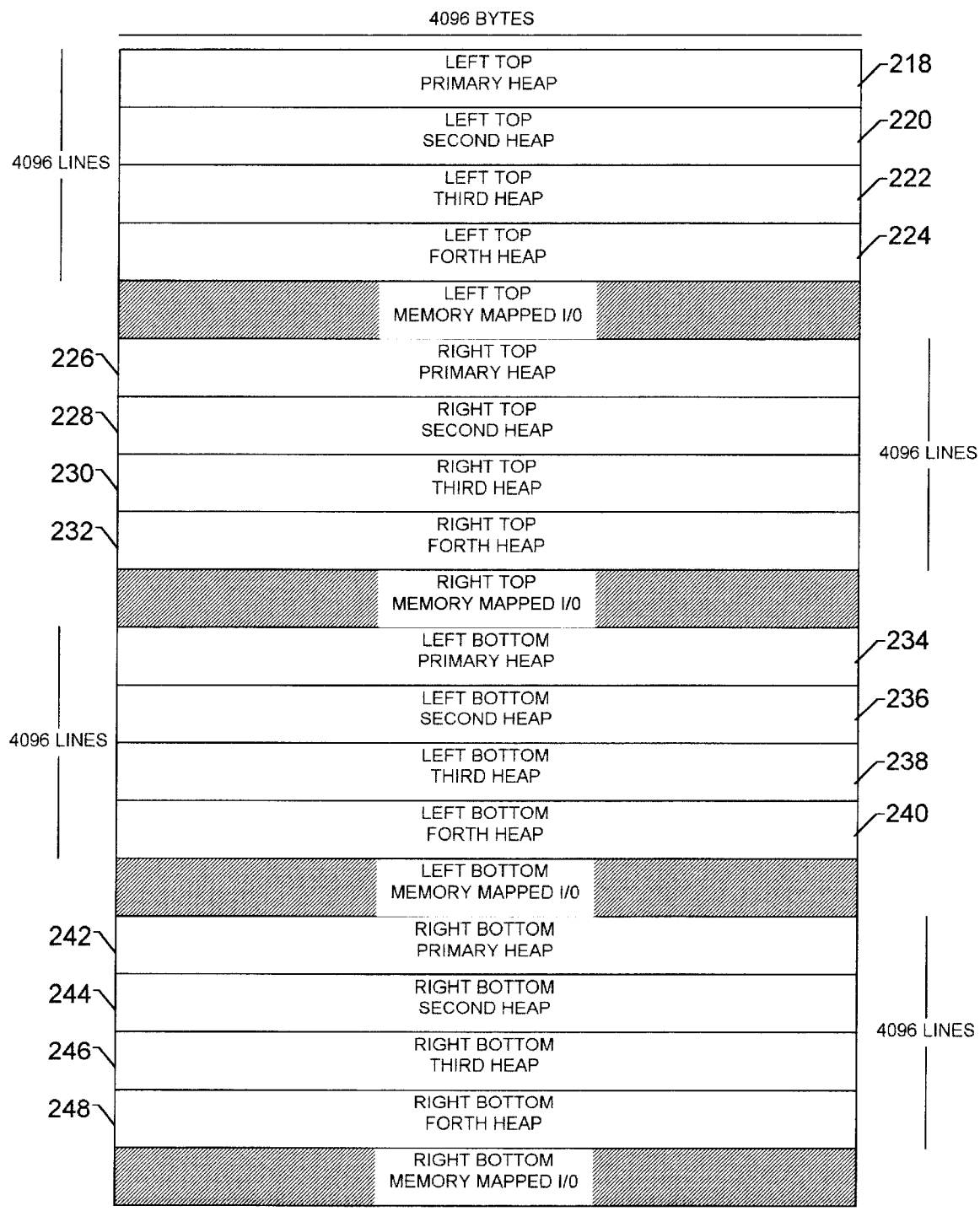
FIG. 27A shows how memory is reserved in multiple video memories for creating multiple logical video memory heaps that span multiple frame buffers that can be used for overlays or flippable buffers in accordance with a forth embodiment of the invention.

FIG. 27A shows an example of how memory can be reserved in multiple video memories for mapping multiple logical video memory heaps. In addition to being used for a primary logical display surface, they can be used for allocating video memory to software applications for creating non-destructive graphics overlays and flippable buffers as well as for other types of display surfaces in accordance with a forth preferred embodiment of the invention. These surfaces can have large resolutions, for example for a display surface to be flipped with the primary display surface or can have small resolutions, for example to be used with small overlays or sprites used in a computer game. This embodiment is similar to the previous embodiment in that a two column by two row arrangement of frame buffers is being used to drive four display devices, but has an advantage of allowing multiple display surfaces to be created and used by software applications. Also, as in the previous embodiment, a Windows 95 display mini-driver is used with a single logical frame buffer for accessing the four frame buffers with selected graphics functions utilizing graphics acceleration. Also the page shuffling is performed using the address translation hardware of a Pentium II with a page size of 4096.

In order to provide storage for the multiple logical video memory heaps with the proper page alignment when limited to a 4096 page size, display controllers that can access 8 or more megabytes of video memory are appropriate. One such display controller that can access 16 megabytes is the RIVA TNT manufactured by NVIDIA Corporation. In order for software applications to be able to utilize flippable logical frame buffers and logical overlay frame buffers, in addition to the Windows 95 display mini-driver, a DirectDraw device driver or HAL is also utilized. This allows software applications to use the standard DirectDraw software interface for creating and operating on logical display surfaces, but for the current embodiment for surfaces that can span multiple frame buffers as well as display surfaces that are contained within a single frame buffer.

Video memory areas 218, 226, 234, and 242 are mapped as in FIG. 17A into a primary logical video memory heap, but corresponding to a logical frame buffer with a width of 8192 bytes and a height of 2048 lines. This primary heap is used to store the logical frame buffer that is associated with the desktop for logical video modes that fit within the 8192 byte width and 2048 line height. Three additional logical video memory heaps are similarly mapped using the three groups of memory areas with first group using memory areas 220, 228, 236, and 244 with second group using memory areas 222, 230, 238, and 246 and with third group using memory areas 224, 232, 240, and 248.

Figure 27B:
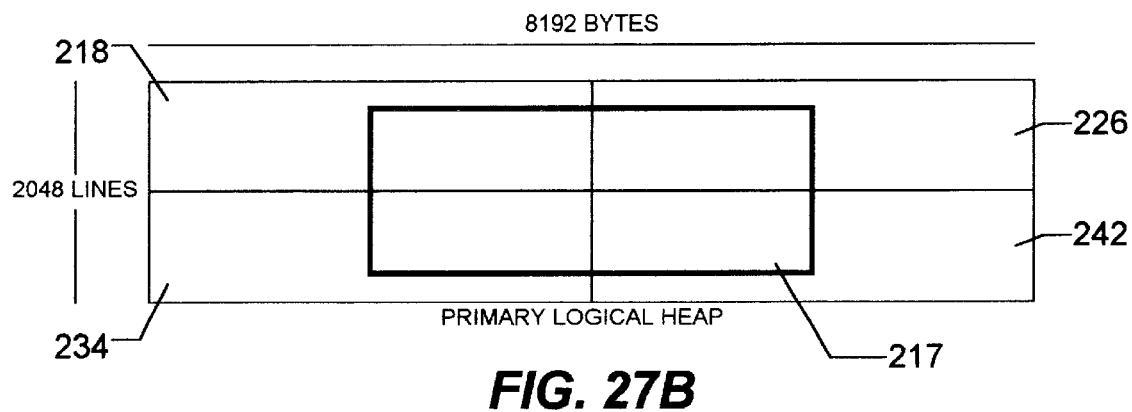
FIG. 27B shows a portion of a primary logical heap being used for a logical desktop comprised of four 1024 by 768 by 16-bit frame buffers.
Figure 27C:
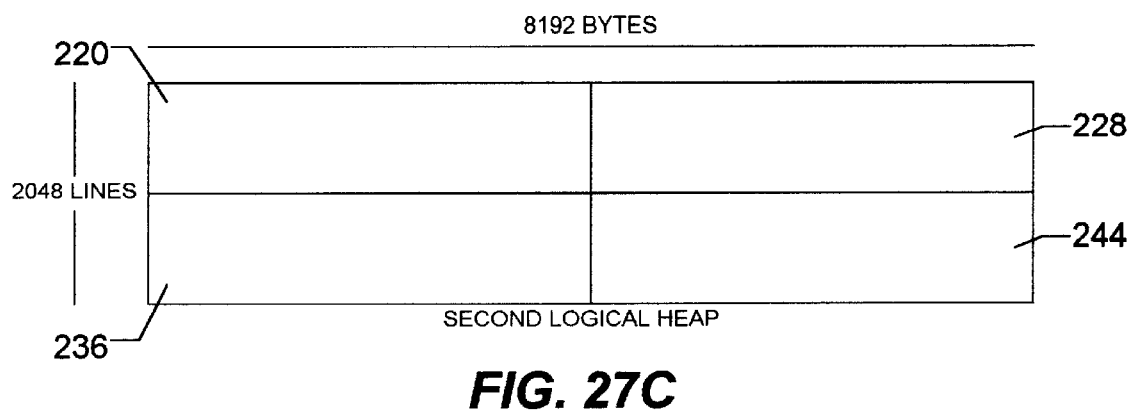
FIG. 27C shows one of three additional logical heaps.

FIG. 27B shows the portion of the primary logical heap that is used for a logical desktop 217 comprised of four 1024 by 768 by 16-bit frame buffers. The memory within the primary logical heap, but outside of the logical desktop 217 area can be allocated to other display surfaces and miscellaneous storage for the display device driver. Memory for other display surfaces can also be allocated from the other three logical heaps, one of which is shown in FIG. 27C. Memory is allocated from the primary heap when the video mode is set for the Windows desktop, however any additional logical display surfaces are created on an as needed basis by requests from DirectDraw software applications. The display surfaces created based on requests from DirectDraw applications need not span all four frame buffers and need not be of the same pixel format as the primary surface, for example overlays can use different pixel formats. However, a display surface that will be flipped with the primary surface uses the same pixel format as the primary surface.

The procedure for implementing a DirectDraw HAL is described in the DirectDraw DDK, however the video memory heap management software provided by DirectDraw is not used by the current embodiment. The DirectDraw DDK describes a procedure for reporting available video memory areas to be used as video memory heaps by DirectDraw. When an application requests that a display surface be created, DirectDraw's heap manager software can assign a memory area within one of these heaps to be used for the display surface from one of the heaps. However, for the current embodiment, for display surfaces that span multiple frame buffers, the boundaries between the frame buffers must be page aligned. DirectDraw allows for the first pixel in a display surface to be aligned by a specified parameter, but for the current embodiment, certain pixels within a logical scan line of a logical display surface need to be page aligned. Also, for the current embodiment, after a display surface is created, such as for an overlay, the display surface is typically loaded with image data before it is positioned on the display. However, in order to page align the image data, the position within the multiple frame buffers needs to be known. Therefore, the current invention moves the display surface in memory if needed at the time the overlay is enabled at a specified position. There is no need to move the memory of overlays spanning over the complete desktop as the surface alignment is initialized properly because the resolution and position of the desktop are known. Small overlays that are repeatedly moved around the screen, such as for a computer game, are sometimes referred to as sprites. For sprites, the HAL copies the image data of the sprite to the video memories of the multiple display controllers if there is sufficient memory to do so. This allows better graphics performance when the sprite is being positioned over a boundary between frame buffers, as there is no need to move the display surface in memory to satisfy the alignment requirements. For a given display controller, any image data of the sprite corresponding to the adjacent frame buffer is clipped at the extents of the frame buffer. Due to these specifics of a system with multiple frame buffers, DirectDraw's heap manager is not used, but custom heap management software for keeping track of used and available video memory is included with the HAL software specifically written for the multiple frame buffer system.

Though four logical heaps are created when the display system is initialized in this example embodiment, the custom heap management software keeps track of the physical memory used and available in the four video memories.

Page shuffling is performed for the four logical heaps at initialization to prevent the need to perform the mapping whenever a surface is created. However, there are still times when the display surface resources provided by the four heaps will not be sufficient for a display surface being requested, but with the physical video memory resources still being sufficient. A situation requiring dynamic page mapping in this embodiment is if more than four display surfaces will span the four frame buffers, such as the primary surface and a combination of four or more overlay buffers and flippable buffers. In this case, the custom heap management software provides for dynamically mapping the page shuffling for display surfaces.

The custom heap management software implemented in the HAL is initialized with a list of physical memory areas in each of the four physical video memories that are available for use by DirectDraw surfaces. As display surfaces are allocated from the four logical heaps or when display surfaces use a dynamic page mapping, the physical memory areas assigned to these surfaces are added to a list of physical memory areas in use. Physical addresses are used to manage the video memory because more than one linear address page can be mapped to a common physical address page, as is the case after a dynamic page mapping is performed. The heap management software reserves a large contiguous area of a heap appropriate for a display surface that can be flipped with the primary surface for as long as possible until a time when a display surface is requested that cannot be allocated from anywhere else. To make a larger contiguous area available, display surfaces can be relocated in memory when not being displayed and when not locked by an application.

Figure 28:
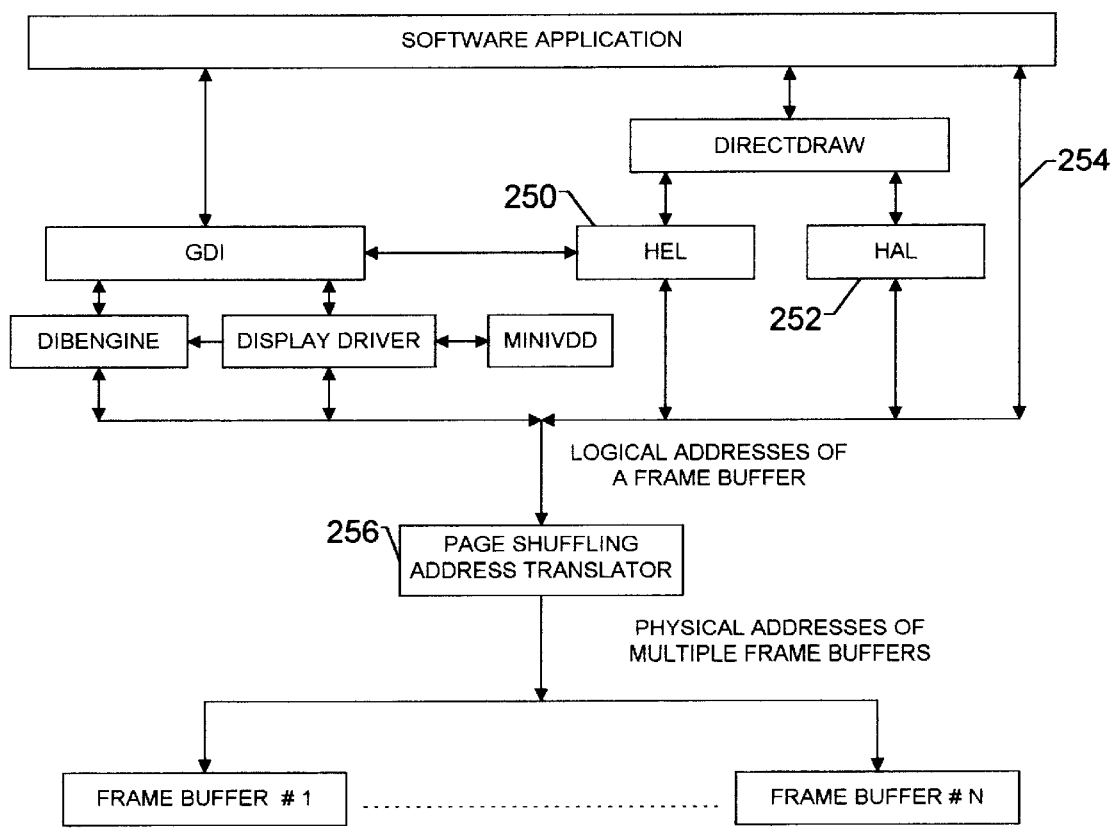
FIG. 28 shows the relationship between various software components related to the display in Windows 95 including DirectDraw components and how they relate to the logical frame buffer.

FIG. 28 shows the relationship between various software components related to the display in Windows 95 and how they relate to the logical frame buffers. The software components shown include the DirectDraw Hardware Emulation Layer (HEL) 250 provided by Microsoft and the Direct Draw HAL 252 written to control specific display controller hardware or as in the case of this embodiment the hardware of multiple display controllers. Another advantage of this embodiment is that a direct frame buffer access path 254 allows software applications to access the multiple frame buffers as a single logical frame buffer. The software applications obtain an address and pitch for a display surface by calling the DirectDraw Lock method. The capability of accessing the multiple frame buffers as a single logical frame buffer is provided by the page shuffling address translator 256. Another advantage of this embodiment is that full screen exclusive mode type DirectDraw applications can be created that span the multiple frame buffers allowing DirectDraw applications to change the logical video mode, change the color palette, and perform flipping with the primary surface.

Figure 29A:
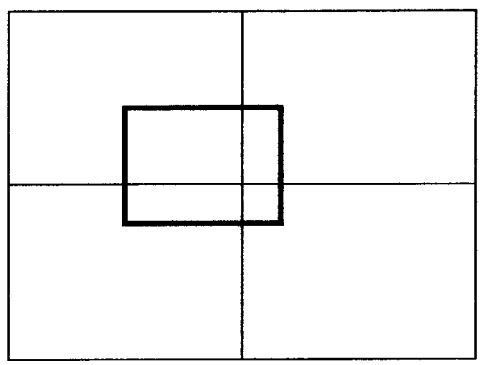
FIGS. 29A, 29B, 29C, and 29D show various types of overlays in a multiple frame buffer system.
Figure 29B:
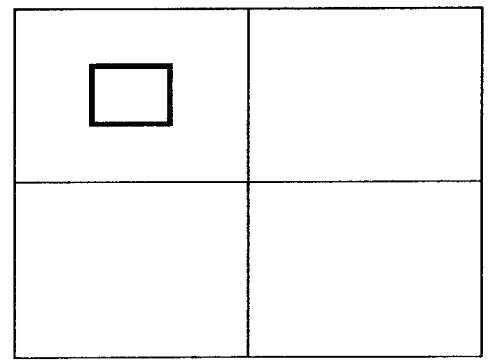
Figure 29C:
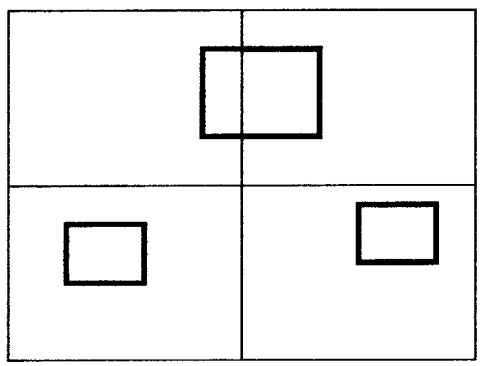
Figure 29D:
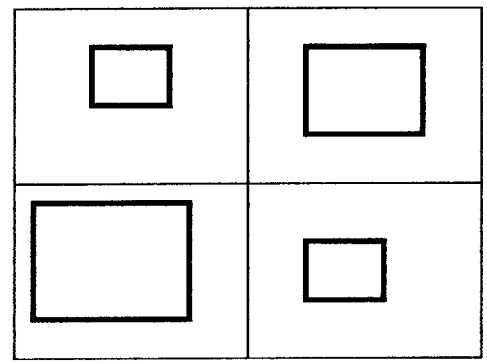
Figure 29E:
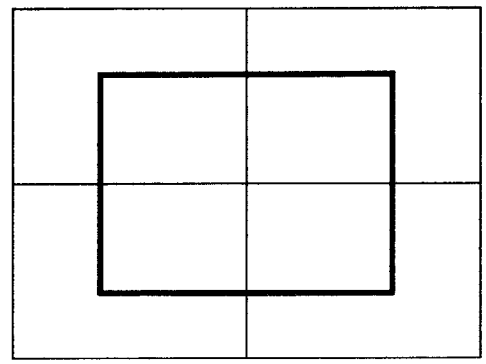
FIG. 29E shows an overlay centered in the four frame buffers that is appropriate for displaying image data for a logical video port.

FIGS. 29A, 29B, 29C, and 29D show various types of overlays in a multiple frame buffer system. FIG. 29A shows an overlay that spans multiple frame buffers, so it is implemented as a logical frame buffer by allocating an area from a logical heap. FIG. 29B shows an overlay that does not require page shuffling since the overlay does not span multiple frame buffers. The display surface memory for this overlay can be allocated from a logical heap or if the heap manager is trying to reserve a large contiguous area of a heap then the heap manager will dynamically map the surface without page shuffling. FIG. 29C shows one overlay requiring page shuffling and two that do not. FIG. 29D shows four overlays that do not require page shuffling. FIG. 29E shows an overlay centered in the four frame buffers such that the four physical overlays are the same size. This type of overlay can display image data for a logical high resolution video port.

Figure 30:
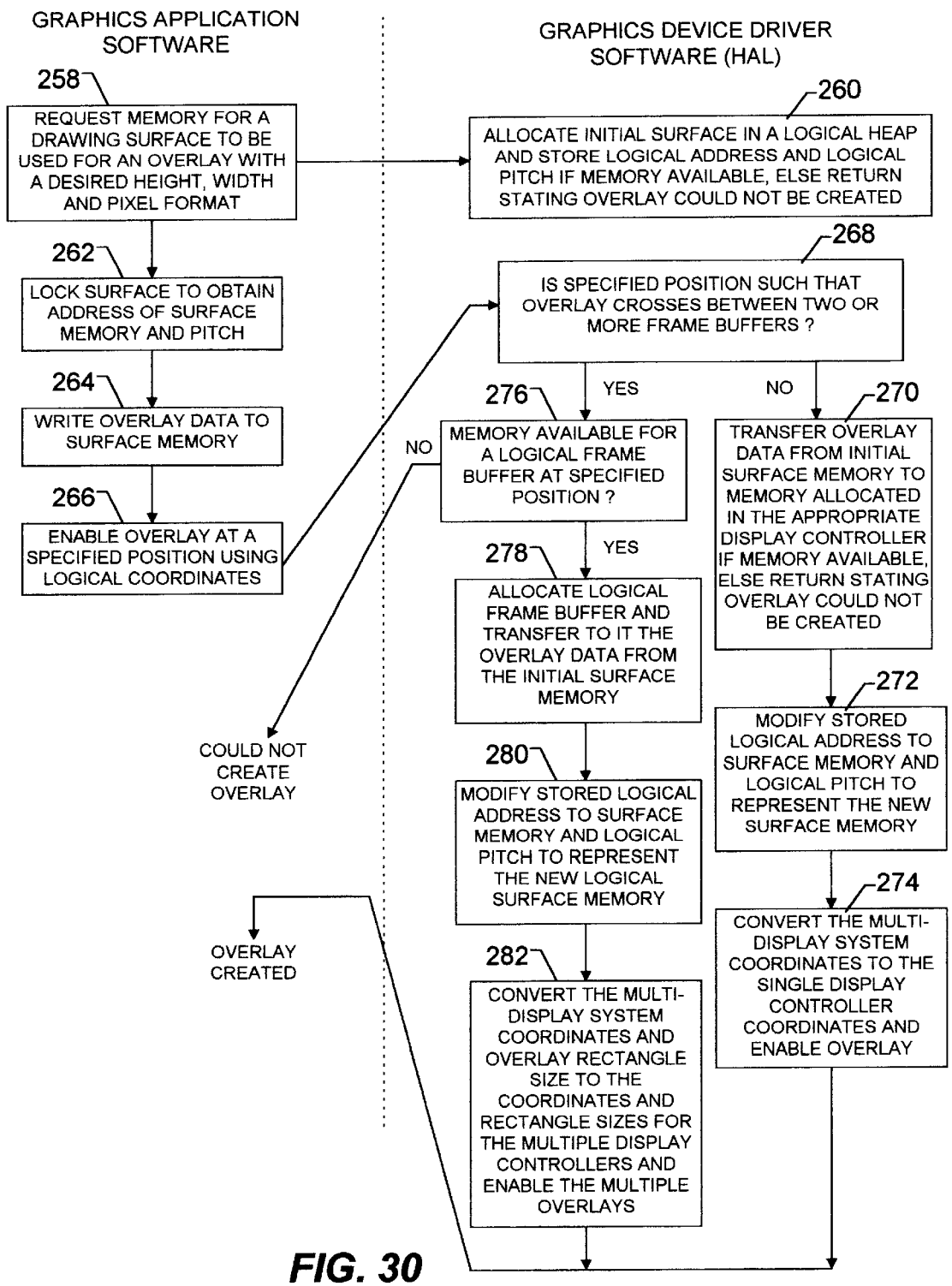
FIG. 30 is a flow chart of steps describing the interaction between a software application and device driver for creating and displaying a logical overlay.

FIG. 30 is a flow chart describing the interaction between a software application and the HAL for creating and displaying a logical overlay in accordance with this embodiment. A DirectDraw software application performs a Create Surface step 258 requesting for a display surface to be used for an overlay. The request is forwarded to the HAL where an Allocate Initial Surface step 260 allocates an initial area in a logical heap and records the logical address and logical pitch of the display surface. Also a record is made of the physical memory used. The application then performs a Lock Surface step 262 to obtain the logical address and logical pitch of the display surface. A Write Data step 264 utilizes the obtained address and pitch to access the surface memory and writes image data for the overlay. An Enable Overlay step 266 specifies logical coordinates defining a requested position for the overlay within the multiple frame buffers. A Test Overlay Position step 268 determines if the overlay size and position causes the overlay to require being stored in more than one frame buffer. If not, a Transfer To Single Frame Buffer step 270 will transfer the overlay image data written in the Write Data step 264 from the memory allocated in the Allocate Initial Surface step 260 to the one of the multiple frame buffers its position specifies, if video memory is available, This transfer does not occur if the initially allocated surface memory in step 260 happened to be completely in that frame buffer already. A record is made of any physical memory used and any made available. If there is not sufficient video memory available then the function returns indicating overlay cannot be created at specified position. If sufficient memory, a Modify Surface Address step 272 changes the logical address and logical pitch of the surface object, so that the next time the application wants to access the surface memory, the Lock method called by the application will return these new surface parameters. An Enable Overlay Hardware step 274 is then performed to convert the multiple display coordinates to the coordinates of the single physical frame buffer. The converted coordinates, the physical address of the overlay memory and a physical pitch are programmed into the display controller that corresponds to the physical frame buffer and then the display controller is programmed to enable the display of the overlay. If the Test Overlay Position step 268 determines the overlay requires being stored in more than one frame buffer, a Test Memory Available step 276 determines if physical address space with the proper alignment is available for the display surface. If not, a return to the application is made indicating the overlay could not be created. If the available physical memory space is in a logical heap, an Allocate Logical Frame Buffer step 278 determines the logical address and logical pitch within the logical heap. Alternately, if physical memory is available that requires dynamic mapping, the page shuffling if performed and a logical address and pitch is obtained. A record is made of any physical memory used and any made available. The overlay image data is then transferred from the initial surface memory to the logical frame buffer just allocated. This transfer does not occur if the initially allocated surface memory happened to be aligned properly. This is as in the case of an overlay being created that is the same size as the desktop as the heap management software creates initial surfaces with the proper alignment for surfaces having the same resolution as the desktop. A Modify Surface Address step 280 changes the logical address and logical pitch of the surface object. An Enable Multiple Overlay Hardware step 282 converts the position and rectangle size of the logical overlay into positions and rectangle sizes for the multiple frame buffers. The physical addresses for each of the rectangles is determined and are used along with the physical pitch and the converted positions and rectangle sizes to program the display controllers to enable the overlays for each of the frame buffers. The physical pitch used in Enable Overlay Hardware step 274 or Enable Multiple Overlay Hardware step 282 is 4096 if the logical frame buffer was allocated from one of the four logical heaps. However, for a dynamically mapped logical display surface the physical pitch could equal the width of the surface if a contiguous range of linear addresses is available for the surface.

In addition to the DirectDraw HAL containing the custom heap management software for video memory that is written for the multiple frame buffer system, the HAL also duplicates certain hardware acceleration functionality for the multiple frame buffer system that is provided in the display mini-driver software as described in the previous embodiment. DirectDraw provides a software interface between DirectDraw applications and the HAL for hardware acceleration functions such as BitBLTs. Incorporating certain acceleration functions into the HAL is what is conventionally done for single frame buffer systems because a performance gain is achieved by the computer not having to switch from the 32-bit protected mode used by the HAL to the 16-bit protected mode that is used by the mini-driver. However, for BitBLTs that span multiple frame buffers the software incorporated into the HAL uses a combination of hardware BitBLTs and bus master DMA accesses similarly to that described in the previous embodiment.

FIG. 31A shows four frame buffers in a two column arrangement with selected areas within the frame buffers used for calibrating the optics of a four projector display system by overlapping regions of the four projected displays when calibrating in accordance with a fifth preferred embodiment of the invention. An advantage of this embodiment is that a multiple projector system configured to use a single logical frame buffer can have its optical system calibrated while the video streams are configured for a desired video mode and refresh rate. This allows the portions of the display generated from the multiple video streams to be aligned properly on a projection screen. The multiple frame buffer arrangement of FIG. 31A can be implemented in a 4096 byte page size system, such as by using the integrated address translation capability of a processor as described in a previous embodiment. However, there is a difference in that a small portion of each of the frame buffers is reserved for the calibration process. A upper left frame buffer 284 contains four regions labeled A, A1, A2, and A3 that are used for storing image data associated with the upper left portion of a logical frame buffer. Upper left frame buffer 284 also contains five regions labeled B1, B3, D3, C3, and C2 that are only written with image data during the calibration process, where the image data corresponds to calibration patterns. When not calibrating, regions B1, B3, D3, C3, and C2 contain image data that does not contribute to the display output, for example image data corresponding to the color black. The regions A1, A3, and A2 are also written with image data corresponding to calibration patterns during the calibration process, but only after the image data that corresponds to regions of the logical frame buffer are saved such that the image data can be restored after calibration is complete. Similarly, regions B, B1, B3, and B2 in upper right frame buffer 286, regions C, C2, C3, and C1 in lower left frame buffer 288, and regions D, D1, D3, and D2 in lower right frame buffer 290 are used for storing image data associated with the logical frame buffer. The remaining five regions in each of the four frame buffers are used for calibration purposes, similar to that described for the upper left frame buffer. The alignment requirements for page shuffling for the current embodiment are such that in upper left frame buffer 284 the right side of regions A1, A3, and C3 are page aligned. For upper right frame buffer 286 the left side of regions B1, B3, and D3 are page aligned. For lower left frame buffer 288 the right side of regions A3, C3, and C1 are page aligned. For lower right frame buffer 290 the left side of regions B3, D3, and D1 are page aligned. In upper left frame buffer 284, this alignment requirement puts the storage for the first scan line in the B1 region in the same physical page as the second scan line of the A and A1 regions therefore the calibration software has a page mapping available for accessing this first scan line of region B1. However certain other scan lines within certain regions will have to have pages mapped separately, so that these scan lines within these regions can be accessed by the calibration software. For example in upper left frame buffer 284 the physical memory for regions C2, C3 and D3 as well as the last scan line in area B3 must be mapped to allow the CPU to access to them. For upper right frame buffer 286, in addition to the regions C3, D3 and D2 having separate memory mapping requirements, with the exception of the first scan line in C3 which is already mapped, the first scan line of region A1 also requires a mapping due to the page alignment requirements of region B1. Due to having to map the first scan line of region A1 in upper right flame buffer 286, the physical memory page used for the start of region B1 must be offset from the start of the video memory by at least one page. Similarly, mappings are performed in lower left frame buffer 288 and lower right frame buffer 290 to regions or scan lines within regions as needed. FIG. 31B shows the resulting display size of the four projectors with a calibrated optical system where the horizontal resolution is 1276 pixels and the vertical resolution is 956 pixels. The logical pitch for this arrangement is 8192 and the pitch used by the display controllers is 4096. The current embodiment is configured for a pixel format utilizing two bytes per pixel. Four display controller boards each with four megabytes of video memory and a PCI interface are appropriate for this embodiment. One such display controller board is one based on the CL-GD5465 display controller manufactured by Cirrus Logic Incorporated.

FIGS. 32A, 32B, and 32C show sample calibration patterns for a vertical overlapping region, a horizontal overlapping region and a corner overlapping region, respectively. By adjusting the optics associated with the multiple video streams generated from multiple frame buffers, the display can be viewed while the optics are adjusted allowing the system to be calibrated. The adjustments are performed until the overlapping regions correspond to squares in this example embodiment. The calibration patterns are typically displayed only while calibrating. One skilled in the art can without extensive experimentation utilize various types of overlapping calibration patterns including overlapping patterns with different colors that form a new color when overlapped, as well as automate the calibration procedure by utilizing one or more cameras to feedback the alignment information in the form of captured images of the visual display. The computer system can analyze the captured image data to determine adjustments to the optical system that can be actuated by an electromechanical means, where an adjustment can be one of multiple adjustments in an iterative process.

The vertical overlapping regions in the example of FIG. 31A and FIG. 31B have a width in pixels of two, but this number of pixels can vary for different configurations of the embodiment. This could either be due to needs of a particular optical system requiring a larger overlapping region or due to pixel alignment requirements imposed by the operating system. For example, an operating system can place alignment requirements on the first pixel of a logical frame buffer, such as a requirement to be aligned on a four-byte boundary. With such an alignment requirement on the first pixel of the logical frame buffer and with a page alignment requirement at the frame buffer boundaries for page shuffling, the width in pixels of the vertical overlapping regions is selected such that both of these alignment requirements are satisfied for the number of bytes per pixel required by the pixel format.

Figure 33A:
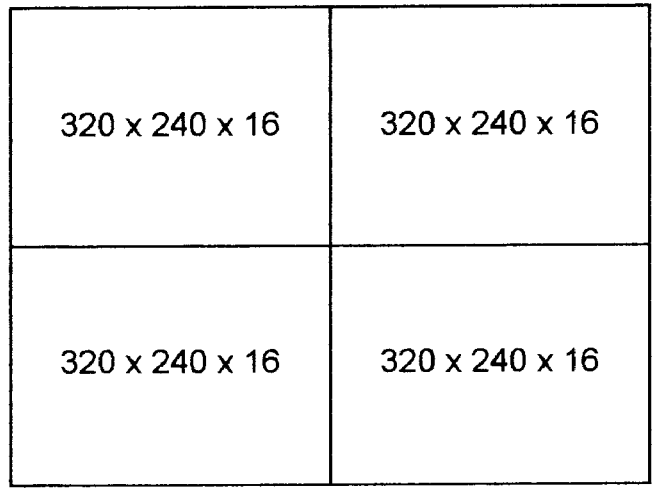
FIGS. 33A and 33B show four 320 by 240 by 16-bit frame buffers used to distribute a logical resolution of 640 by 480 across four 640 by 480 resolution display devices by using interpolated zooming in accordance with a sixth embodiment of the invention.
Figure 33B:
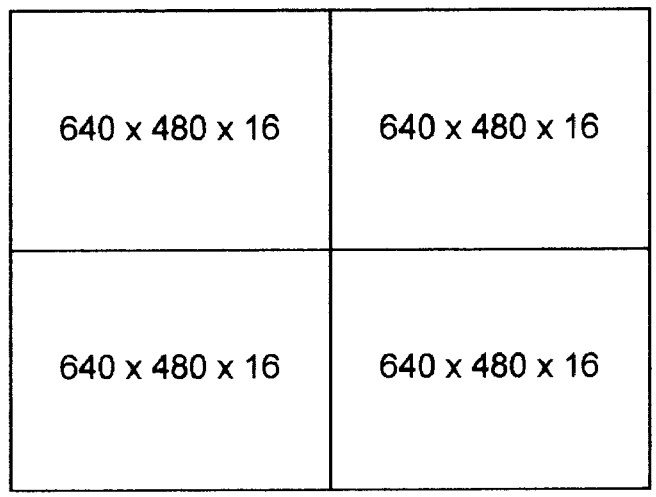

FIG. 33A shows four 320 by 240 by 16-bit frame buffers used to distribute a logical resolution of 640 by 480 across four 640 by 480 resolution display devices shown in FIG. 33B by using interpolated zooming in accordance with a sixth preferred embodiment of the invention. It is often desirable to provide a large display such as one comprised of multiple display devices, but without having a need for providing a high resolution, for example when the viewers can be various distances from the display. Also, certain applications sometimes require specific standard resolutions, yet it is often desirable to display these applications on a large screen. Since the amount of image data increases as the resolution increases for a given pixel format, it is advantageous to not utilize a higher resolution than required for a particular application. This prevents the computer from having to process an increased amount of image data unnecessarily.

This embodiment is implemented utilizing four display controller boards each with four megabytes of video memory and each based on the CL-GD5465 display controller in a Pentium compatible computer with four PCI slots. Each display controller is set to a video mode of 640 by 480 by 16 bits, but with 320 by 240 by 16-bit frame buffers configured as video windows to generate the video streams for the four 640 by 480 display devices. To allow the use of the address translation hardware in a Pentium based computer, the 320 by 240 by 16-bit video window frame buffers are accessed with a pitch of 4096 by the display controllers. Also, the reserved video memory areas are aligned to the right in a page for the left column frame buffers and are aligned to the left in a page for the right column frame buffers as was done in previous embodiments having two columns and a page size of 4096. The 640 by 480 by 16-bit logical frame buffer is configured to use a logical pitch of 8192 when addressed by the CPU. The CL-GD5465 display controllers are configured to use video windows with no occlusion, so neither color keying nor chroma keying are required. The video windows are configured for a size of 320 by 240 and to use a RGB16 pixel format. The video windows are configured to scale by two times in both the horizontal and vertical directions to interpolate the 320 by 240 image data to a 640 by 480 video stream. The procedures for configuring the CL-GD5465 display controllers are described in the CL-GD5465 data book. The 16-bit pixel format for this example embodiment uses six bits for green and five bits each for red and blue. The mapping for the page shuffling uses the physical page addresses corresponding to the beginning of the video memory areas used for the video windows in the four video memories associated with the four display controllers.

FIG. 34A is a block diagram of a conventional display controller that includes an address decoder 283, PCI bus control logic 285, and a display controller core 287. The address decoder 283 accepts an address from an interface bus, such as the PCI bus and depending on the value of a base address stored in a configuration register and the size of the address space reserved by the display controller, a PCI cycle is either claimed or not claimed by the PCI bus control logic 285. Typically in a PCI system, the base address is initialized by plug-and-play software at boot up with the display controller requesting a specific size of physical address space, but the base address can be modified at a later time if so desired. A contiguous range of physical address space is reserved for the display controller. A previous embodiment described how to map a single logical frame buffer to multiple frame buffers by performing page shuffling by using the paging mechanism integrated within a processor's memory management unit. The logical addresses are contiguous for that previous embodiment, but the physical addresses to which they are mapped are not contiguous. Though that previous embodiment provides a low cost method of addressing multiple frame buffers as a single frame buffer, it is limited to page sizes supported by the processor, such as a page size of 4096. Though a method was shown that provides flexibility for configuring various frame buffer resolutions and pixel format sizes in one and two column frame buffer arrangements, the arrangements containing more than two columns of frame buffers had a limitation due to the single page size. The frame buffers that were sandwiched between adjacent frame buffers to the left and right in an arrangement needed to have their scan line storage page aligned at the beginning and end of the scan line. This limited these frame buffers to widths equaling an integer number times the page size, such as 4096 or 8192 for example. The arrangement of the embodiment shown in FIG. 22 configured a three column arrangement of frame buffers utilizing video modes of 1024 by 768 by 32 bits. This was appropriate for more than three columns because the width of a scan line in a frame buffer was 4096. In order to provide the flexibility of providing various video modes when configuring multiple frame buffers with more than two columns, it is advantageous to provide address translation using paging with page sizes smaller than 4096. Appropriate page sizes for various resolutions and pixel format sizes are listed in FIG. 6.

For processors that do not provide a desired page size, address translation utilizing small page sizes can be implemented external to the processor or external to a processor core if integrated with a processor. This address translation hardware can be implemented anywhere between a CPU's address bus and the image storage memory addresses in an embodiment of the invention. However, due to the high speeds of computer interfaces, it is often preferable to integrate the address translation circuitry with an existing computer system component. For example, the small page size address translation circuitry can be integrated in a processor, a host bridge that connects a processor to an interface bus, a bus to bus bridge that connects distinct interface buses that may or may not be of the same bus type, or in the display controllers. The address translation functionality can also be distributed among the various components that couple the CPU to the image storage memory. FIG. 34B is a block diagram of an ASIC that integrates address translation circuitry with a display controller core. A display controller core 287 is integrated in a single ASIC with address decode, page shuffling, and disconnect logic 289, and PCI bus control logic 292 to enable the use of small page sizes in accordance with a seventh preferred embodiment of the invention. This provides an advantage of increased flexibility in configuring various arrangements of the frame buffers and also allows optimum use of video memory. The PCI bus control logic 292 is similar to the PCI control logic 285, accept that it now interfaces to the address decode, page shuffling, and disconnect logic 289. The address decode can claim PCI cycles when normal display controller accesses are performed, such as for accessing MMIO registers of the display controller for configuring the display controller. Also the address decoder can claim PCI bus cycles corresponding to portions of a logical high resolution frame buffer, where the portions decoded correspond to non-contiguous video memory pages. The addresses and data on the PCI bus are multiplexed, but an address needs not be presented on the bus for every memory access. For example, the PCI bus allows burst access cycles where a single start address is followed by multiple accesses to sequential memory addresses. The sequential memory addresses in a burst actually count by four, since the PCI bus is 32 bits wide or four bytes. Byte enable signals on the PCI bus determine for which of the four bytes a memory access is enabled. In order for the current embodiment to perform address translation for page shuffling, sequential burst accesses are sometimes terminated by the disconnect logic initiating a known type of PCI cycle referred to as a disconnect cycle. Disconnect cycles are initiated at sequential addresses within a burst access that correspond to a small page size boundary that also correspond to a boundary between adjacent frame buffers in the multiple frame buffer arrangement. Responding to a disconnect cycle, the PCI interface circuitry that initiated the burst access halts the burst access and subsequently performs a new access cycle or burst access cycle with an address corresponding to where the disconnect occurred. This allows an address to be placed on the bus allowing the display controller corresponding to the adjacent frame buffer to claim the PCI cycle and allows the address translation circuitry to perform the required page shuffling. A disconnect cycle can also be initiated by the display controller such as due to its write FIFO being full. Due to a PCI address corresponding to four bytes, the scan lines within the frame buffers are aligned on four byte boundaries, this provides a lower limit of a page size of four for this embodiment. Though an embodiment of this invention can utilize a page size as small as one allowing every address to be translated thus providing maximum flexibility, as the page size is made smaller the complexity or circuit size of the address translator increases. This embodiment utilizes a look up table (LUT) RAM to perform page translations for variable page sizes, where as the page size is decreased, a larger portion of the LUT is used.

It is known that the design of an ASIC can consist of schematics, hardware description language (HDL) code or a combination of the two. If a portion of a design is to be reused in multiple designs, that portion of the design can be packaged into a conceptual black box or module. The module can then be reused and recompiled in a new design without having to expose the details of the module to the new design. A design can be hierarchical where modules can contain modules, thus enabling more complex systems to be designed in a shorter amount of time. Reusable modules are sometimes referred to as cores. Various known display controllers come in a PCI bus version and an AGP bus version where a display controller core is common to both, but with the bus interface circuits being different. VHDL is a known HDL that allows portions of a design to be packaged into reusable components or cores. The current embodiment integrates a display controller core 287 and PCI bus control logic 292 with the address decode, page shuffling, and disconnect logic 289 specific to this embodiment. A display controller core appropriate for this embodiment is one that can be interfaced to the PCI bus and that allows random access to the video memory without bank switching. One such display controller core is that of the CL-GD5446 graphics accelerator manufactured by Cirrus Logic. An advantage of the CL-GD5446 over other devices is that it consumes only 16 megabytes of physical address space. The operation of PCI bus control logic is well known in the industry and described in the PCI Local Bus Specification, Revision 2.1 available from the PCI Special Interest Group. The implementation of the address decode, page shuffling, and disconnect logic 289 utilizes standard parameterized modules that can be incorporated into the design. In VHDL a standard library of parameterized modules (LPM) is available. Modules such as these are used as the components in the following description of this embodiment. These include, but are not limited to registers, multiplexers, counters, and the RAM used for the LUT. The RAM used for the LUT is of the LPM_RAM_DQ type as this utilizes separate data buses for input and output, but RAMs with a shared data input and output bus can also be used in an embodiment. Another known HDL with a library of standardized components that can also be used to implement the current embodiment is Verilog.

The current embodiment is configured using six of the display controller ASICs of FIG. 34B mounted on the motherboard of a computer. The PCI interfaces of the six ASICs are connected to a conventional host processor to PCI bridge circuit and the display controllers are driving six display devices each having a resolution of 800 by 600. Each display controller is coupled to 4 megabytes of video memory. The display devices and hence frame buffers are configured in a two row by three column arrangement with the frame buffers utilizing 8 bits per pixel for this example arrangement. To provide the necessary alignment for page shuffling, the center column frame buffer must have a scan line width that is an integer number times the page size. A page size of thirty-two allows exactly twenty-five pages in the width of 800.

FIG. 35 is a table listing a range of logical page numbers that are input to multiple display controllers that contain small page size address translation circuitry. The page number ranges listed for the three columns are for selected logical scan lines in the two row by three column arrangement of frame buffers. For two rows of frame buffers each containing 600 scan lines, logical scan lines range from zero to 1199. A column labeled offscreen contains logical page number ranges for pages that will not store image data. The offscreen pages are not mapped to any physical memory, so there is no impact on the usage of video memory. The current embodiment includes this offscreen area to reduce the complexity of the logical frame buffer address decoding circuitry in each of the display controllers. This allows the seven least significant bits of the page number to be used for decoding the column. An embodiment of the invention can implement a logical frame buffer without this logical offscreen area by utilizing a LUT output bit as an address decoder, but this requires a larger size LUT than required by this embodiment.

Figure 36:
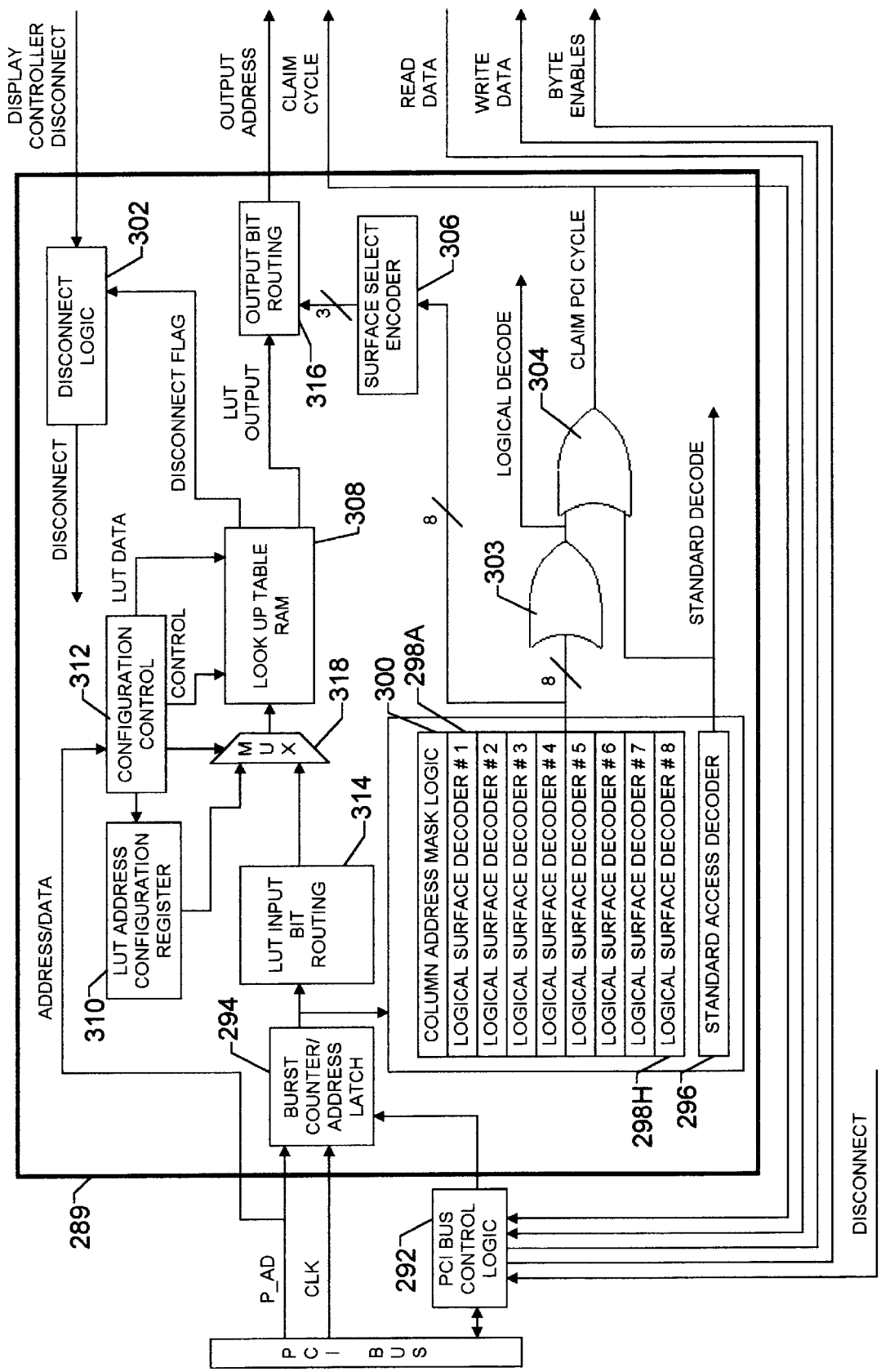
FIG. 36 is a block diagram of the page shuffling, address decoding, and disconnect logic.

FIG. 36 is a more detailed block diagram of the address decode, page shuffling, and disconnect logic 289 that is contained in each of the six display controllers of the current embodiment. A burst address counter 294 is used to keep track of addresses within a PCI burst access cycle. The start address of the burst access is latched into the burst address counter 294 at the beginning of the cycle. The counter is incremented whenever a microaccess (a single access within the burst access) occurs with the counter not being incremented during wait states as determined from the PCI IRDY and TRDY signals. The start address latched at the beginning of a cycle is input to a standard access decoder 296, that determines if an MMIO access is to be performed in the display controller or if the video memory corresponding to the display controller is to be accessed without page shuffling. The start address is also input to a group of eight logical surface decoders 298A to 298H. These are used to determine if a logical frame buffer access is being mapped to a physical frame buffer within the video memory of the display controller. One of the eight logical surface decoders 298A to 298H is used to decode the logical primary display surface used for the Windows 95 desktop in this embodiment, The other seven are available for other display surfaces for use by DirectDraw applications, such as, but not limited to logical overlay buffers or logical flippable buffers. A column address mask logic circuit 300 is used to mask out address bits not significant to the column decoding with the masked address being input to each of the logical surface decoders 298A to 298H. A disconnect logic circuit 302 is used generate a disconnect signal at microaccesses within a burst access that correspond to a boundary between adjacent frame buffers. The disconnect logic circuit 302 is also used to combine this disconnect signal with the disconnect signal from the display controller core. An eight-input OR gate 303 is used to combine the outputs of the eight logical surface decoders 298A to 298H into a single logical decode signal. This also goes to an input of a two-input OR gate 304 with the other input coming from the output of the standard access decoder 296. The output of two-input OR gate 304 provides one decode signal that is input to the PCI bus control logic 292 and display controller core 287 with the output indicting if access is to be claimed. A surface select encoder 306 encodes the eight logical surface decoder output into three bits that correspond to a binary value indicating which logical surface is being addressed. A look up table RAM 308 is used to perform the page shuffling for logical surface accesses. A LUT address configuration register 310 is used to store the LUT address of a look up table RAM 308 entry being initialized by the CPU. Two PCI configuration access cycle are used by the CPU to write a single LUT entry, one to load the LUT address and one to write the LUT value. This is performed in two configuration access cycles because the number of configuration space addresses for a PCI device function is limited. A configuration control circuit 312 decodes the configuration access cycles and generates the control signals required to load the LUT address and LUT entries. The look up table RAM 308 has separate data input and output buses with the data input bus connected to the configuration control circuit 312 for loading the LUT entry data. A LUT input bit routing circuit 314 is used to select the address bits that correspond to the logical page. A output bit routing circuit 316 is used to route the LUT output data bits, surface select encoder bits and the input address bits to the output address. An LUT address multiplexer 318 switches the address input to the look up table RAM 308 to the LUT address configuration register 310 when the LUT entries are being initialized.

Figure 37:
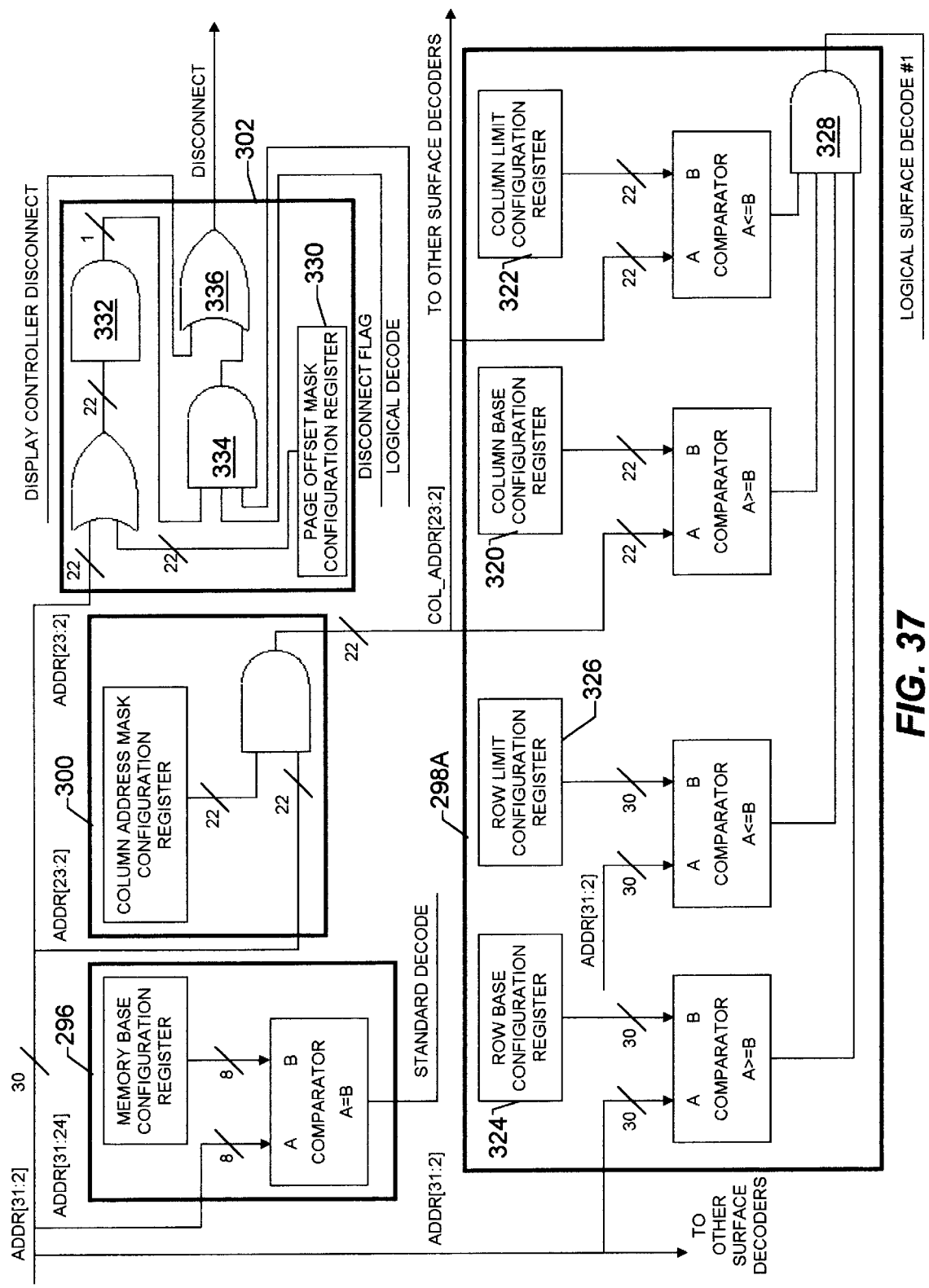
FIG. 37 is a block diagram showing details of the address decoding and disconnect logic.

FIG. 37 is a block diagram showing additional details of the address decoding and disconnect logic. The standard access decoder 296 contains a memory base register that is loaded by the plug-and-play BIOS when the computer boots up. A single comparator compares the most significant eight bits from the current access cycle to an eight bit value stored in the base register to determine if the access corresponds to a standard access in the display controller. The column address mask logic circuit 300 contains a twenty-two bit register and twenty-two two-input AND gates. The register is loaded from the CPU via a PCI configuration space access with ones in the bit positions that correspond to the lower significant bits of the logical address page number being used for decoding a column for the current arrangement and zeros in the remaining bit positions. For the arrangement shown in FIG. 35 ones are set in the seven least significant bits of the portion of the logical address that corresponds to the logical page. The output of the column address mask logic circuit 300 goes to two comparators in each of the eight logical surface decoders 298A to 298H with only 298A shown in FIG. 37. The logical surface decoders 298A to 298H contain a column base configuration register 320 and column limit configuration register 322 that are loaded by the CPU via PCI configuration cycles. For the arrangement shown in FIG. 35 a display controller corresponding to the center column has its column base configuration register 320 loaded with seven bits with a binary value of 19h (hexadecimal), but shifted to the bits corresponding to the least significant seven bits of the logical page. The column limit configuration register 322 is loaded and shifted similarly, but with a value of 31h. The logical surface decoders 298A to 298H also each contain a row base configuration register 324 and a row limit configuration register 326 that are also loaded by the CPU using PCI configuration cycles. For a display controller in the bottom row of the arrangement shown in FIG. 35, the CPU loads a value into row base configuration register 324 with zeros in the three least significant bits that correspond to the offset within a page, a value of 12C00h in the next eighteen bits and with the remaining nine bits corresponding to the most significant nine bits of the start address of a physical memory area that is reserved for accessing the logical surface. The row limit configuration register 326 is similarly loaded, but with the eighteen bit portion corresponding to a value of 257FFh. When all four comparators have outputs of "1", a four-input AND gate 328 outputs a "1" indicating the access is a logical surface access within a frame buffer of that particular display controller. Disconnect logic circuit 302 includes twenty-two two-input OR gates, a twenty-two-input AND gate 332, a three-input AND gate 334 and a two-input OR gate 336. A page offset mask configuration register 330 is loaded by the CPU using PCI configuration access cycles with a value of zero in the least significant three bit positions that corresponds to an address offset within a page and a one in the remaining nineteen bit positions. Each of the twenty-two output bits go into one input of a two-input OR gate with the other input of the OR gate going to a corresponding one of twenty-two address bits from burst address counter 294. This allows the last access in a page to be detected for any page size. All twenty-two OR gate outputs being "1" indicates the current access or microaccess corresponds to the last access in a page and the twenty-two-input AND gate 332 outputs a logic one. The output of the twenty-two-input AND gate 332 goes to one input of a three-input AND gate 334 with one other input coming from an output bit of look up table RKM 308 called the disconnect flag. The other input comes from a signal indicating if the access is a logical frame buffer access. This allows logical surface disconnects to only occur when a boundary between frame buffers is reached. A two-input OR gate 336 combines the logical surface disconnect signal from the output of three-input AND gate 334 with a disconnect signal from the display controller core 287. An embodiment of the invention can alternately implement a disconnect flag without using a LUT bit by using the output a comparator that generates a "1" when the output of column limit configuration register 322 is equal to the output of column address mask logic circuit 300.

Figure 38:
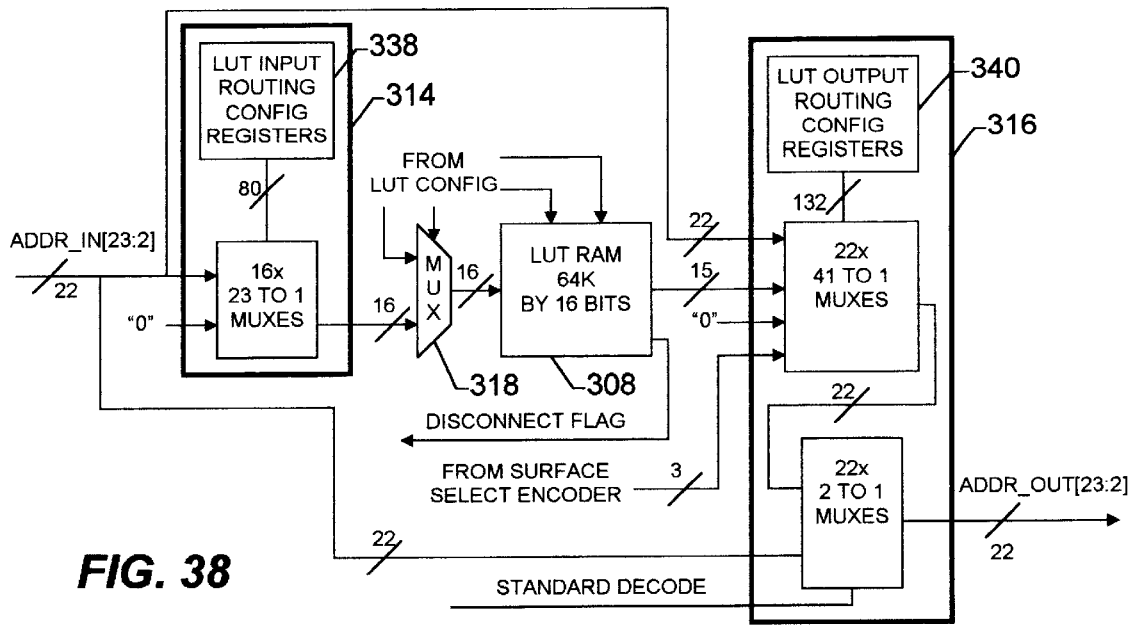
FIG. 38 shows a block diagram of the input and output bit routing sections of the page shuffling logic that enable the embodiment to be configured for various resolutions, page sizes, and arrangements of frame buffers.
Figure 39:
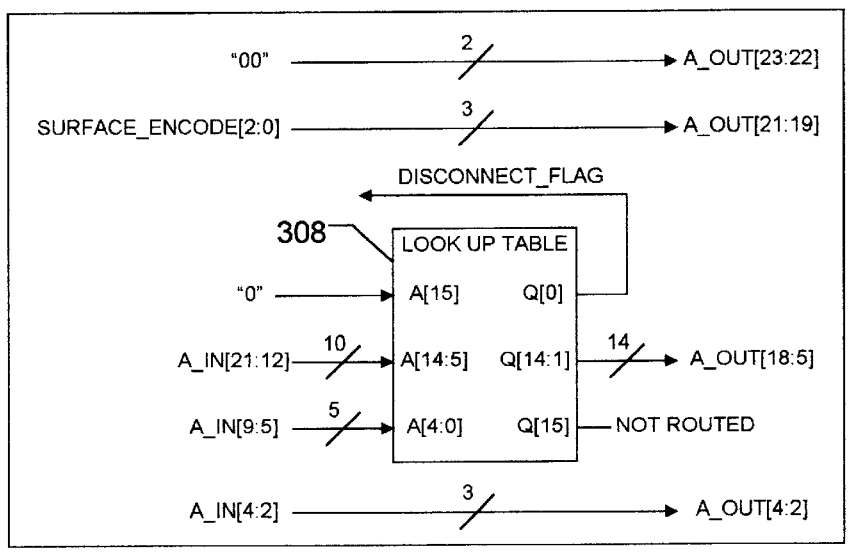
FIG. 39 shows the results of the LUT input and output bit routing when configured for the three column by two row arrangement of frame buffers.
Figure 40:
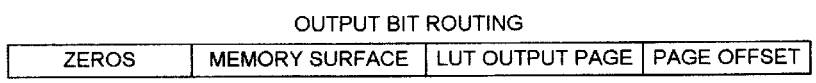
FIG. 40 shows how the output bit routing section organizes the output address bits.

FIG. 38 shows a block diagram with the LUT input bit routing circuit 314 and output bit routing circuit 316 of the page shuffling logic. By using these bit routing circuits, this embodiment can be configured for various resolutions, page sizes, and arrangements of frame buffers. The LUT input bit routing circuit 314 has an output of sixteen bits that are coupled to the input of look up table RAM 308 by LUT address multiplexer 318. The LUT input bit routing circuit 314 allows any of its input bits to be routed to any of the output bits by providing a twenty-three-input multiplexer for each of the sixteen output bits. Since a twenty-three-input multiplexer requires five select inputs, there are eighty select inputs used for the sixteen multiplexers. The eighty select inputs are driven by the output of LUT input routing configuration registers 338 that are loaded by the CPU using PCI configuration space accesses. For the arrangement shown in FIG. 35, since there are twenty-five pages in the width of scan line in a column, five bits can be used for accessing a LUT entry for a page in the scan line. Also, since there are 600 scan lines in a row, ten bits can be used for accessing any line in a row. Therefore fifteen address lines are sufficient for accessing a LUT entry for a page in any of the 600 scan lines. The LUT input routing configuration registers 338 are configured to route a "0" to the MSB of the sixteen bit output, since only fifteen bits are used. The least significant five bits of the eighteen-bit portion of the logical address that corresponds to the logical page number are routed to the least significant five bits of the sixteen-bit output. Shifting the eighteen-bit logical page number right seven bits converts the logical page number into an eleven-bit logical line number ranging from zero to 1199. The least significant ten bits of these eleven bits are routed to the next ten bits of the sixteen-bit output. The output bit routing circuit 316 has a twenty-two bit output that provides the address for the display controller core 287, where a single address can correspond to up to four bytes of data depending on the byte enable signals from the PCI bus. The output bit routing circuit 316 has twenty-two two-to-one multiplexers that allow either the page shuffled address or an standard access address to be output, with the select input of the two-to-one multiplexers being driven by the output of the standard access decoder 296. The bits that correspond to the page shuffled address are output from twenty-two forty-one-input multiplexers. Since a forty-one-input multiplexer requires six select inputs, there are one hundred and thirty-two select inputs required for the twenty-two multiplexers. This allows each of the twenty-two output bits to be routed from any of the forty-one inputs. The one hundred and thirty-two select inputs are driven by the output of LUT output routing configuration registers 340 that are loaded by the CPU using PCI configuration space accesses. Since the four megabytes of video memory are at the beginning of the sixteen-megabyte address space, zeros are routed to the two most significant bits of the page shuffled address. The three surface encoder bits are routed to the next most significant three bits. The fourteen LUT RAM output bits that correspond to the translated page are routed to the next fourteen most significant bits and the least significant three bits of the twenty-two bit input address are routed to least significant three bits of the page shuffled address, with these bits corresponding to the offset within a page. FIG. 39 shows the results of the LUT input and output bit routing. FIG. 40 shows how the output bit routing section organizes the output address bits. Though the number of surface encoder bits that are input to output bit routing circuit 316 is three for this embodiment, the number of these bits routed to the output can be less than three. For example, if the frame buffers are configured utilizing video modes requiring a larger amount of video memory. This circuitry is used by way of example to describe the invention; however, one skilled in the art could implement simplifications to reduce the amount of circuitry required in the ASIC or to reduce propagation delays. Such simplifications can be performed by minimization algorithms inherent to the ASIC compiler. Also the current embodiment shares the LUT input and output routing configuration registers 338 and 340 between all the surfaces as well as the column address mask logic circuit 300. However, one skilled in the art could utilize additional sets of these registers and additional LUT RAMs for every display surface to further increase the flexibility of the circuit, for example to allow display surfaces to have different resolutions and pixel formats.

FIG. 41 shows reserved memory areas for six display controllers and reserved areas for four physical memory blocks with the latter used for addressing the logical frame buffers. PCI display controllers request contiguous blocks of physical memory address space from the PCI plug-and-play BIOS when the computer boots up. For this embodiment the logical addresses are the physical addresses on the PCI bus with these physical PCI addresses converted to video memory addresses by the display controller ASIC's integrated page shuffling logic. CL-GD5446 display controllers request 16 megabytes for standard memory accesses from the plug-and-play BIOS. However, physical memory must also be reserved for the logical frame buffers. For this embodiment, one of the six display controllers requests four thirty-two megabyte blocks of physical memory 342A to 342D for use by the logical frame buffers, where more than one logical frame buffer can utilize a portion of a memory block. A single larger block of physical address space could also be reserved in an embodiment of the invention, but a request for four smaller blocks is more easily accommodated by the plug-and-play BIOS. Though a single display controller requests these four blocks of memory, the memory accesses cycles performed to one of the memory blocks can be claimed by any of the display controllers as determined by the settings in the four configuration registers 320, 322, 324, and 326 within the eight logical surface decoders, as shown in FIG. 37, within each of the six display controllers. A known method of configuring a display controller ASIC on power up is to use strapping resistors on selected pins of the ASIC. For this embodiment a strapping resistor is used to distinguish the ASIC requesting the blocks of physical memory for the logical frame buffers, allowing the use of one ASIC design for the six display controllers. However, in another embodiment of the invention, physical memory can be reserved by the device driver making calls to the operating system to determine available resources and add physical memory ranges to a specific device. In yet another embodiment of the invention, to minimize physical address space usage, the physical address space reserved by each of the six display controllers for standard accesses can be configured to all utilize a common reserved physical memory area. For this, standard access to only one of the six display controllers is enabled at a time, for example when configuring a device using MMIO.

FIG. 42 is a program listing in C language for computing the look up table entries for the arrangement of FIG. 35 for the center column frame buffer in the bottom row. FIGS. 43A, 43B, and 43C are tables listing the results of the look up table computation and the disconnect flag value for the twenty-five pages in selected lines. The values listed in these tables are in hexadecimal with the exception of the first column which is in decimal and corresponds to the logical line number in the multiple display ranging from zero to 1199. One skilled in the art can easily modify the program listing in FIG. 42 to obtain the look up table entries for the other five display controllers.

Figure 44A:
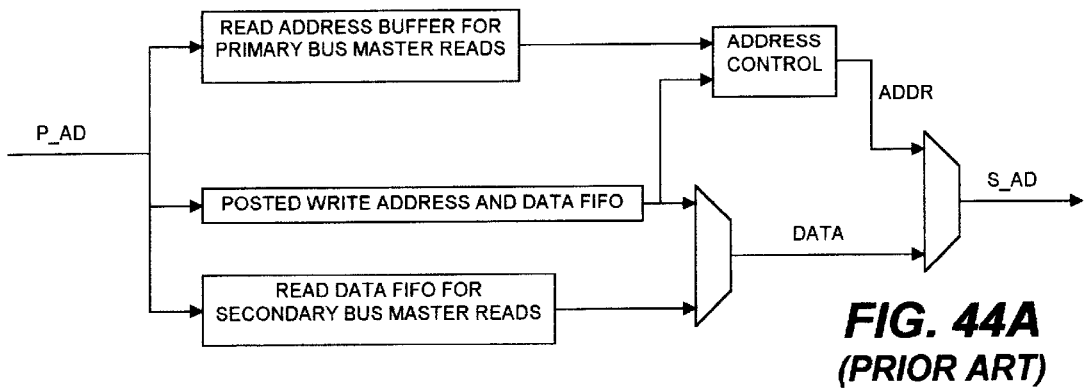
FIG. 44A is a block diagram of the downstream data path of a conventional PCI-PCI bridge circuit.

FIG. 44A is a block diagram of the downstream data path of a conventional PCI-PCI bridge circuit. To incorporate multiple PCI display controller devices on a single circuit board to be plugged into a single PCI slot or to increase the number of PCI display controller devices that can be mounted on a computer motherboard, the use of one or more PCI-PCI bridge circuits can be used to prevent violating loading limitations established by the PCI bus specification. Due to these, it is advantageous to be able to integrate address translation for page shuffling in a PCI-PCI bridge ASIC as reduced system cost can be achieved. This cost reduction is due to fewer custom ASICs being required as opposed to when the address translation is integrated with multiple display controllers as multiple conventional display controllers can share a single PCI-PCI bridge.

Figure 44B:
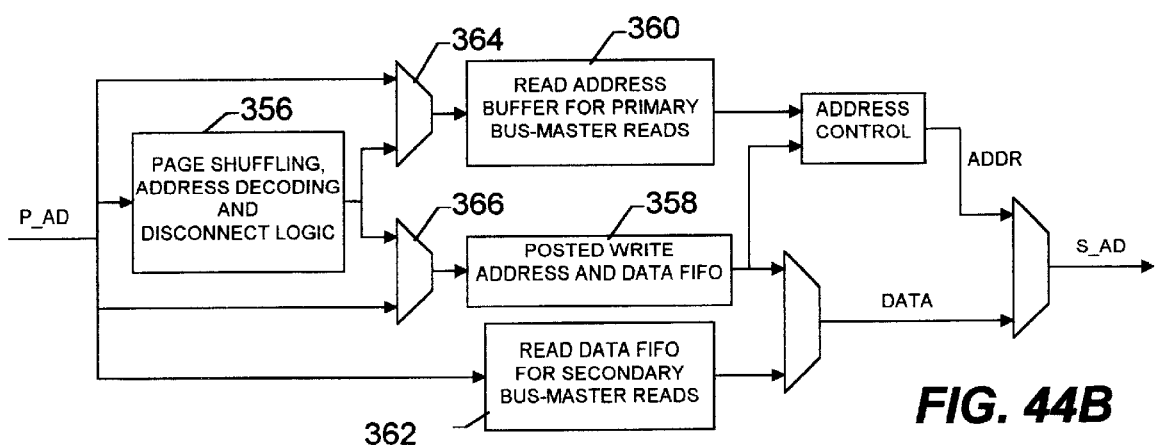
FIG. 44B is a block diagram of the downstream data path of a PCI-PCI bridge integrated with page shuffling, logical frame buffer address decoding and disconnect logic to enable the use of small page sizes in accordance with an eighth embodiment of the invention.

FIG. 44B is a block diagram of the downstream data path of a PCI-PCI bridge integrated with page shuffling, logical frame buffer address decoding and disconnect logic to enable the use of small page sizes in accordance with an eighth preferred embodiment of the invention. A custom PCI-PCI bridge ASIC with integrated address translation is designed by integrating page shuffling, address decoding and disconnect logic circuitry 356 with conventional PCI-PCI bridge circuitry. Similarly to the embodiment where the page shuffling, address decoding and disconnect logic is integrated with a display controller, disconnect logic is used to terminate PCI burst accesses at addresses that correspond to boundaries between frame buffers. For this embodiment however, the frame buffer boundary disconnect signal is combined with the conventional disconnect signal of the PCI-PCI bridge logic, which for example, could request a disconnect when a write FIFO is full. Other differences with this embodiment are a larger LUT RAM is used as the LUT RAM is shared between multiple PCI display controllers on the secondary bus of the PCI-PCI bridge as well as there being address decoding differences. A PCI-PCI bridge includes a downstream path as shown in FIG. 44B and an upstream path (not shown). These two paths connect the AD (Address/Data) signals (P_AD) of a primary PCI bus with the AD signals (S_AD) of a secondary PCI bus, where the processor containing a CPU is on the primary bus side and the display controllers are on the secondary bus side. For CPU accesses to the video memories associated with the display controllers, read access memory addresses are routed through a downstream read address buffer 360, while the data corresponding to the read are routed through an upstream read data FIFO (not shown). For CPU write accesses to the video memories, the addresses and data are both routed through a downstream posted write FIFO 358. The downstream read data FIFO 362 is used for routing read data associated with read cycles initiated by a bus master device on the secondary side of the PCI-PCI bridge. For logical frame buffer read accesses, the address routed through downstream read address buffer 360 is selected from the page shuffling logic using read multiplexer 364. For logical frame buffer write accesses, the address routed through downstream posted write FIFO 358 is selected from the page shuffling logic using write multiplexer 366.

Figure 45:
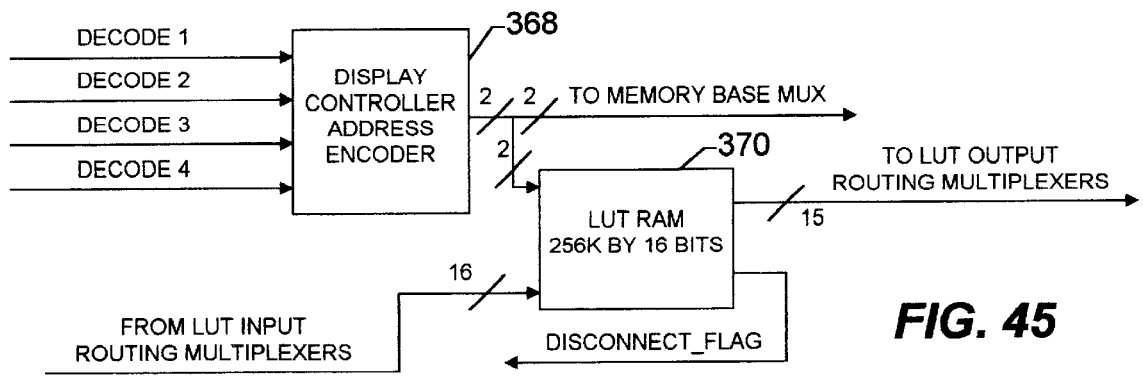
FIG. 45 shows how a single LUT is used with multiple conventional display controllers on the secondary bus of the PCI-PCI bridge.

FIG. 45 shows how a single LUT is used with multiple conventional display controllers on the secondary bus of the PCI-PCI bridge. The current embodiment is utilizing four conventional display controllers on the secondary bus, such as the CL-GD5446. A display controller address encoder 368 accepts four bits of input from four logical frame buffer decoders each associated with a different display controller and generates a two bit binary code corresponding to the one that is currently decoding true. If none of the decoders are decoding true, the output is not used by the current access. The two bits output from display controller address encoder 368 are input to the two most significant address inputs of a LUT RAM 370 allowing a forth of the LUT to be used for each of the four display controllers. Input and output bit routing multiplexers (not shown) are used similarly to a previously described embodiment to provide flexibility for varying page sizes and frame buffer arrangements. A disconnect flag is used as in a previously described embodiment to prevent burst access disconnects at page boundaries that are not also at a frame buffer boundary.

Figure 46:
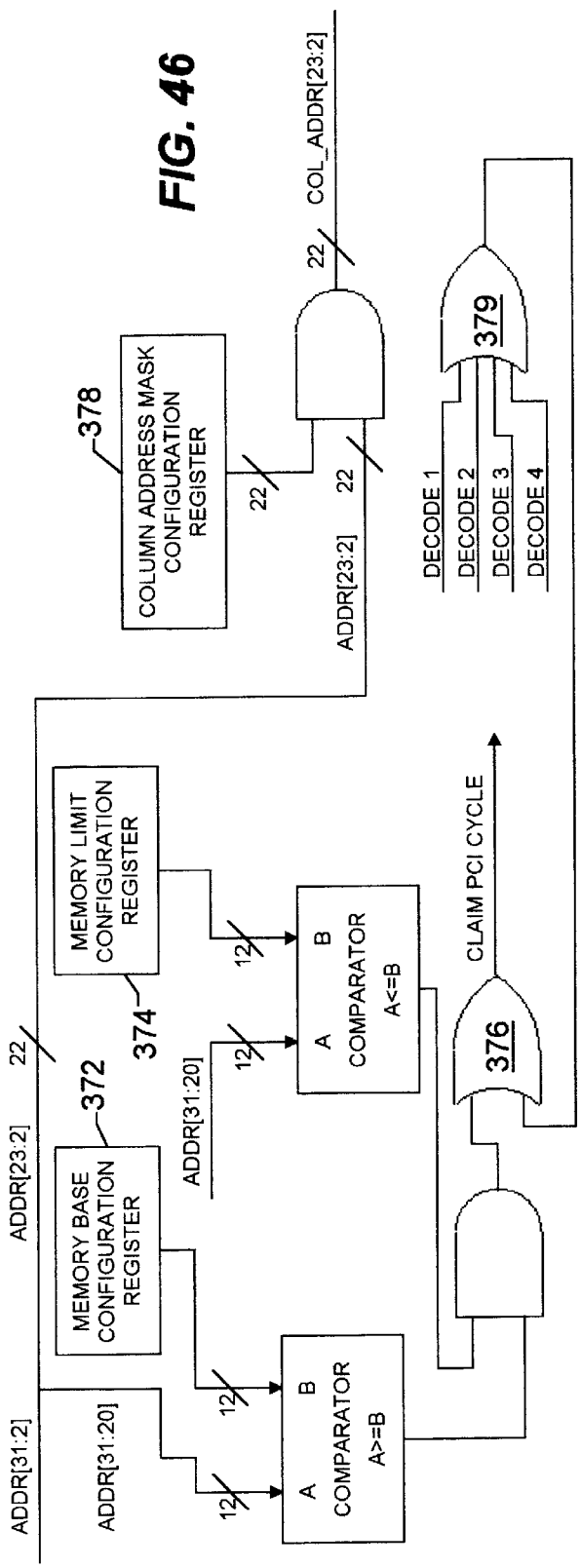
FIG. 46 is a block diagram showing how a standard PCI-PCI bridge address decoder is combined with a logical frame buffer address decoder and also shows the column address mask logic.

FIG. 46 is a block diagram showing how a standard PCI-PCI bridge address decoder is combined with a logical frame buffer address decoder and also shows the column address mask logic. Memory base configuration register 372 and memory limit configuration register 374 are initialized by the plug-and-play PCI BIOS as are the memory base registers of the display controllers on the secondary bus of the PCI-PCI bridge as is conventionally done. This allows standard access to the display controllers, for example for MMIO access. A four-input OR gate 379 combines four logical decode outputs corresponding to four display controllers into a single logical decode output. A two-input OR gate 376 combines the standard decode output and the logical decode output into a single signal indicating the PCI cycle is being claimed by the PCI-PCI bridge. As in a previous embodiment, a column address mask configuration register 378 is loaded from the CPU via a PCI configuration space access with ones in the bit positions that correspond to the lower significant bits of the logical address page number being used for decoding a column for the current arrangement and with zeros in the remaining bit positions. Also as in a previous embodiment a logical pitch equaling a power of two is used to reduce the complexity of column decoding, where the power of two is larger than the logical width for the logical surface being addressed and where the offscreen logical area needs not be mapped to video memory.

Figure 47:
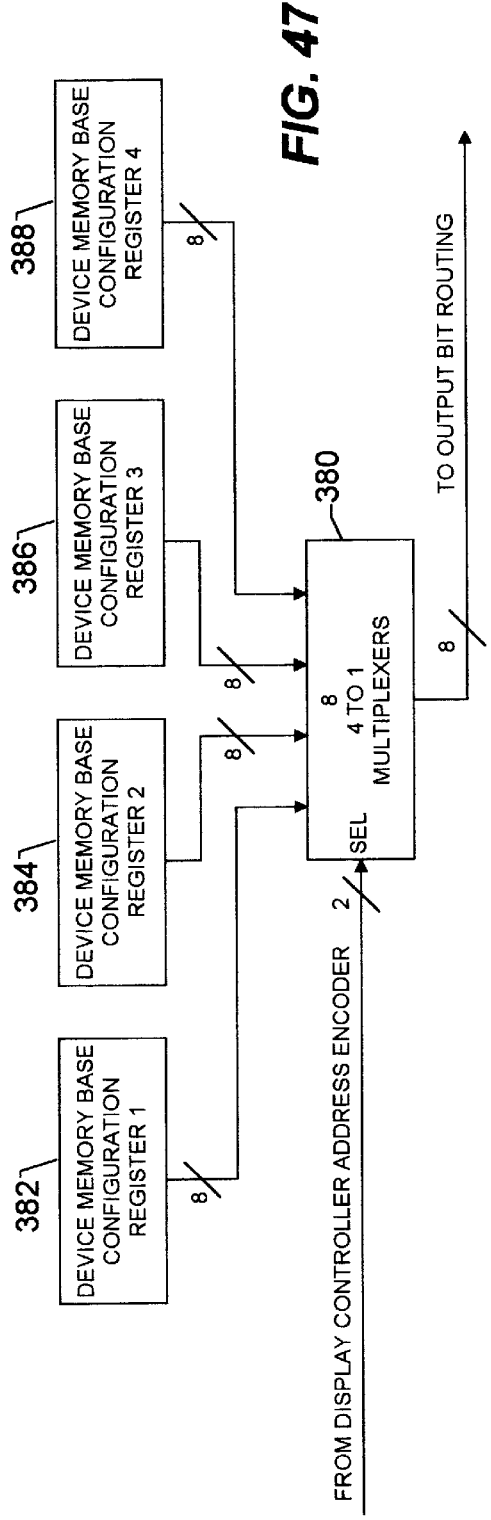
FIG. 47 is a block diagram showing configuration registers for storing copies of the memory base addresses of the display controllers on the secondary bus of the PCI-PCI bridge and a multiplexer that selects one of the base addresses as determined by the decode of the logical address.

FIG. 47 is a block diagram showing configuration registers for storing copies of the memory base addresses of the display controllers on the secondary bus of the PCI-PCI bridge and a base address multiplexer 380 that selects one of the base addresses. The base address that is selected corresponds to the display controller that the logical address corresponds to, as determined by the logical address decoders. For the previously described embodiment where the page shuffling was integrated with the display controllers, the upper significant bits of the address corresponding to the memory base register were not required after the decode. However, for the current embodiment, the logical address decoder within the PCI-PCI bridge can decode true for logical accesses within any one of the four display controllers on its secondary bus. Therefore these upper significant bits of the address must be inserted into the address before the address is transferred to the downstream read address buffer 360 or the downstream posted write FIFO 358 of FIG. 44B. The display device driver copies the values of these upper significant bits of the address into device memory base configuration registers 382, 384, 386, and 388 from the base register values in the display controllers on the secondary bus of the PCI-PCI bridge. The two bit select input of base address multiplexer 380 comes from the output of display controller address encoder 368 of FIG. 45.

Figure 48:
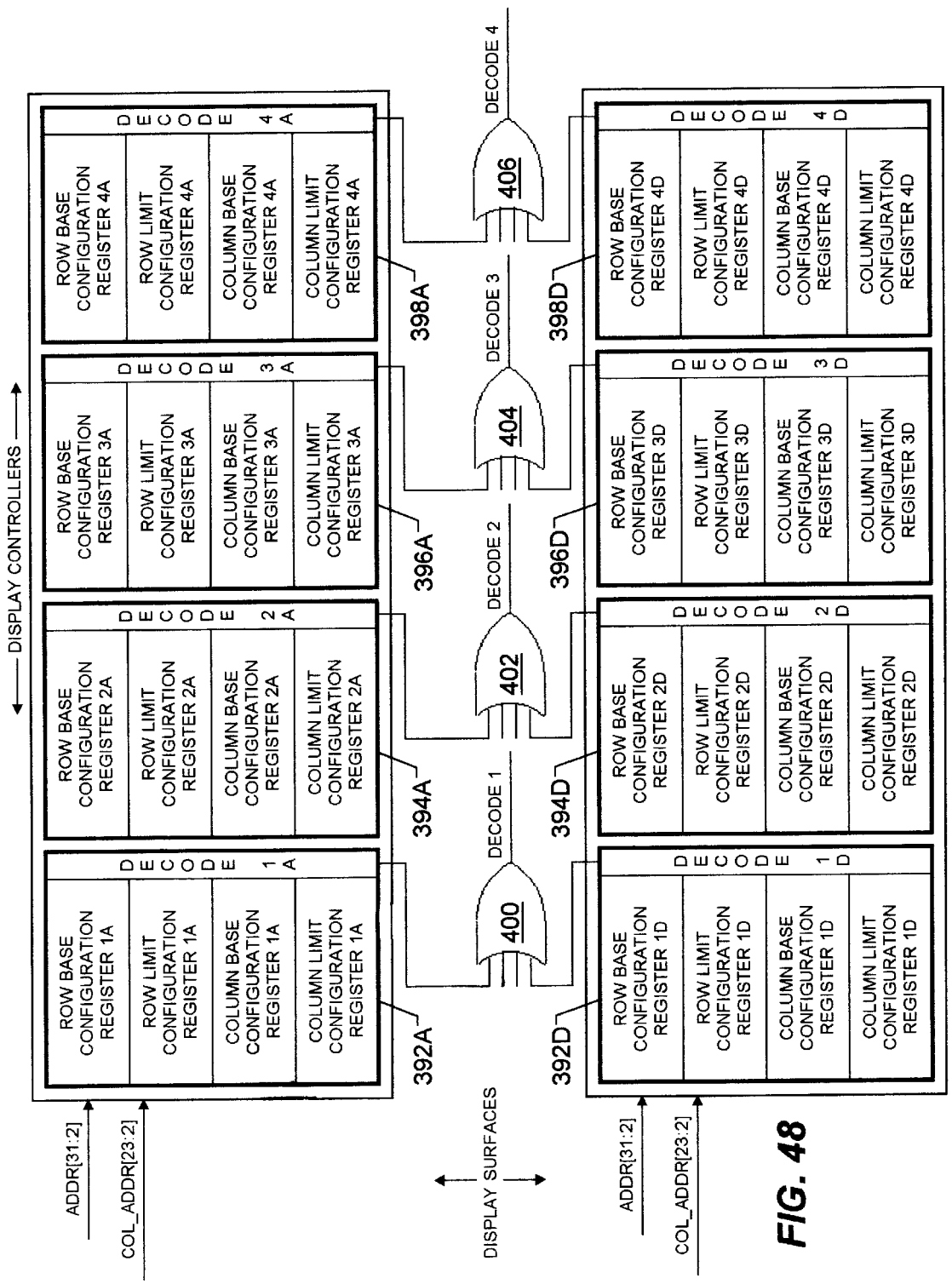
FIG. 48 is a block diagram showing address decoder configuration registers and gating to implement a decoder for four logical display surfaces for each of four display controllers on the secondary bus of a PCI-PCI bridge.

FIG. 48 is a block diagram showing address decoder configuration registers and gating to implement a decoder for four logical display surfaces for each of four display controllers on the secondary bus of a PCI-PCI bridge. A logical surface decoder 392A is the first of four logical surface decoders corresponding to the first of four display controllers and contains circuitry similar to the logical surface decoder 298A in FIG. 37. The first of four logical surface decoders for the three remaining display controllers are 394A, 396A, and 398A. The forth of four logical surface decoders for each of the four display controllers are 392D, 394D, 396D, and 398D. The second and third of the four logical surface decoders for each of the four display controllers are not shown. Four-input OR gates 400, 402, 404, and 406 are used for each of the four display controllers to combine the outputs of the four logical surface decoders associated with the display controllers into a single decode signal for each display controller. The four outputs of the four-input OR gates go to the input of display controller address encoder 368 in FIG. 45 and also go to four-input OR gate 379 in FIG. 46.

As the number of bytes of PCI configuration space is limited to a PCI function within a PCI device, if an arrangement requires more configuration space than is available, the use of a configuration address latch is used. An example of this was shown in a previous embodiment for loading the LUT RAM using configuration space accesses. The LUT input routing circuit and LUT output routing circuit are configured similarly to the embodiment with the page shuffling circuitry integrated with the display controllers. However, for this embodiment, the input and output routing circuits are shared by four display controllers thus requiring the MSBs of the output addresses to be supplied as shown in FIG. 47. Also, this example embodiment uses four display surface decoders per display controller as opposed to eight. The output bit routing circuit utilizes the output of a surface select encoder as an input similar to surface select encoder 306 in FIG. 36 of a previous embodiment. However, in this embodiment a surface select encoder (not shown) has each of four inputs driven from the output of a four-to-one multiplexer. These four multiplexers use as a two bit select input the output of display controller address encoder 368 of FIG. 45. The four-to-one multiplexers each get their four inputs from the four surface decoder outputs that correspond to the associated display controller. These four sets of four inputs are the same as are input to the four-input OR gates 400, 402, 404, and 406. This allows the encoded surface select bits used by the output bit routing circuit to correspond to the surface being decoded for the display controller being decoded. Known design approaches can be used for designing the conventional portion of the ASIC related to the PCI-PCI bridge circuitry. The operation of PCI-PCI bridges is well known in the industry and described in the PCI-to-PCI Bridge Architecture Specification, Revision 1.1 available from the PCI Special Interest Group. Though the use of only one PCI-PCI bridge is described in the current embodiment, an embodiment of the invention can use multiple PCI-PCI bridges with integrated page shuffling to implement a logical display system that requires an increased number of display controllers.

Figure 49A:
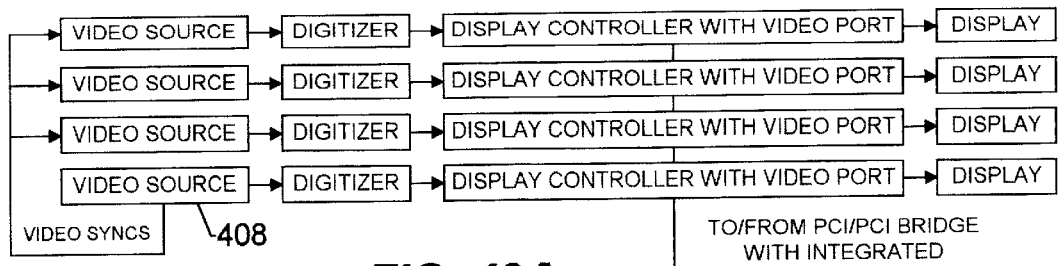
FIG. 49A is a block diagram for implementing a high resolution logical video port input in accordance with a ninth embodiment of the invention.

FIG. 49A is a block diagram for implementing a high resolution logical video port input in accordance with a ninth preferred embodiment of the invention. This example embodiment includes four video sources comprised of four NTSC CCD cameras. A known method of synchronizing video sources is used where a single video source 408 outputs its horizontal and vertical sync signals with three other video sources accepting the sync signals as inputs allowing the four video source outputs to be synchronized. The four video source outputs are input to four digitizer integrated circuits such as the SAA7110 manufactured by Philips Semiconductor. The digitized video sources are coupled to four display controllers that provide video port input capability such as the Virge)DX manufactured by S3 Incorporated with each display controller also coupled to four megabytes of video memory. The four display controllers are also coupled to a CPU by an ASIC that incorporates PCI-PCI bridge circuitry and an address translator with a page size of 2048. The address translator circuitry also includes disconnect logic to terminate PCI burst accesses at the 2048 page size boundaries. An address translator integrated in a PCI-PCI bridge has been described in a previous embodiment. However, in another embodiment of the invention, a high resolution logical video port can be implemented without a PCI-PCI bridge or custom address translation circuitry. This is by utilizing the CPU's page address translation circuitry and by utilizing a display controller with a video port that supports a video capture pitch that equals the page size of the CPU.

Figure 49B:
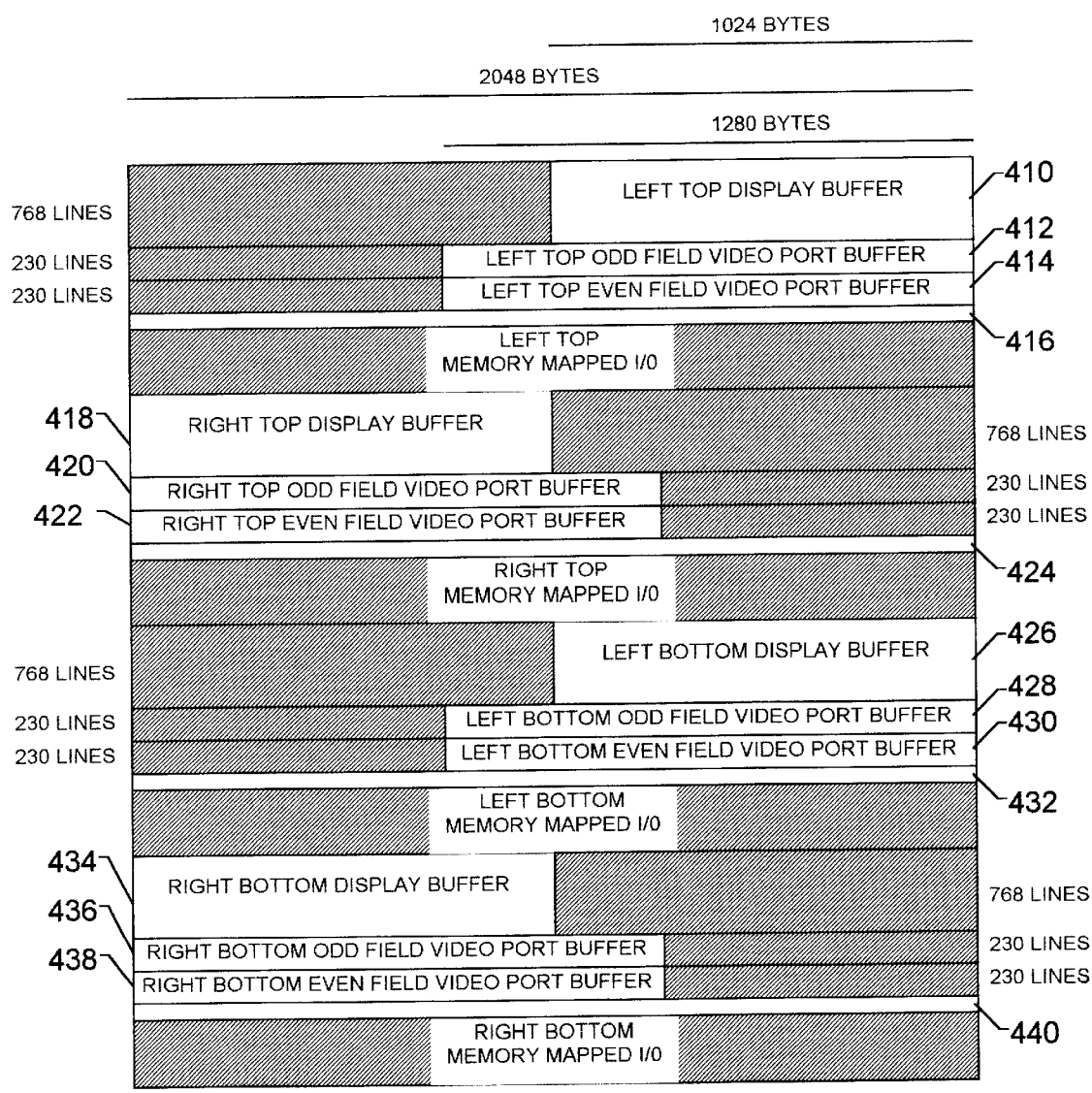
FIG. 49B shows how memory is reserved in multiple video memories for creating a logical frame buffer and a logical video port buffer.

FIG. 49B shows how memory is reserved in the four video memories associated with the four display controllers for the current embodiment. Page shuffling is used to configure four display buffers 410, 418, 426, and 434 into a logical video mode of 2048 by 1536 by 8 bits for a graphic display with each of the four being 1024 by 768 by 8-bit frame buffers. Page shuffling is also used to configure four odd field video port buffers 412, 420, 428, and 436 and four even field video port buffers 414, 422, 430, and 438 into a single logical odd field video port buffer and a single logical even field video port buffer respectively. These logical frame buffers are each 1280 by 460 by 16 bits and are used to address four frame buffers that are 640 by 230 by 16 bits. The logical field video port buffers for the two fields are flipped after every vertical sync of the NTSC signal such that while one of the logical field buffers is being loaded with image data from the four video sources the other logical field buffer is displayed as an overlay. Video memory areas 416, 424, 432, and 440 are available for use by the display device drivers. The method of creating a single logical frame buffer from four physical frame buffers has been described in a previous embodiment.

An advantage of this embodiment is that standardized low level software interfaces in a device driver intended for single video port frame buffers can be configured to control the multiple frame buffers as a single high resolution video port frame buffer. These low level software interfaces can be called by standardized higher level software interfaces used by application programs. This prevents the need for writing custom high level software interfaces for accessing multiple video sources as a single logical video source. By utilizing page shuffling to allow logical display surfaces to be created; images or video corresponding to the high resolution logical video input can be captured utilizing an existing high level software interface, where the frame rate of capturing video is adjusted depending on the storage medium such as RAM or hard disk as well as the activity on the interface buses.

An operating system that provides these low level and high level software interfaces for a video port is appropriate for the current embodiment. One such operating system and the one that is used by the current embodiment is Microsoft Windows 98. The low level software interface is Direct-Draw's Video Port Extensions (VPE) with the kernel-mode video transport used for supporting vertical sync interrupts. The high level interface is Microsoft's DirectShow. The use of the low level interface is described in the DirectDraw DDK documentation and the use of the high level interface is described in the DirectX Media SDK (Software Development Kit) for using a single video source. The differences to implement a single logical high resolution video port comprised of multiple video sources will be described in this specification. These software interfaces of Windows 98 support multiple video ports, but the current embodiment enables multiple physical video ports to be controlled and seen by the operating system as a single high resolution logical video port.

Though the Virge/DX display controllers provide hardware auto-flipping on every vertical sync signal allowing the buffers used for capture and display to be toggled without CPU intervention, this hardware auto-flipping feature is not used, but instead a known method of software auto flipping is used where a CPU interrupt is generated for every vertical sync. This known method allows for improved quality display of the interlaced video on a non-interlaced display device, by alternately displaying each of the NTSC fields at the rate of 60 fields per second allowing all image data to be displayed and by interpolating the interlaced data by two times in the vertical direction to get the proper image height. This known method also offsets by one the Y axis screen coordinate for the overlay of the odd fields and then crops the display window to eliminate flicker on the top and bottom lines that are only being updated at a 30 hertz rate. The logical video overlay created as such, but using four video sources as configured in this embodiment has a logical display resolution of 1280 by 916. The Y coordinate of the overlay is modified in software after every vertical sync interrupt and also at this time the flipping is performed by the CPU programming the registers of the display controllers. Each of the four display controllers are configured as such for every vertical sync interrupt.

In order to offset the overlay of the odd field as needed by this display method, the device driver component known as the mini-vdd implements the vddGetPolarity function that reads a bit from a register of one of the Virge/DX display controllers that corresponds to the current video port field and returns it to the operating system.

When a request is made by a software application to create a high resolution video port with auto-flipping, the HAL CanCreateVideoPort function replies stating if a video port with the requested resolution and other conventional parameters can be created. If the video port can be created, the CreateSurface function can be used to create a surface object with two attached surfaces using the logical addresses and logical pitch of the logical surfaces created for the even and odd fields. A DirectDraw VideoPort function called SetTargetSurface is called directly or through a high level software interface by a software application. This associates the created surface object with the logical high resolution video port. This provides the application or operating system with a source for capturing images or video. The video overlay is enabled at a specified position on the logical display, the video is started, the video is stopped, or the overlay is disabled by application software instructions being converted into lower level software functions in the HAL such as the UpdateVideoPort function. As the HAL is custom written for the logical display and logical video port system as described by this embodiment, the multiple display controllers are all configured when such a low level function is processed. In order to optimally display the logical video port overlay across the four display devices at a rate of 60 fields per second, the position of the video overlay specified by the software application, is such that the logical overlay is evenly distributed among the four displays such that each display controller displays video data from its two 640 by 230 video buffers. Such an overlay is shown in FIG. 29E. The UpdateVideoPort function implemented in the current embodiment will return a flag indicating request was not successfully processed if a non-centered video overlay position is specified. Although Windows 98 provides support for multiple display devices using multiple device drivers, the current embodiment does not utilize this support. However, in addition to utilizing a logical frame buffer for accessing the multiple video port frame buffers, a single display device driver with a logical frame buffer is used to access the multiple display frame buffers similarly to that described in a previous embodiment that utilized Windows 95.

The 16-bit image data corresponding to the logical video port is in a standard video format known as YUV 4:2:2. The YLV 4:2:2 standard used is described in the SAA7110 data sheet, however pertaining to the current embodiment, the pixel page alignment for the 16-bit YUV 4:2:2 pixel format must be aligned on an even pixel boundary. This is because even though there are 8 bits used to represent the Y, U, and V components, the pixel data is packed in the 16 bits such that two adjacent pixels in a scan line share U and V components. However, every pixel has a unique Y component.

The output of the digitizers are coupled to the Local Peripheral Bus (LPB) of the Virge/DX display controllers. The Virge/DX data book describes how to interface the LPB to the SAA7101 digitizer. The SAA7110 digitizer data sheet describes how to interface the device to a NTSC video source. The LPB interrupt on a vertical sync of the video input is only enabled for one of the display controllers as all four video sources are synchronized. The Virge/DX data book also describes how to display an overlay using interpolation. The method of configuring the start address offset, and pitch described in a previous embodiment is not used for this embodiment as the use of the video overlay requires the Virge/DX's streams processor to be enabled as well as the LPB bus to be enabled. The parameters including start address offset and pitch for the primary display and the video overlay are configured using the streams processor registers. The parameters for the LPB bus including the pitch and start address offsets for the two capture buffers, the enabling of one of the VSYNC interrupts, and interfacing to a SAA7110 digitizer are configured using the LPB registers as described in the Virge/DX data book.

For memory reserved as shown in FIG. 49B, the pitch used by the display controllers for accessing the display buffers and odd and even field buffers is 2048. For the left top and left bottom displays, the display buffers use a start address offset of 1024, the odd field buffers use a start address offset of 1573632, and the even field buffers use a start address offset of 2044672. For the right top and right bottom displays, the display buffers use a start address offset of zero, the odd field buffers use a start address offset of 1572864, and the even field buffers use a start address of 2043904.

The method described for displaying the interlaced video at 60 fields per second by interpolating in the vertical direction two times, offsetting the overlay position of the odd field by one line after interpolation and cropping the top and bottom lines results in the loss of a scan line from the logical display in between the top display devices and the bottom display devices. However, the image data being captured is complete. The loss of the display of this scan line can be prevented, if desired. The optical and image sensor system can be configured to overlap two scan lines between the top and bottom image sensors with the two scan lines corresponding to one odd field scan line and one even field scan line. With such an approach to correct the display, however, when performing the page shuffling to create the even field and odd field logical display surfaces only one of each of the overlapping scan lines are mapped to the logical display surfaces to prevent duplication of the scan lines in the captured images or video.

Various optical and image sensor system arrangements can be used by this embodiment to align the image data between the video sources to correspond to a single logical high resolution image. One arrangement uses multiple image sensors each with its own lens. For this arrangement the lenses are positioned to align the image data, where this approach is appropriate for when images are acquired at a fixed optical distance from the lenses. Another arrangement uses a single lens with multiple sensors butted together. A more preferred arrangement uses a single lens and a single high resolution image sensor with the sensor's interface electronics used to generate four synchronized video signals. For this arrangement, if it is desired to overlap scan lines to prevent the loss of the display of a scan line between display devices, the overlap can be performed in the sensor interface electronics preventing any optical alignment error.

In another embodiment, another known display method is used where the two interlaced fields are interleaved into one overlay buffer with the two subsequent fields being interleaved in another overlay buffer. This is used to display full resolution video without interpolation at 30 frames per second, but some motion artifacts could result as the two fields being interleaved can correspond to a time difference of a sixtieth of a second. This requires twice the video memory to be reserved as a flip occurs every two fields.

Alternately to scaling by two in the vertical direction, the video can be scaled in both vertical and horizontal directions to occupy a larger area of the displays in the current embodiment. In another embodiment, the page shuffling can interleave the eight frame buffers corresponding to the four odd and four even fields into a single logical display surface, while in another embodiment four progressive scan (non-interlaced) video sources could use four frame buffers instead of eight. In yet another embodiment of the invention where display controllers are used that allow overlay display coordinates to be specified for each of the video port buffers hardware auto-flipping can be utilized to prevent the CPU from processing vertical sync interrupts.

Figure 50A:
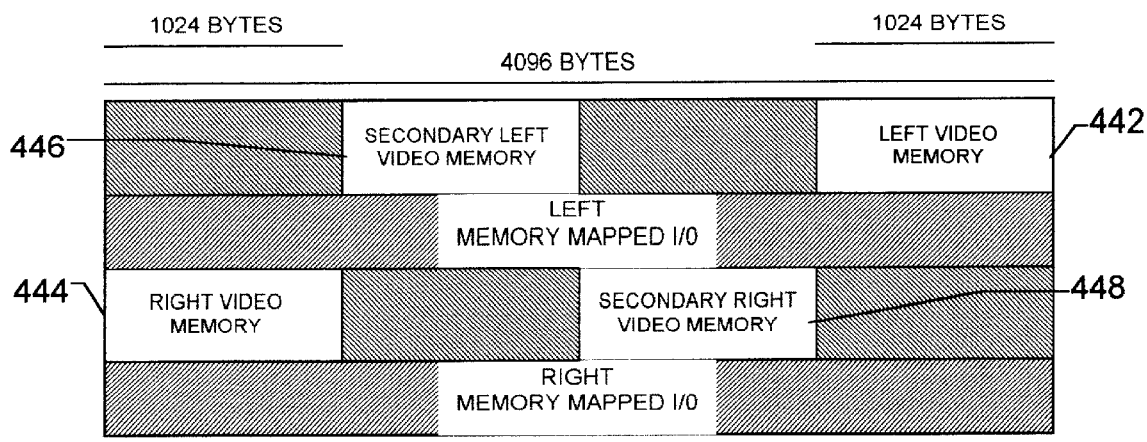
FIGS. 50A and 50B show how memory may be more efficiently used with multiple display surfaces when limited to a page size of 4096 by aligning the image data on half page boundaries in accordance with a tenth embodiment of the invention.
Figure 50B:
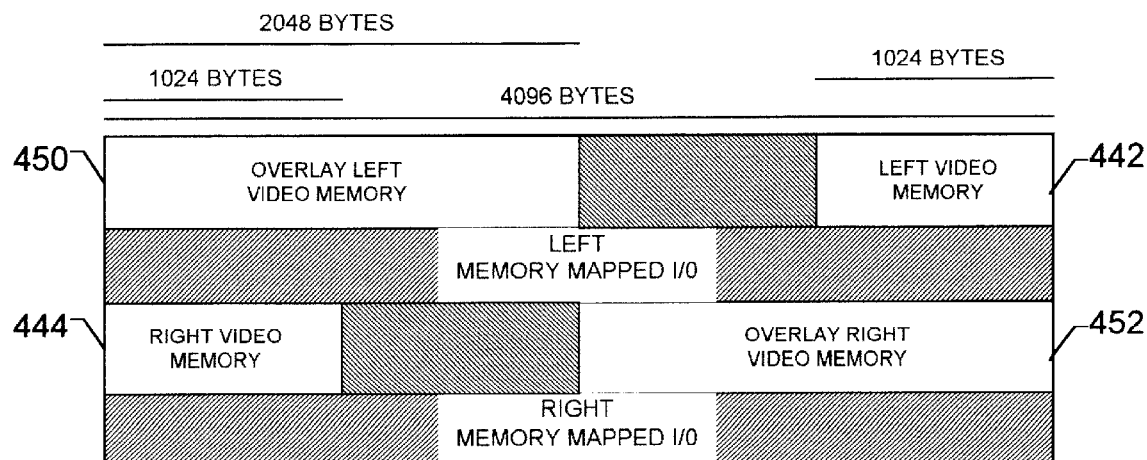

FIGS. 50A and 50B show how video memory can be more efficiently used with multiple display surfaces when limited to a page size of 4096 with a two column arrangement of frame buffers. This is implemented by aligning the image data on half page boundaries in accordance with a tenth preferred embodiment of the invention. The first described embodiment configured logical frame buffer addressing for two columns of frame buffers. For that embodiment, the video memory within pages used for logical frame buffer addressing that is not used for storing image data corresponding to a logical surface is not usable by other logical display surfaces due to not being page aligned properly. This video memory was only available for miscellaneous storage purposes of the device driver. When configuring frame buffers with a video mode using 1024 by 768 by 8 bits, there are only 1024 bytes out of the 4096 bytes in the page used for storing image data. An advantage of the current embodiment is that this memory space within these pages can be used for additional display surfaces, such as for overlay buffers or flippable buffers, where the physical pitch used by the display controllers for these additional surfaces is still 4096. FIG. 50A shows how video memory is reserved in accordance with the current embodiment for a logical flippable buffer. A left video memory area 442 and a right video memory area 444 are used for storing image data corresponding to a 2048 by 768 by 8-bit primary logical frame buffer. A secondary left video memory area 446 and a secondary right video memory area 448 are used for storing image data corresponding to a 2048 by 768 by 8-bit secondary logical frame buffer that shares physical pages with the primary logical frame buffer. FIG. 50B shows how memory is similarly reserved, but where an overlay left video memory area 450 and a overlay right video memory area 452 are used for storing image data corresponding to a 2048 by 768 by 16-bit logical frame buffer that can be used for storing a logical overlay with a different pixel format than the primary logical frame buffer.

Figure 51:
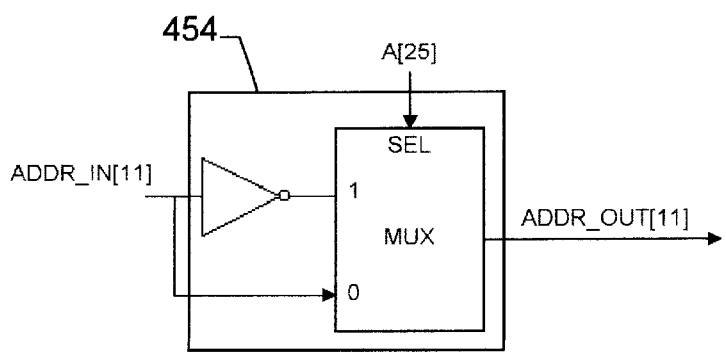
FIG. 51 shows a multiplexer circuit that routes addresses to either half of the pages based on a more significant memory address bit.

FIG. 51 shows a multiplexer circuit 454 that routes addresses to either half of the pages based on a more significant memory address bit. When the more significant memory address bit is high, address bit eleven is inverted making secondary left video memory area 446 and secondary right video memory area 448 in FIG. 50A have the proper page alignment for logical frame buffer addressing as seen by the CPU. Similarly, the proper page alignment is achievable for overlay left video memory area 450 and overlay right video memory area 452 in FIG. 50B.

In this example embodiment, PCI display controllers are used, such as the Virge/DX with four megabytes of video memory per display controller and the multiplexer circuit 454 is integrated into a PCI-PCI bridge circuit due to the timing requirements of the PCI bus. However the multiplexer circuit 454 can also be integrated into the display controller or other system component in an embodiment of the invention. The address bit used by multiplexer circuit 454 for the current embodiment is address bit twenty-five. Virge/DX display controllers utilize sixty-four megabytes of physical address space, even though only four megabytes of video memory can be used. The upper thirty-two megabytes of the sixty-four megabyte address space can be used for byte swapping, such as required for big endian type addressing used by Motorola processors. Address bit twenty-five being high corresponds to addressing the upper thirty-two megabytes and is typically not used in a Pentium based system as the Pentium uses little endian type byte ordering. Secondary logical frame buffers or overlay logical frame buffers are mapped to physical address space having address bit twenty-five logically high. The circuitry integrated with the PCI-PCI bridge uses address bit twenty-five as the select input to multiplexer circuit 454 to align the image data in the pages as seen by the CPU. However, before the addresses is forwarded to the downstream read address buffer or the downstream posted write FIFO of the PCI-PCI bridge logic, address bit twenty-five is set to zero. This allows addresses to be presented to the display controllers on the secondary bus of the PCI-PCI bridge to have address bit eleven inverted, but address bit twenty-five set to zero. To provide for four surfaces that share physical memory pages, an embodiment of the invention can invert any combination of address bit eleven and address bit ten, for when the widths of the four surfaces in physical memory are all less than or equal to 1024.

Figure 52:
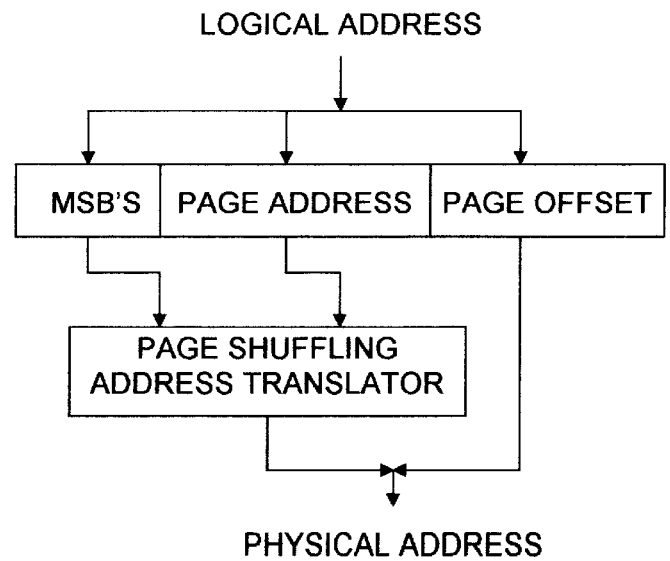
FIG. 52 is a block diagram showing page shuffling where the standard physical address spaces used by the multiple display controllers are not overlapping each other.

FIG. 52 is a block diagram showing how previous embodiments convert a logical address to a physical address using an appropriately configured address translator to perform page shuffling. In embodiments such as these, the physical address space of the multiple display controllers are assigned non-overlapping physical memory areas by the plug-and-play BIOS, assuming that physical memory areas of sufficient size are available. Since display controllers can require much more physical address space than required for addressing the video memory, such as sixty-four megabytes for the Virge/DX, it is advantageous to allow the multiple display controllers to share a common memory area. One known method of addressing multiple display controllers that utilize a common physical memory area is to have the memory space of only one of the display controllers enabled at a time by disabling and enabling the memory space enable bits of the display controllers in their PCI configuration space registers. The device driver enables any one of the display controllers as needed. The memory base registers in the PCI configuration space of multiple display controllers can be configured to a common physical memory area by enabling the PCI memory space of only a single display controller at a time. This known method can be used for addressing multiple frame buffers by the device driver enabling only the display controller that corresponds to the frame buffer being accessed and then performing any video memory accesses required in that frame buffer. However, for a software component to independently access the multiple frame buffers as a single logical frame buffer, there is no opportunity for the device driver to disable and enable the display controllers.

Figure 53:
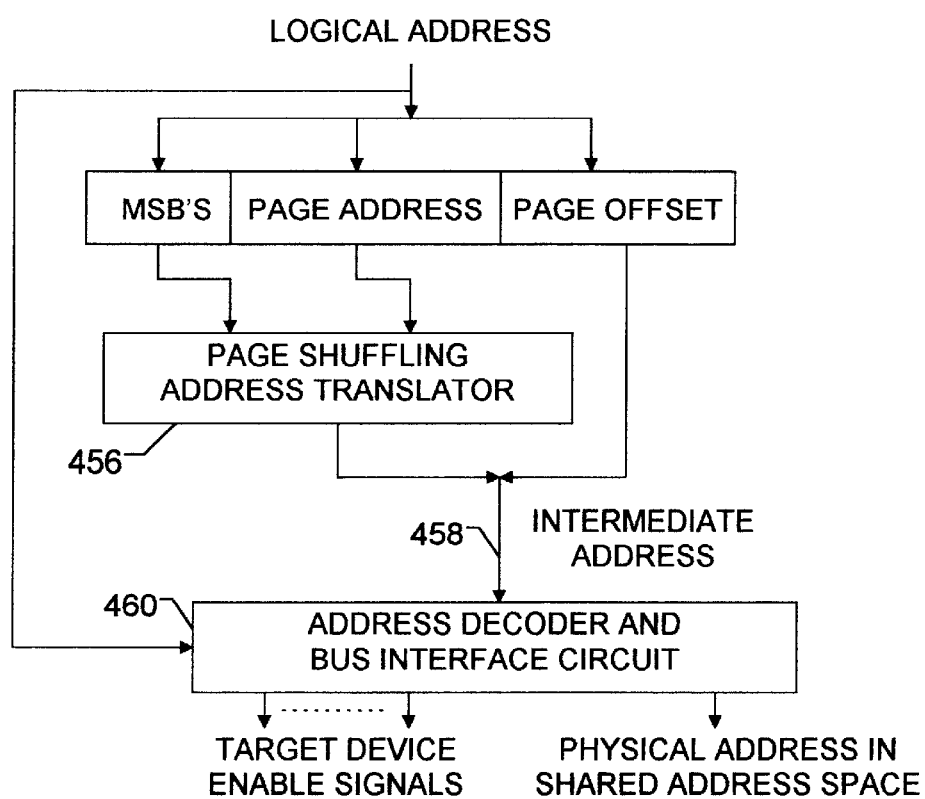
FIG. 53 is a block diagram showing page shuffling where the amount of physical address space used up by multiple display controllers is reduced by configuring one or more of them into common physical address spaces in accordance with an eleventh embodiment of the invention.

FIG. 53 is a block diagram showing a page shuffling address translator 456 where the amount of physical address space used by multiple display controllers is reduced by configuring one or more of the display controllers into common physical address spaces in accordance with an eleventh preferred embodiment of the invention. The lower address bits corresponding to the offset within a page are combined with the output of page shuffling address translator 456 to form an intermediate address 458. A decoder and bus interface circuit 460 decodes the logical addresses to determine to which of the display controller devices the address corresponds and then activates an enable signal corresponding to that display controller with the enable signals for the other display controllers left inactive.

To minimize the amount of physical address space, the current embodiment configures all of the display controllers to use a single physical memory area. The current embodiment utilizes Virge/DX display controllers that require the memory area to be sixty-four megabytes and utilizes a PCI-PCI bridge ASIC with integrated page shuffling address translation, address decoding and disconnect logic similar to that described in a previous embodiment. This ASIC is used to couple the display controllers to a primary PCI bus. This embodiment, however, only requires a single device memory base configuration register as opposed to the four registers shown in FIG. 47 for a previous embodiment. This embodiment utilizes a two bit output of a display controller address encoder similar to that shown in FIG. 45, but for this embodiment it is used to generate one of four FRAME signals on the secondary PCI bus. One FRAME signal goes to each of four display controllers with the FRAME signals serving the purpose of the enable signals. PCI buses typically use a single FRAME signal to initiate a cycle for all devices on the bus as the devices are typically assigned different physical memory areas. By utilizing multiple FRAME signals, only the display controller connected to the active FRAME signal can claim the bus cycle thus preventing bus contention. A downstream read address buffer and a downstream posted write FIFO of the PCI-PCI bridge logic are used similarly to that shown in FIG. 44B, but they are widened by two bits. These two bits are used to route the two bit output of the display controller address encoder to a secondary bus control circuit along with the address allowing the appropriate one of the four FRAME signals to be generated. The four FRAME signals are bi-directional to allow bus-master DMA transfers, with the PCI-PCI bridge ASIC containing circuitry to control the transfer of data between devices on the secondary side of the bridge using conventional PCI cycles. MMIO accesses are routed to the appropriate display controller by allowing the display device driver to load two bits into a configuration register to select the display controller for MMIO or standard accesses. If needed, the embodiment can be configured to further reduce the amount of physical memory required by utilizing the thirty-two megabyte region of the Virge/DX display controller's address space not required for little endian byte ordering to address the logical surfaces. However, the translated addresses output to the secondary bus that correspond to the logical addresses are constructed to use the address space for little endian addressing, by setting address bit twenty-five to zero in the output bit routing circuit. An embodiment of the invention can utilize more than one custom PCI-PCI bridge ASIC to enable the use of an increased number of display controllers.

Accordingly, it can be seen that the page shuffling address translator of this invention provides a single logical frame buffer for accessing multiple frame buffers. As stated, it can be used to couple the image data associated with the single logical frame buffer to multiple video streams. This allows a low cost multiple display system to be implemented where the low cost is derived from both the use of conventional computer system components and reduced software development costs. The invention can also be used to provide a single logical frame buffer for accessing multiple frame buffers associated with multiple dual output display controllers allowing an increased number of video outputs for a given system. The invention allows the graphics performance to be optimized by utilizing hardware acceleration provided by the display controllers for selected graphics functions with the other graphics functions processed by an operating system component via the logical frame buffer. The invention also allows for logical display surfaces that span multiple frame buffers to be created by software applications, where these surfaces can be used for overlay buffers and flippable buffers. The single logical frame buffer also allows software applications to directly access the memory of the multiple frame buffers without requiring knowledge of the existence of the multiple frame buffers. This provides a performance increase when compared to using a graphics software interface for accessing the memory. The invention also allows a logical frame buffer to be used for accessing multiple frame buffers that drive multiple projectors, where a portion of the multiple frame buffers is used for calibrating the optics of the multiple projector system. The invention also allows a logical frame buffer to be used for distributing a standard resolution across multiple displays by utilizing interpolated zooming. Furthermore, to provide optimum use of video memory, the invention allows a look up table RAM to be integrated with one or more other system components to perform the page shuffling by enabling the use of a page size smaller than available when using the processor's integrated memory management unit. In addition to providing a logical frame buffer that a CPU ca write image data to for distributing the image data among multiple frame buffers, the invention allows a logical frame buffer to be created for the purpose of the CPU reading image data to capture high resolution video or images. For this, the image data is written to multiple frame buffers from multiple video sources.

While the above description contains many specificitys, these should not be construed as limitations on the scope of the invention, but as exemplifications of the presently-preferred embodiments thereof Many other variations are possible within its scope.

For example instead of storing image data such as RGB, YUV, or a color index, and where bits within a pixel format can be used for other purposes, such as a color key bit for displaying irregular shaped overlays, a logical frame buffer is also appropriate for storing any type of data that is accessed by both the CPU and the display controllers. For example, logical frame buffers are appropriate for logical surfaces that store alpha values or z-buffer values. Alpha values, that are used to provide transparency effects, can be stored in their own surface memory and associated with a display surface. An alpha value can also be stored with a red, green, and blue value in an ARGB pixel format used by a display surface. Z-buffers are surfaces that store depth values for every pixel in a display surface, such as an overlay. Display controllers can utilize the depth values to determine on a pixel by pixel basis which pixels are to be displayed from multiple overlapping display surfaces. For alpha surfaces and for z-buffer surfaces, logical frame buffers can be used for storing the surfaces such that they span multiple frame buffers.

Also, for display surfaces that can be initialized with image data before a position on the logical display is specified, such as, but not limited to an overlay, the initial surface memory can be allocated from system RAM as well as any available video memory. When a position for the display surface is specified, the contents of the display surface is copied from system RAM to a logical frame buffer that addresses video memory. Also, in addition to the logical heaps, video memory heaps can be mapped in each of the video memories to be used for the initial surface memories or to be used for display surfaces that do not span multiple frame buffers.

Also, systems requiring a large number of display controllers can utilize conventional PCI-PCI bridge circuits either mounted on the computer's motherboard or mounted on display controller boards containing multiple display controllers. The address translation can still be performed using the integrated address translation hardware of the processor as the display controllers behind PCI-PCI bridges are still accessed using physical addresses. The physical addresses used to perform the page shuffling are read from the base address registers of the display controllers regardless of whether the display controllers are behind a PCI-PCI bridge.

Also for the small page size embodiments that integrate a look up table RAM into existing system components, such as PCI-PCI bridge circuits or into the display controllers, arithmetic circuits can optionally be used to couple a logical address to a lookup table. This can allow the input of the look up table to be conceptually separated into X and Y offsets from the beginning of the frame buffer where an X of zero and a Y of zero correspond to the upper left corner page in the frame buffer, but the preferred methods described prevent the need for the arithmetic circuits by separating parts of the logical address into portions that have a unique X and Y, but where the upper left corner page needs not have an X of zero and a Y of zero. The look up table is configured to utilize these unique X and Y values to map to the appropriate pages in the video memory. Also, for when a look up table is integrated within a PCI-PCI bridge, the need for initiating a disconnect cycle on the primary side of the bridge during a burst write access at a frame buffer boundary can be avoided if the adjacent frame buffers are both on the secondary side of the same PCI-PCI bridge. This would be by initiating a disconnect on the secondary side of the bridge and storing the primary side microaccesses within the burst in a write FIFO allowing the single burst accesses on the primary side to be converted into two or more accesses on the secondary side.

For frame buffers that have a width that is a power of two, for example 1024 by 768 by 8, 1024 by 768 by 16, 1024 by 768 by 32, 2048 by 768 by 8, and 2048 by 768 by 16, the page shuffling address translation can be performed without a look up table by rerouting address lines and using a logical pitch that is a power of two. For example, for an arrangement with three columns of 1024 by 768 by 16 frame buffers, a page size that equals the frame buffer width of 2048 is used. The least significant eleven address bits that represent an address within a 2048 byte page are routed normally, but the thirteenth and twelfth least significant bits are routed to upper significant bits. Three of the four binary values that these two bits can represent are used to address the three frame buffers and the forth binary value is not used as it corresponds to an offscreen region of the logical frame buffer. The fourteenth least significant bit and above, of the logical address, are routed to the twelfth least significant bit and above, of the video memory address, up to the most significant bit that addresses a single video memory. A disconnect circuit is still used to terminate burst accesses at the frame buffer boundaries. A ROM can also be used to perform address translation for example for implementations that use a single arrangement of frame buffers at a single resolution and color depth.

When utilizing a processor's integrated address translation hardware to perform the page shuffling to implement a logical frame buffer to access multiple frame buffers, the page size can vary from processor to processor. For example, certain processors supported by the Windows CE operating system are known that utilize a page size of 1024. Processors with a page size of 1024 provide more flexibility in configuring multiple frame buffers and allow video memory to be used more efficiently than processors with a page size of 4096.

The multiple video input streams used to create a logical high resolution video port in addition to being coupled to digitized video camera signals can also correspond to, but are not limited to digital television signals or MPEG decoder outputs. Also, in addition to double buffering, triple buffering or even more than three input buffers can be used for the video capture and display.

For calibrating the optics of multiple projector systems, if it is desired to use a logical screen resolution that is a multiple of a standard resolution, for example 1280 by 960 instead of the 1276 by 956 resolution described, each of the display controllers can be configured with a custom resolution of 642 by 482 by a conventional means to provide a 1280 by 960 resolution after overlapping the calibration areas. To configure a display with more than two columns of projectors, for example with a small page size look up table, extra pages are mapped in every scan line for storing the calibration pattern. Also, in addition to multiple projector systems that utilize projectors in front of the display screen, a system can utilize projectors to the rear of the display screen, for example in a high resolution video cube that incorporates multiple projectors. Overlapping calibration patterns can also be used in non-projector systems, for example in a CRT type device that generates a visual image from multiple video streams.

The embodiments that configure a segment base address have been shown utilizing a common page alignment for logical and linear addresses, where a linear address is formed by adding a logical address to the segment base addresses. However, the alignment of the logical addresses within a page can be offset by utilizing a segment base address that is not page aligned.

Also, there is no requirement for all of the display controllers to be of the same type. For example, an embodiment can use a higher cost display controller for a display used as a primary display, with lower cost display controllers used for the other displays.

Also, the term display controller is used in this specification to describe a device that couples a video memory to a video device via a video stream. Many conventional display controllers provide for coupling a video memory to a video output device, such as a display as well as providing for coupling the video memory to a video input device, such as a digitized camera signal. However, an embodiment of the invention can be implemented to provide a logical high resolution video input in a system without a display, where the system stores captured image data. Here, the term display controller is still used to describe the device or devices that couple the video input devices to the video memory areas.

Thus the scope of the invention should be determined by the appended claims and their legal equivalents, rather than by the examples given.

What is claimed is:

1. A method of addressing a plurality of video memory areas having a predetermined arrangement, as a logical frame buffer comprising the steps of:
   (a) providing a display controller subsystem means which couples a video memory subsystem means to a video device subsystem means via a plurality of video streams;
   (b) providing an address translation means which accepts a logical address as an input and responsively generates a translated output for accessing said video memory subsystem means;
   (c) locating each of the video memory areas within said video memory subsystem means;
   (d) configuring a physical pitch for each of the video memory areas such that said physical pitch corresponds to the difference in video memory addresses between adjacent vertical pixels in the video memory area;
   (e) reserving a number of logical address space pages for said logical frame buffer sufficient in size for storing said predetermined arrangement of the video memory areas; and
   (f) configuring said address translation means to map the reserved logical address space pages to pages within the video memory areas such that any adjacent vertical pixels in said predetermined arrangement of video memory areas are separated by a constant number of logical addresses, said constant corresponding to a logical pitch for accessing said logical frame buffer, wherein;
   each of the video memory areas is coupled to one or more video streams,
   two or more of the video streams are coupled to distinct video memory areas and have a common video direction;
   said display controller subsystem means contains one or more display controllers; and
   adjacent vertical pixels correspond to pixels in distinct scan lines.

2. The method of claim 1 wherein step (f) comprises initializing said address translation means to configure the mapping of the reserved logical address space pages, wherein the initialization is accomplished by writing values into a look up table means.

3. The method of claim 1, further comprising the step of initializing a set of parameters that define a primary display surface, said set of parameters corresponding to said logical frame buffer, wherein said primary display surface is accessed by an operating system software component when processing graphics commands.

4. The method of claim 3, further comprising the step of providing one or more software modules that each process a graphics command, wherein each software module configures graphics acceleration hardware to access one or more of the video memory areas.

5. The method of claim 1 wherein step (c) comprises determining a start address offset for each of one or more of the video memory areas such that the video memory area is page aligned in video memory at a boundary between adjacent video memory areas in said predetermined arrangement.

6. The method of claim 1 wherein step (d) is performed simultaneously with step (c) and wherein step (d) comprises determining said physical pitch for each of one or more of the video memory areas such that the video memory area is page aligned in video memory at one or more boundaries between adjacent video memory areas in said predetermined arrangement.

7. The method of claim 1, further comprising the step of converting a X coordinate to a Y coordinate and converting a Y coordinate to a X coordinate prior to forming a logical address for accessing said logical frame buffer, wherein the unconverted X and Y coordinates correspond to a rotated logical frame buffer.

8. The method of claim 1, further comprising the step of providing a panning means for positioning a sub-area within any of the video memory areas, wherein any of the video streams coupled to the video memory area transports image data associated with said sub-area.

9. The method of claim 1 wherein step (c) further comprises reserving video memory adjacent to any of the video memory areas, wherein the reserved video memory is used for storing image data corresponding to test patterns during a display calibration procedure.

10. The method of claim 1, further comprising the step of determining a page size responsive to said predetermined arrangement of the video memory areas and responsive to the page size limitations of said address translation means.

11. The method of claim 1, further comprising the step of configuring said display controller subsystem means to perform scaling such that the number of pixels that are logically addressable within any of said video memory areas differs from the number of pixels that are coupled via the associated video streams to said video device subsystem means.

12. The method of claim 1 wherein said logical frame buffer stores data representing color information.

13. The method of claim 1 wherein said logical frame buffer stores data representing alpha values.

14. The method of claim 1 wherein said logical frame buffer stores data representing z-buffer values.

15. A computer system for addressing a plurality of video memory areas having a predetermined arrangement, as a logical frame buffer comprising:

(a) a video memory subsystem means which contains the video memory areas;
(b) a display controller subsystem means which couples said video memory subsystem means to a video device subsystem means via a plurality of video streams; and
(c) an address translation means which will:
  (1) separate a logical address space into logical address space pages;
  (2) accept a logical address as an input and responsively generate a translated output for accessing said video memory subsystem means;
  (3) map logical address space pages to pages within the video memory areas such that any adjacent vertical pixels in said predetermined arrangement of video memory areas are separated by a constant number of logical addresses, said constant corresponding to a logical pitch for accessing said logical frame buffer;
  wherein each of the video memory areas is coupled to one or more video streams;
  wherein two or more of the video streams are coupled to distinct video memory areas and have a common video direction;
  wherein said display controller subsystem means contains one or more display controllers; and
  wherein adjacent vertical pixels correspond to pixels in distinct scan lines.

16. The computer system of claim 15 wherein said common video direction is video output.

17. The computer system of claim 16 wherein one or more of said video streams are coupled to one or more video memory areas and have a video input direction.

18. The computer system of claim 15 wherein said common video direction is video input.

19. The computer system of claim 15 wherein any of the distinct video memory areas is coupled to two or more video streams of said common video direction.

20. The computer system of claim 19 wherein said common video direction is video output.

21. The computer system of claim 15 wherein said address translation means is comprised of a look up table means.

22. The computer system of claim 21 wherein said look up table means consists of a processor's page translation means.

23. The computer system of claim 21 wherein said look up table means includes a processor's page translation means.

24. The computer system of claim 21 wherein said look up table means includes a non-volatile memory means.

25. The computer system of claim 21 wherein said look up table means includes a circuit for rerouting address lines, wherein the width of any of the video memory areas is a power of two.

26. The computer system of claim 21 wherein said look up table means includes circuitry integrated with a display controller means.

27. The computer system of claim 26, further comprising a disconnect means to terminate burst accesses at boundaries between adjacent video memory areas.

28. The computer system of claim 21 wherein said look up table means includes circuitry integrated with a bus interface means.

29. The computer system of claim 28, further comprising a disconnect means to terminate burst accesses at boundaries between adjacent video memory areas.

30. The computer system of claim 15 wherein said translated output is comprised of an output address.

31. The computer system of claim 15 wherein said translated output is comprised of an output address and a plurality of video memory enable means's.

32. The computer system of claim 31 wherein the video memory enable means's includes bus cycle framing signal means's.

33. A method of re-allocating memory for a display surface in a display device driver software component when said display surface is positioned such that it spans a plurality of video memory areas comprising the steps of:
  (a) providing a display controller subsystem means which couples the video memory areas to a video device subsystem means via a plurality of video streams;
  (b) providing an address translation means which accepts logical addresses as an input and responsively generates a translated output for accessing the video memory areas;
  (c) responding to a software application's request for said display surface to be created by allocating memory for the surface in an initial surface memory means which is accessible by the software application;
  (d) responding to a software application's request for said display surface to be positioned by allocating a logical frame buffer to address the video memory areas;
  (e) transferring data from said initial surface memory means to the video memory areas; and
  (f) modifying a start address value and a pitch value that are associated with said display surface to values that correspond to said logical frame buffer.

* * * * *